US009818010B2

(12) United States Patent
Deal et al.

(10) Patent No.: US 9,818,010 B2
(45) Date of Patent: Nov. 14, 2017

(54) BARCODE-READING SYSTEM

(71) Applicant: The Code Corporation, Draper, UT (US)

(72) Inventors: John Deal, Springfield, PA (US); George Powell, Draper, UT (US); Garrett Russell, Phoenixville, PA (US)

(73) Assignee: The Code Corporation, Draper, UT (US)

( * ) Notice: Subject to any disclaimer, the term of this patent is extended or adjusted under 35 U.S.C. 154(b) by 74 days.

(21) Appl. No.: 14/923,027

(22) Filed: Oct. 26, 2015

(65) Prior Publication Data

US 2016/0104016 A1 Apr. 14, 2016

Related U.S. Application Data

(63) Continuation-in-part of application No. 14/799,464, filed on Jul. 14, 2015, and a continuation-in-part of application No. 14/510,341, filed on Oct. 9, 2014, now Pat. No. 9,171,194, and a continuation-in-part of application No. 14/717,112, filed on May 20, 2015, and a continuation-in-part of application No. 14/581,821, filed on Dec. 23, 2014.

(51) Int. Cl.
*G06K 7/10* (2006.01)
*G06K 7/00* (2006.01)
*G06K 7/08* (2006.01)
*H02J 7/00* (2006.01)

(52) U.S. Cl.
CPC ....... *G06K 7/10722* (2013.01); *G06K 7/0004* (2013.01); *G06K 7/089* (2013.01); *G06K 7/10732* (2013.01); *G06K 7/10881* (2013.01); *H02J 7/0045* (2013.01)

(58) Field of Classification Search
CPC .. G06K 7/0004; G06K 7/089; G06K 7/10722; G06K 7/10732; G06K 7/10881
USPC .................................................. 235/439, 454
See application file for complete search history.

(56) References Cited

U.S. PATENT DOCUMENTS 7,281,659 B2 * 10/2007 Page .................... G06K 7/14
235/454
7,419,097 B2 * 9/2008 Lee .................. G06F 17/30879
235/454

(Continued)

*Primary Examiner* — Seung Lee
(74) *Attorney, Agent, or Firm* — Timothy P. O'Hagan; Ray Quinney & Nebeker

(57) ABSTRACT

This patent specification describes operations of a mobile device with barcode-reading capabilities and an application and license server. A mobile device may include a barcode-reading application downloaded from an application server. The barcode-reading application may operate in a base mode or an enhanced mode. In the base mode, the barcode-reading application may establish a network connection to a licensing server to obtain a license code, and determine at least one operating permission authorized by the license code. In the enhanced mode, the barcode-reading application may implement at least one enhanced barcode-reading function which corresponds to the at least one operating permission authorized by the license code. For example, the enhanced barcode-reading function may be a function of decoding a barcode symbology that the decoder is restricted from decoding in the base mode of operation.

35 Claims, 36 Drawing Sheets

(56) References Cited

U.S. PATENT DOCUMENTS

| | | | | |
|---|---|---|---|---|
| 8,596,541 B2 * | 12/2013 | Chiu | ................... | G06K 7/14 235/462.06 |
| 2012/0205436 A1 * | 8/2012 | Thomas | ............. | G06K 17/0025 235/375 |
| 2012/0286031 A1 * | 11/2012 | Rothschild | ....... | G06K 19/06056 235/375 |
| 2014/0179273 A1 * | 6/2014 | Kim | ................ | H04W 4/025 455/411 |

* cited by examiner

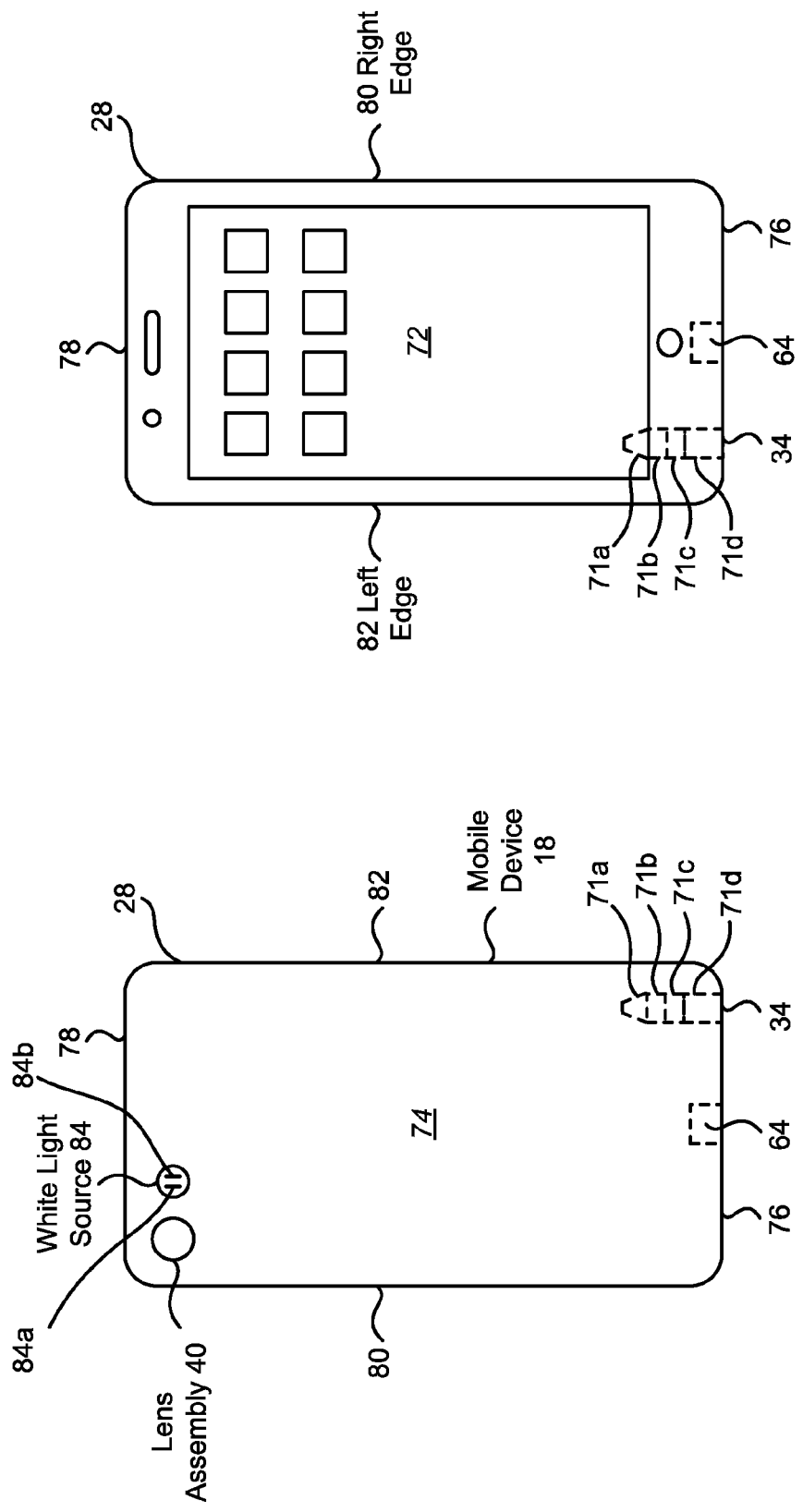

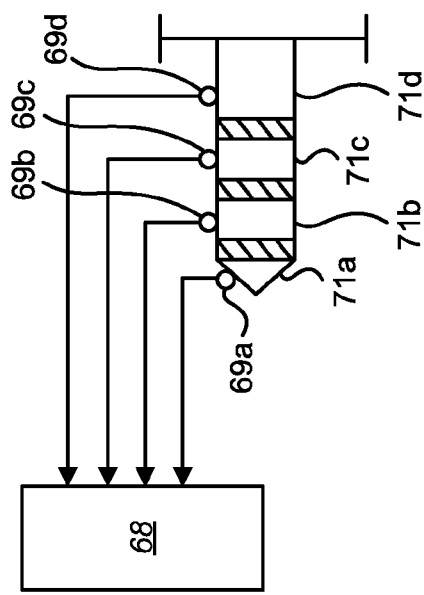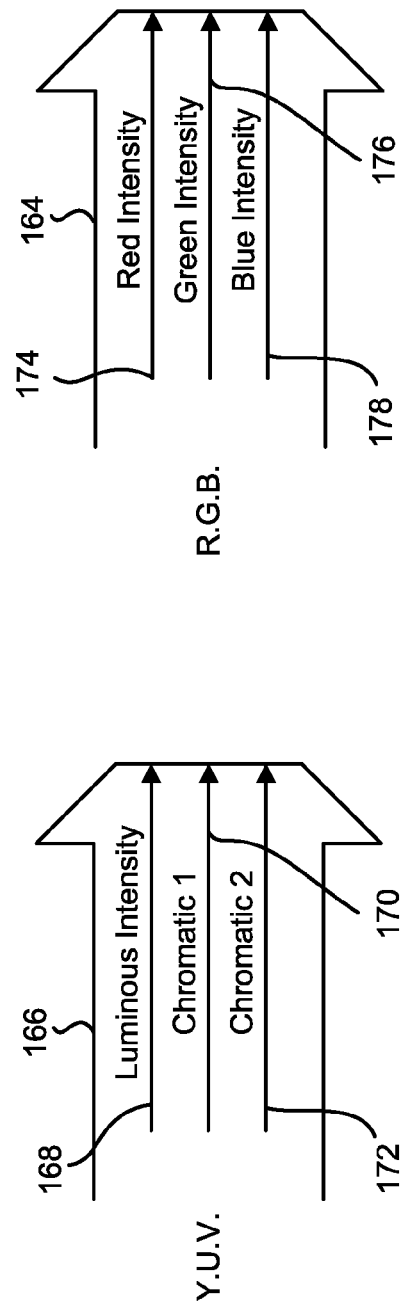
FIG. 2D
FIG. 2E

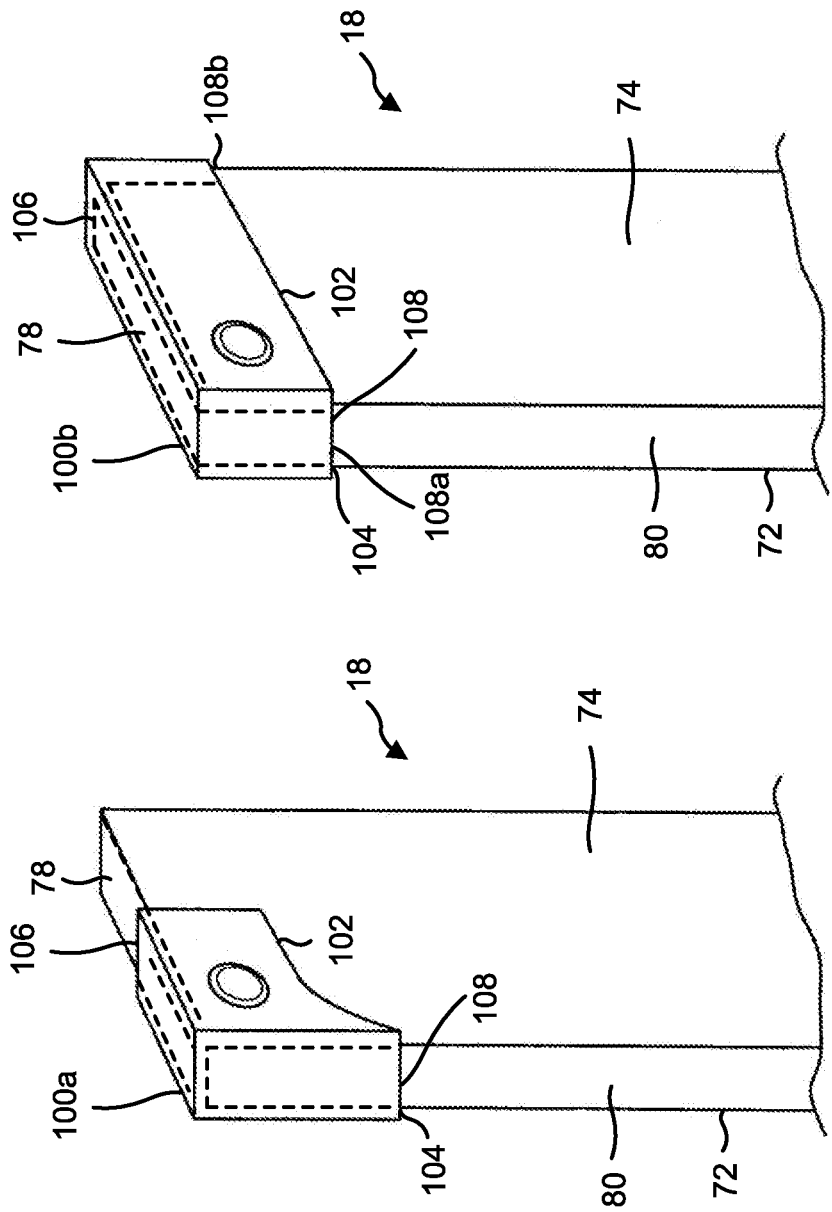

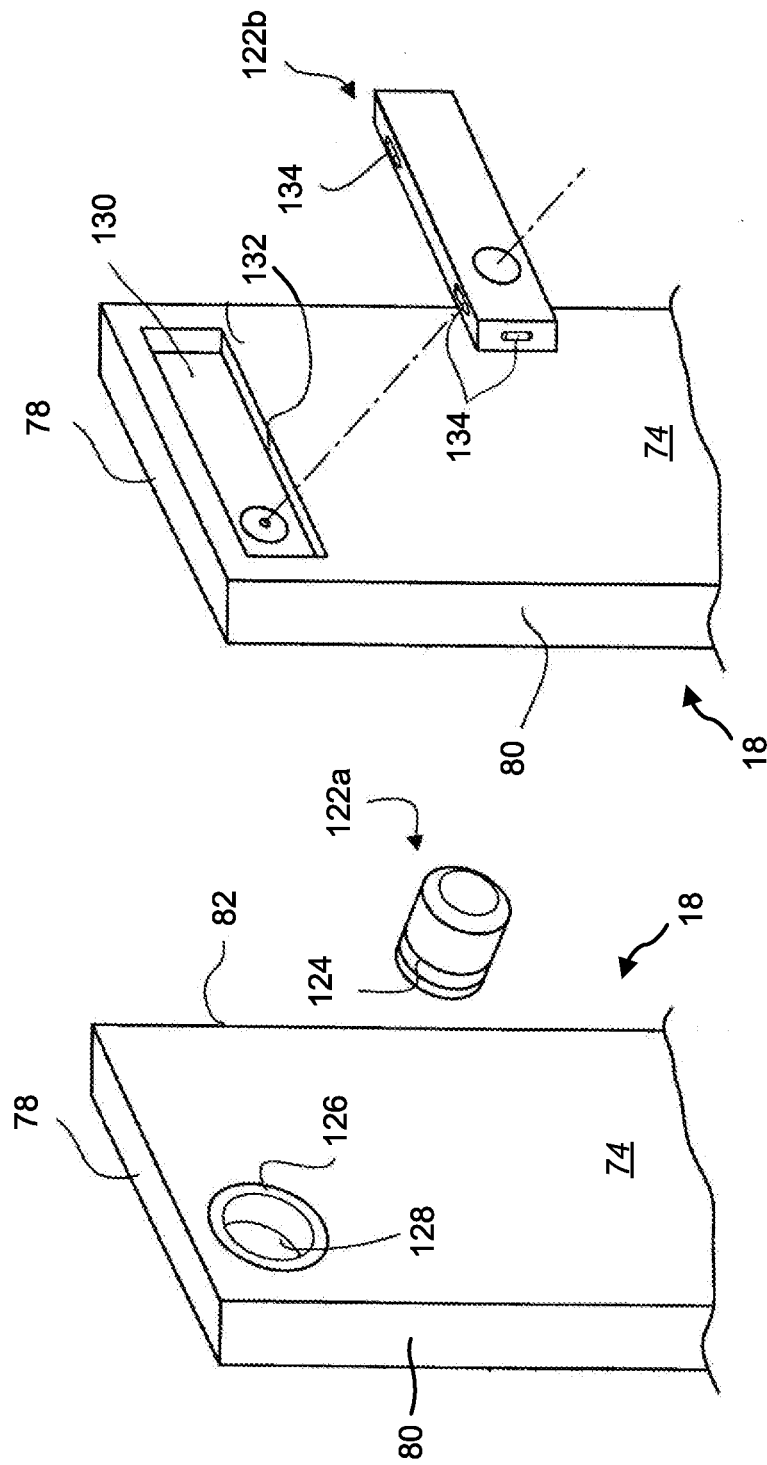

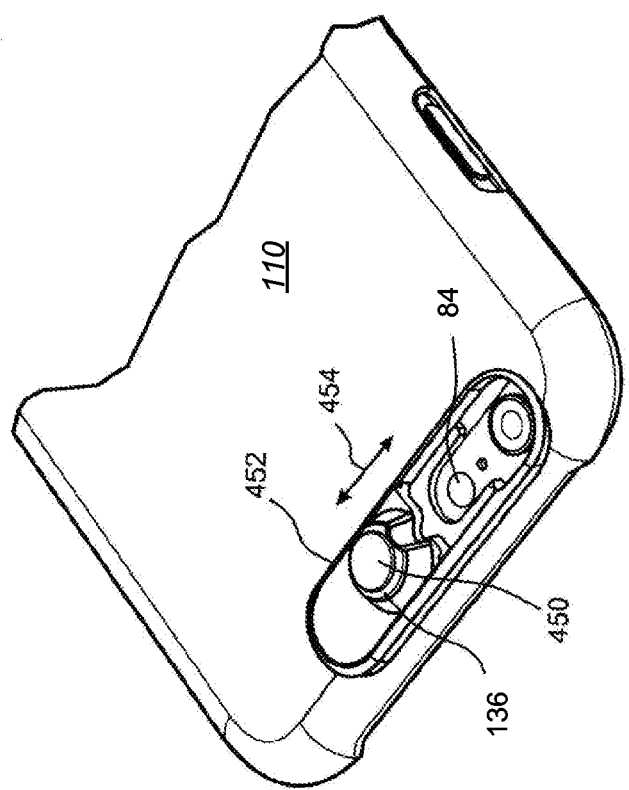
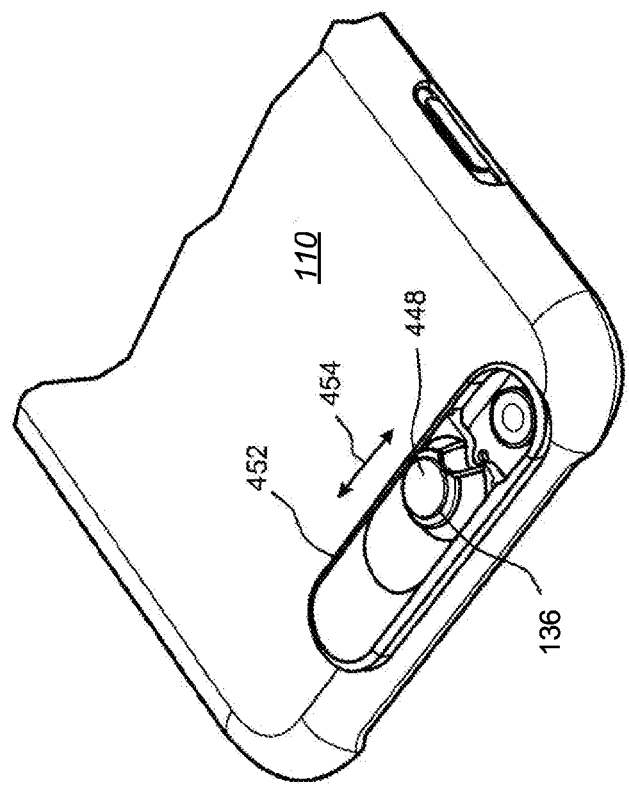
FIG. 12C
FIG. 12D

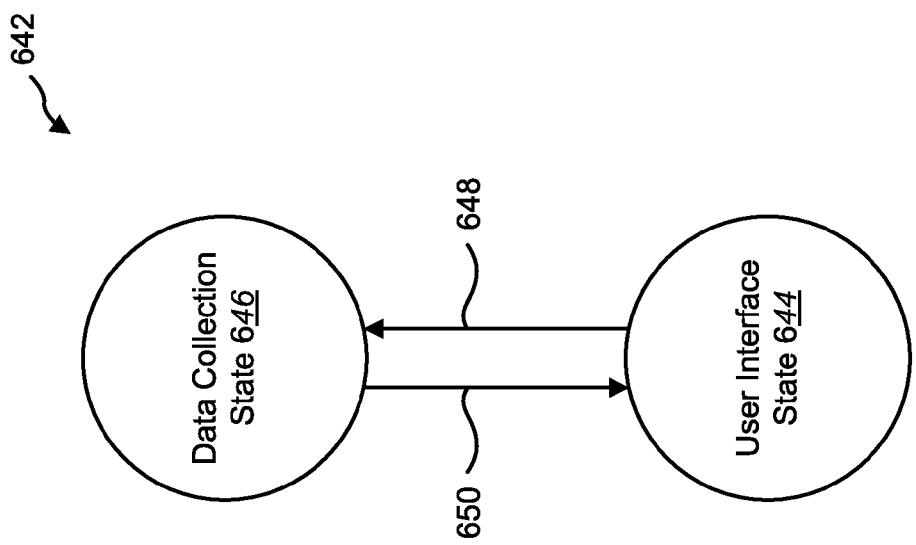

702 {
  License Key
    Symbologies: A, B, C ~ 708
    Lease Term: Date, Time ~ 710

704 {
  License Key
    Symbology: A ~ 712a
      Qty.: Unlimited ~ 714a
    Symbology: B ~ 712b
      Qty.: XX ~ 714b
    Symbology: C ~ 712c
      Qty.: XX ~ 714c
    Lease Term: Date, Time ~ 716

706 {
  License Key
    Symbology: A ~ 718a
      Term: Perpetual ~ 720a
      Qty.: Unlimited ~ 722a
    Symbology: B ~ 718b
      Term: Perpetual ~ 720b
      Qty.: XX ~ 722b
    Symbology: C ~ 718c
      Term: Date, Time ~ 720c
      Qty.: XX ~ 722c

FIG. 21

Group ID ~ 740

License ID ~ 742

Qty. Purchased : XX ~ 744

Qty. Used       : YY ~ 746

Qty. Remaining : ZZ ~ 748

Group ID ~ 750

License ID ~752a

Qty. Purchased : Unlimited ~754a

Qty. In Use     : N/A ~756a

Qty. Remaining : N/A ~758a

License ID ~752b

Qty. Purchased : XX ~754b

Qty. In Use     : YY

Qty. Remaining : ZZ

756b

758b

| ID | Expire |
|----|--------|
| 1  | MM/DD  |
| 2  | MM/DD  |
| 3  | MM/DD  |
| 4  | MM/DD  |
| 5  | MM/DD  |
| 6  | MM/DD  |
| 7  | MM/DD  |
| 8  | MM/DD  |

FIG. 22C

BARCODE-READING SYSTEM

RELATED APPLICATIONS

This application is a continuation-in-part of U.S. patent application Ser. No. 14/799,464, filed Jul. 14, 2015, and entitled "A BARCODE-READING SYSTEM". This application is also a continuation-in-part of U.S. patent application Ser. No. 14/510,341, filed Oct. 9, 2014, and entitled "DIFFUSE BRIGHT FIELD ILLUMINATION SYSTEM FOR A BARCODE READER". This application is also a continuation-in-part of U.S. patent application Ser. No. 14/717,112, filed May 20, 2015, and entitled, "BARCODE READER". This application is also a continuation-in-part of U.S. patent application Ser. No. 14/581,821, filed Dec. 23, 2014, and entitled "BARCODE-READING ENHANCEMENT SYSTEM FOR A COMPUTING DEVICE THAT COMPRISES A CAMERA AND AN ILLUMINATION SYSTEM". This application is also related to U.S. patent application Ser. No. 14/319,193, filed Jun. 30, 2014, and entitled "BARCODE READING SYSTEM INCLUDING A SLED READER AND RELAY APPLICATION". All of the foregoing are incorporated by reference as though set forth herein in their entirety.

BACKGROUND

Smartphones and other types of portable, hand-held computing devices, such as tablet computers, are in widespread use today, most often in connection with entertainment, communications and office productivity. Most smartphones include a camera, and applications have been developed for using the camera to read barcodes. In a typical known application an image feed from the camera is displayed on the display screen of the smartphone.

SUMMARY

This patent specification relates generally to the operation of a mobile device having barcode-reading capabilities and the operation of an application and license server. More specifically, this patent specification describes a method and a system for a mobile device wherein the mobile device may access a license server to obtain a license for the operation of a barcode-reading application installed in the mobile device. Once a license is obtained, the mobile device may operate the barcode-reading application without limitation or with certain restrictions specified by the license.

In accordance with one embodiment, a mobile device for reading barcodes is provided. The mobile device may include a camera assembly for capturing an image of a barcode, a network interface for establishing a connection to a network, a memory, and a processor for executing a barcode-reading application stored in the memory. The barcode-reading application may be configured to operate in a base mode or an enhanced mode. In the base mode of operation, the barcode-reading application may be configured to control the network interface to establish a network connection to a licensing server and obtain a license code from the licensing server, subject the license code to a predetermined algorithm and determine at least one operating permission authorized by the license code, and enable an enhanced mode of operation. In the enhanced mode of operation, the barcode-reading application may be configured to implement at least one enhanced barcode-reading function which corresponds to the at least one operating permission authorized by the license code.

The at least one enhanced barcode-reading function may include a function of decoding a barcode symbology that the decoder is restricted from decoding in the base mode of operation. Alternatively or additionally, the at least one enhanced barcode-reading function may include a function of decoding multiple barcodes in sequence at a rate that is faster than a rate at which the barcode-reading application can decode multiple barcodes in sequence in the base mode of operation. Alternatively or additionally, the at least one enhanced barcode-reading function may include a function of decoding a quantity of barcodes of a particular symbology that exceeds a restricted quantity of barcodes of the particular symbology that the barcode-reading application can decode in the base mode of operation.

Alternatively or additionally, the at least one enhanced barcode-reading function may remove a demonstration restriction function under which the barcode-reading application functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device.

Alternatively or additionally, the at least one enhanced barcode-reading function may enable at least one enhanced image processing function that improves an ability to decode an image of a barcode and is not operable when the decoder operates in the base mode of operation.

The base mode of operation may include a base decoding mode of operation and a demonstration mode of operation. In the base decoding mode of operation, the barcode-reading application may be configured to drive the camera assembly to capture an image of a barcode, and apply base decoder functions to the image to identify a barcode symbology. If the barcode symbology is a base symbology, the barcode-reading application may decode the barcode and make decoded data available for further processing. If the barcode symbology is not the base symbology, the barcode-reading application may enter the demonstration mode of operation. In the demonstration mode of operation, the barcode-reading application may be configured to apply at least one enhanced barcode-reading function to decode the barcode, and perform at least one of outputting an indication of successful decoding of the barcode, or implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device.

The barcode-reading application may be further configured to perform an upgrade function in the demonstration mode of operation. The upgrade function may enable user selection of a function to obtain the license code, establish a network connection to the licensing server, and obtain the license code from the licensing server based on the user selection.

In order to obtain the license code from the licensing server, the barcode-reading application may be further configured to communicate to the licensing server one of: i) a unique identification code of the mobile device, or ii) a user identification code identifying a controller of the mobile device. The controller may be an individual user or an organization.

In accordance with another embodiment, a barcode-reading application for a mobile device embodied on a computer-readable medium is disclosed. The mobile device comprises a camera assembly, a network interface, a memory, and a processor for executing the barcode-reading application including a decoder. The barcode-reading application may include instructions executable by the processor for controlling the camera assembly to capture an image of a barcode, decoding the image of the barcode to generate decoded data, and processing the decoded data. The barcode-reading application may operate in a base mode or an enhanced mode. In the base mode of operation, the instructions may be configured to control the network interface to establish a network connection to a licensing server and obtain a license code from the licensing server, subject the license code to a predetermined algorithm and determine at least one operating permission authorized by the license code, and enable an enhanced mode of operation. In the enhanced mode of operation, the instructions may be configured to implement at least one enhanced barcode-reading function which corresponds to the at least one operating permission authorized by the license code.

In accordance with another embodiment, a barcode-reading system for a mobile device is disclosed. The barcode-reading system may include a barcode-reading enhancement accessory secured to the mobile device and a barcode-reading application stored in a memory of the mobile device and executable by a processor of the mobile device. The barcode-reading enhancement accessory may include at least one optic system that is positioned either within a field of illumination of a light source of the mobile device for modifying the field of illumination projected by the light source or within a field of view of a camera of the mobile device for modifying illumination reflected from objects within the field of view of the camera.

The barcode-reading application may be configured to operate in a base mode or an enhanced mode. In the base mode of operation, the barcode-reading application may be configured to control a network interface of the mobile device to establish a network connection to a licensing server and obtain a license code from the licensing server, subject the license code to a predetermined algorithm and determine at least one operating permission authorized by the license code, and enable an enhanced mode of operation. In the enhanced mode of operation, the barcode-reading application may be configured to implement at least one enhanced barcode-reading function which corresponds to the at least one operating permission authorized by the license code.

In accordance with another embodiment, a mobile device for reading barcodes is disclosed. The mobile device may include a camera assembly for capturing an image of a barcode, a memory, and a processor for executing an operating system and a decoder application stored in the memory. The decoder application may be configured to control the camera assembly to capture an image of a barcode, the image of the barcode being affected by at least one optic system of the camera assembly; utilize a base decoder function for attempting to decode a barcode if an enhanced decoder mode has not been authorized for the mobile device; and utilize an enhanced decoder function for attempting to decode the barcode if the enhanced decoder mode has been authorized for the mobile device.

The enhanced decoder function may include a function of decoding a barcode symbology that the decoder application is restricted from decoding if the enhanced decoder mode has not been authorized for the mobile device. Alternatively or additionally, the enhanced decoder function may include a function of decoding multiple barcodes in sequence at a rate that is faster than a restricted rate at which the decoder application can decode a sequence of multiple barcodes if the enhanced decoder mode has not been authorized for the mobile device. Alternatively or additionally, the enhanced decoder function may include a function of decoding a quantity of barcodes of a particular symbology that exceeds a restricted quantity of barcodes of the particular symbology which the decoder application can decode if the enhanced decoder mode has not been authorized for the mobile device.

Alternatively or additionally, the enhanced decoder function may include removing a demonstration restriction function under which the decoder application functions when the enhanced decoder mode has not been authorized for the mobile device, thereby making decoded data from a barcode of a particular symbology available for further processing by an application executing on the mobile device. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device, or iii) a function which restricts the decoded data or the scrambled decoded data from a barcode of at least one particular symbology from being displayed on a display screen of the mobile device.

Alternatively or additionally, the enhanced decoder function may include enabling at least one enhanced image processing function which improves an ability to decode an image of a barcode and is not operable if the enhanced decoder mode has not been authorized for the mobile device.

The enhanced decoder mode may be authorized by obtaining a license code from a licensing server.

The decoder application may be configured to subject the license code to a predetermined algorithm to determine at least one operating permission authorized by the license code, wherein the enhanced decoder function corresponds to the at least one operating permission authorized by the license code. The processor may be further configured to obtain the license code from the licensing server by communicating to the licensing server one of: i) a unique identification code of the mobile device, or ii) a user identification code identifying a controller of the mobile device.

In accordance with another embodiment, a barcode-reading application for a mobile device is disclosed. The barcode-reading application may include a decoder, and the mobile device comprises a camera, a memory, and a processor for executing an operating system and the barcode-reading application stored in the memory. The barcode-reading application may include instructions to drive the camera to capture an image of a barcode symbology, instructions to apply base decoder functions of the decoder to decode the barcode symbology if an enhanced decoder mode has not been authorized for the mobile device, and instructions to apply at least one enhanced decoder function of the decoder to decode the barcode symbology if the enhanced decoder mode has been enabled.

In accordance with another embodiment, a barcode-reading system for a mobile device is disclosed. The barcode-reading system may include a barcode-reading enhancement accessory secured to the mobile device and a barcode-reading application stored in a memory of the mobile device and executable by a processor of the mobile device. The barcode-reading enhancement accessory may include at least one optic system that is positioned either within a field of illumination of a white light source of the mobile device for modifying the field of illumination projected by the white light source or within a field of view of a camera of the mobile device for modifying illumination reflected from objects within the field of view of the camera. The barcode-reading application may include an image capture function for controlling the white light source and the camera to capture an image of a barcode, the image of the barcode being affected by the at least one optic system; a base decoder function for decoding a barcode in a base mode of operation if an enhanced decoder mode has not been authorized; and an enhanced decoder function for decoding a barcode in an enhanced mode of operation if the enhanced decoder mode has been authorized.

In accordance with another embodiment, a non-transitory computer-readable medium for storing instructions for a barcode-reading application for a mobile device is disclosed. The mobile device comprises a camera assembly, a network interface, a memory, and a processor for executing the barcode-reading application including a decoder. The non-transitory computer-readable medium may include a code for controlling the camera assembly to capture an image of a barcode, decoding the image of the barcode to generate decoded data, and processing the decoded data; a code for controlling the network interface to establish a network connection to a licensing server and obtaining a license code from the licensing server when in the base mode of operation; a code for subjecting the license code to a predetermined algorithm and determining at least one operating permission authorized by the license code; a code for enabling an enhanced mode of operation; and a code for implementing at least one enhanced barcode-reading function which corresponds to the at least one operating permission authorized by the license code when in the enhanced mode of operation.

In accordance with another embodiment, a method for operating a barcode-reading application is disclosed. The method may include accessing an application server for downloading a barcode-reading application for a mobile computing device, installing the barcode-reading application in the mobile computing device, accessing a licensing server to retrieve a license key for the barcode-reading application, retrieving the license key, and operating the barcode-reading application for reading and decoding a barcode.

In accordance with another embodiment, a method for operating a licensing server is disclosed. The method may include receiving a license key request for a barcode-reading application from a mobile computing device, wherein the barcode-reading application does not operate or does operate with limited functions without a license key; checking if a license is available for the mobile computing device; generating a license key on a condition that the license is available for the mobile computing device; sending the license key to the mobile computing device; and updating a database.

In accordance with another embodiment, a mobile computing device is disclosed. The mobile computing device may include a camera assembly for capturing an image of a barcode, a memory for storing a barcode-reading application and a license key, a processor for executing instructions embodied in the barcode-reading application including a decoder to read and decode the barcode, and a communication interface for downloading the barcode-reading application from an application server and retrieving the license key for the barcode-reading application from a license server.

In accordance with another embodiment, a server is disclosed. The server may include a communication interface for communicating with a mobile computing device; a memory for storing a database; and a processor configured to receive from the mobile computing device a license key request for a barcode-reading application running on the mobile computing device, check if a license is available for the mobile computing device, generate a license key on a condition that the license is available for the mobile computing device, send the license key to the mobile computing device, and update the database. The barcode-reading application may not operate or may operate with limited functions without the license key.

In accordance with another embodiment, a barcode-reading system is disclosed. The barcode-reading system may include a camera assembly for capturing an image of a barcode presented in a field of view of a camera of the camera assembly, a processor for running a barcode-reading application including a decoder to read and decode the barcode, and a communication interface for accessing a network to download the barcode-reading application and retrieve a license key for the barcode-reading application. The barcode-reading application may operate in a first state without the license key and in a second state with the license key such that at least one function of the barcode-reading application is disabled in the first state.

In accordance with another embodiment, a barcode-reading system is disclosed. The barcode-reading system includes a mobile computing device capable of capturing an image of a barcode and decoding the barcode, and an accessory attached to the mobile computing device for enhancing a barcode-reading capability of the mobile computing device. The mobile computing device may include a processor for running a barcode-reading application. The barcode-reading application may operate in a first state before a valid license key for the barcode-reading application is obtained and in a second state after the valid license key is obtained. At least one function of the barcode-reading application may be disabled in the first state.

In accordance with another embodiment, a mobile computing device is disclosed. The mobile computing device includes an optic system for capturing an image of a barcode, and a processor for running a barcode-reading application for controlling the optic system and decoding the barcode captured by the optic system. The barcode-reading application may operate in a first state if the mobile computing device does not have a valid license key for the barcode-reading application and in a second state if the mobile computing device has the valid license key for the barcode-reading application. At least one function of the barcode-reading application may be restricted in the first state.

In accordance with another embodiment, a device for barcode reading is disclosed. The device includes an optic system for capturing an image of a barcode; a non-transitory computer-readable medium including a license key and instructions for controlling the optic system, decoding the barcode captured by the optic system to generate decoded data, and processing the decoded data; and a processor for executing the instructions. The device may operate in a first state without a valid license key and in a second state with a valid license key. At least one function of the instructions may be restricted in the first state.

BRIEF DESCRIPTION OF THE DRAWINGS

FIGS. 2B and 2C show a back side surface and a face surface of an exemplary mobile device that may be used in the barcode-reading system.

FIG. 2D shows an exemplary tip/ring/ring/sleeve (TRRS) connector.

FIG. 2E shows an image output format.

FIGS. 4A and 4B illustrate an exemplary corner-positioned attachment useful in a barcode-reading enhancement system.

FIGS. 6A and 6B illustrate an exemplary mounted attachment useful in a barcode-reading enhancement system.

FIGS. 12A-12D illustrate an exemplary attachment for a barcode-reading enhancement system which includes a target-generating mechanism.

FIG. 17 illustrates an exemplary state machine useful for an application for a barcode-reading enhancement system.

FIG. 21 shows examples of a data structure of a license key in accordance with some embodiments.

FIG. 22C depicts an exemplary database for recording pre-paid licenses that may have been purchased by an individual, organization, company or other group of users.

DETAILED DESCRIPTION

Figure 1:
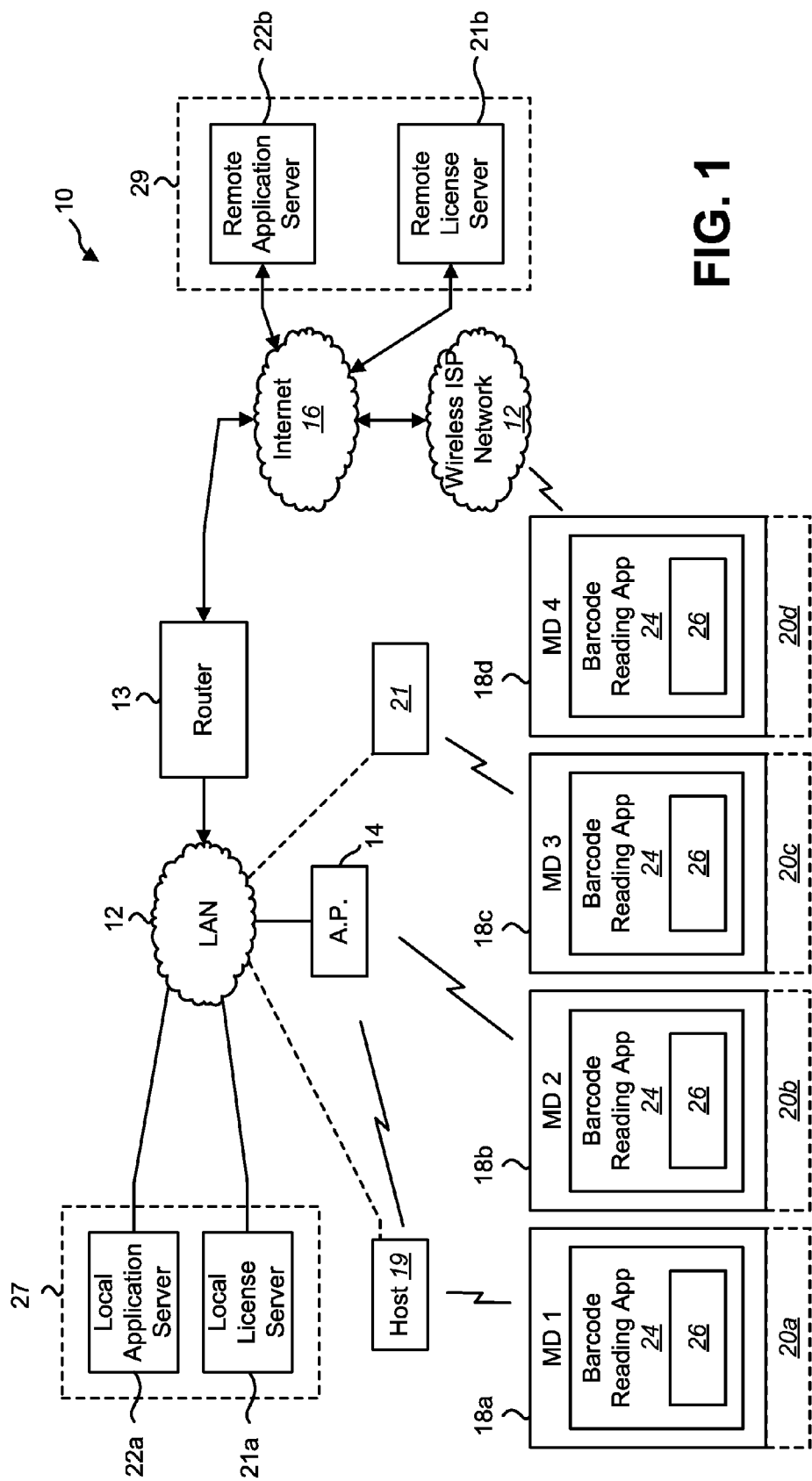
FIG. 1 illustrates an example of a barcode-reading system.

FIG. 1 depicts a system 10 according to one embodiment of the present application wherein mobile devices 18a-18d obtain: i) at least one barcode-reading application 24 from an application server 22a or 22b; and ii) obtain licensing (e.g., a license key 26) necessary for the operation of the at least one barcode-reading application 24 on the mobile devices 18a-18d from a licensing server 21a or 21b.

As used in this patent specification and the accompanying claims, the term "mobile device" will be used to describe a portable, hand-held computing device that comprises a camera. As indicated above, one example of a mobile device is a smartphone. Another example of a mobile device is a tablet computer. Yet another example is a hybrid tablet/smartphone device, often nicknamed a "phablet."

The application server may be, for example, a local application server 22a or a remote application server 22b. Similarly, the license server may be a local license server 21a or a remote license server 21b. The application server and the license server may operate on distinct hardware or may operate on the same hardware server. For example, the local application server 22a and the local license server 21a may operate on the same hardware server 27 or on distinct hardware servers, each coupled to a local area network (LAN) 12. Similarly, the remote application server 22b and the remote license server 21b may operate on the same hardware server 29 or on distinct hardware servers, each coupled to the Internet 16.

The system 10 may include a LAN 12 to which each of the local application server 22a and the local license server 21a are connected. The LAN 12 may further include at least one wireless access point 14 enabling LAN communications with mobile devices (for example, mobile devices 18b and 18c) as well as other computing systems such as a host computer 19 and/or a charging station 21 (e.g. a station for providing power to the mobile device 18 for charging its battery).

The LAN 12 may be coupled to the Internet 16 via a router 13. Although FIG. 1 depicts the LAN 12 coupled to the Internet 16 via a single router 13, such connections may employ multiple routers and firewall systems, including demilitarized zone (DMZ) networks.

Figure 2A:
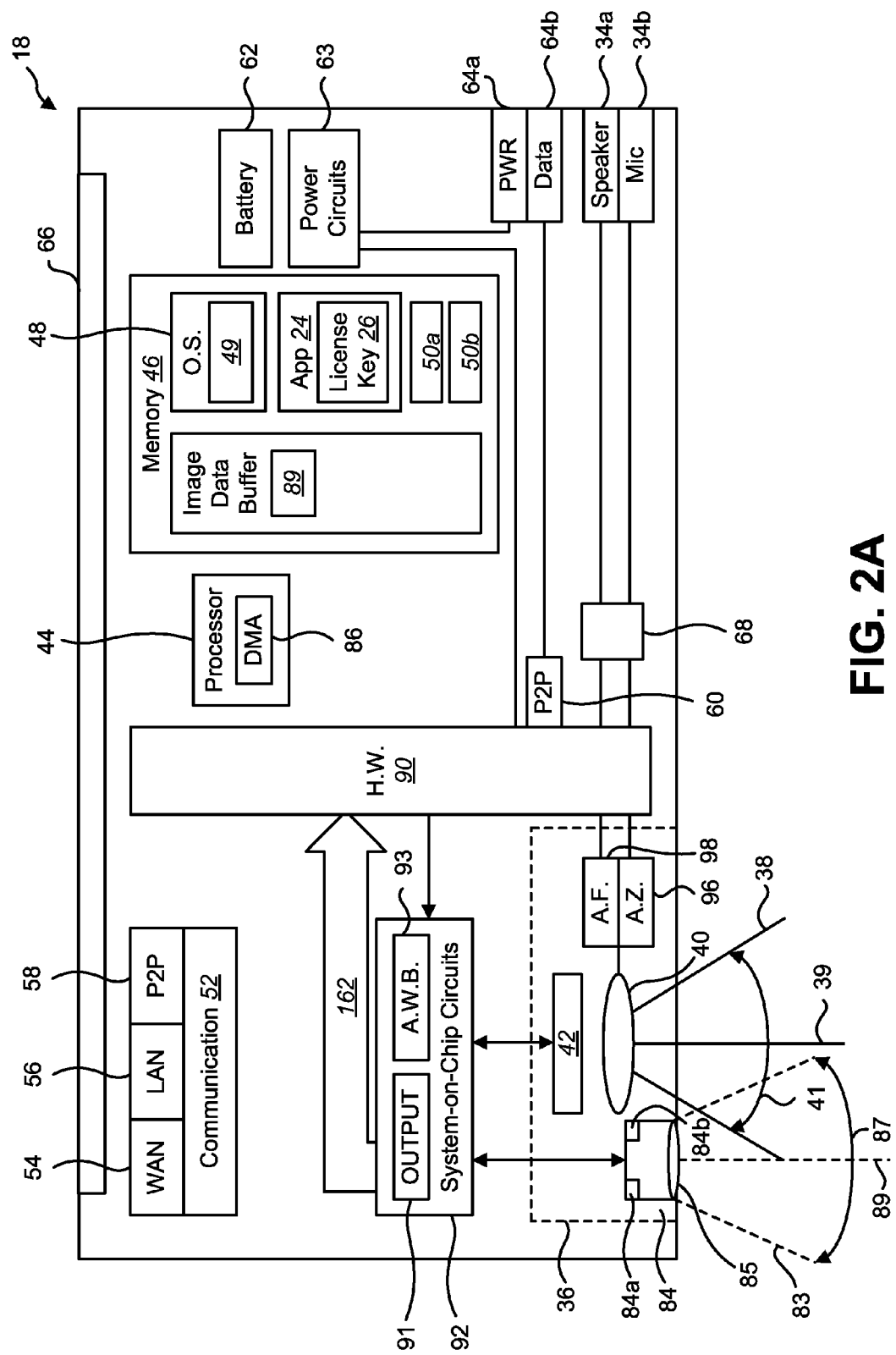
FIG. 2A is a block diagram of an exemplary mobile device useful in a barcode-reading system.

Referring to FIG. 2A in conjunction with FIG. 1, each of the mobile devices 18a-18d may include a wireless communication system 52 for operating within a wireless network environment. The wireless communication system 52 may comprise any permutation of: i) a local area network (LAN) communications module 56, ii) a wide area network (WAN) communications module 54, and/or iii) a wireless point-to-point communication interface 58.

The LAN communications module 56 may utilize Wi-Fi™ (IEEE 802.11) or similar wireless local area communication protocols for communication with a wireless access point 14 of a wireless portion of a LAN 12, such that the mobile device itself may be an addressable endpoint on the LAN 12, i.e., the mobile device may be assigned an IP address and may be capable of IP communications with other devices over the LAN 12 using IP protocols such as Transmission Connection Protocol (TCP), Uniform Datagram Protocol (UDP), etc. The wireless access point 14 and the LAN communications module 56 may function in accordance with any known wireless communications protocol, including but not limited to the IEEE 802.11 standards, which are sometimes referred to as Wi-Fi™ As will be discussed in more detail, a mobile device, 18*b* for example, utilizing its LAN communications module 56 may obtain at least one barcode-reading application 24 from an application server 22*a* or 22*b* and its license key from a license server 21*a* or 21*b* via the LAN 12 and, as applicable, the Internet 16.

The WAN communications module 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN communications module 54 may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the mobile device such that the mobile device may be capable of IP communications with other devices over the wireless ISP network 17 using IP protocols such as TCP, UDP, or the like.

Remote devices (e.g., devices coupled to the Internet 16) may be logically connected to the LAN 12 using a Virtual Private Network (VPN) technology. As such, a mobile device, 18*d* for example, coupled to communicate with the wireless ISP network 17 utilizing its WAN communications module 54 may, utilizing a VPN technology, be an endpoint on the LAN 12. As such, a mobile device 18 may obtain at least one barcode-reading application 24 from the remote application server 22*b* (or local application server 22*a* utilizing VPN technologies) and its license key 26 from the remote license server 21*b* (or the local license server 21*a* utilizing VPN technologies) via the wireless ISP network 17 and, as applicable, the Internet 16.

The wireless point-to-point communication interface 58 may form a wireless point-to-point communication link with another compatible system, such as a host computer 19 and/or charging station 21, utilizing Bluetooth® or similar wireless point-to-point communication protocols. The host computer 19 and/or charging station 21 in turn includes a wired and/or wireless LAN interface for communication with a switch (not shown) or the wireless access point 14 of the LAN 12 such that the host computer 19 may be an addressable endpoint on the LAN 12. As will be discussed in more detail, a mobile device, 18*a* or 18*c* for example, coupled to communicate with the host computer 19 utilizing its wireless point-to-point communication interface 58 may obtain at least one barcode-reading application 24 from an application server 22*a* or 22*b* and its license key 26 from a license server 21*a* or 21*b* via its point-to-point connection to the host computer 19 and/or charging station 21 which communicates with the servers via the LAN 12 and, as applicable the Internet 16.

FIGS. 2B and 2C illustrate a back surface and a face surface of an exemplary mobile device 18, respectively. Referring to FIGS. 2B and 2C, the mobile device 18 may comprise a housing 28 with a plurality of external surfaces such as a face surface 72 and a back surface 74 which is generally parallel to the face surface 72 and separated from the face surface 72 by four (4) edge surfaces (each orthogonal to, and extending about the perimeter of, both the face surface 72 and the back surface 74, including a bottom edge 76, a top edge 78 (which is parallel to the bottom edge 76), a right edge 80 and a left edge 82 (which is parallel to the right edge 80).

The face surface 72 may include a user interface such as a capacitive multi-touch display screen 66 (e.g., with a glass cover), which is shown in FIG. 2A, and may define the face surface 72 of the housing 28.

Referring to FIG. 2C, the nomenclature bottom edge 76, top edge 78, right edge 80, and left edge 82 have been chosen because they correspond to the bottom, top, right, and left sides of the display screen 66 of the face surface when the display screen 66 is operated in a portrait mode. Each of the right edge 80 and the left edge 82 may be of equal length and longer than each of the bottom edge 76 and the top edge 78 (which may also be of equal length).

Referring to FIG. 2A, the mobile device 18 may include a processor 44 and a memory 46. The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, the barcode-reading application 24, the license key 26, one or more other applications 50*a*, 50*b*, and a data buffer including an image data buffer 89. In operation, the processor 44 may execute instructions embodied in the operating system 48, the barcode-reading application 24, and each of the other applications 50*a*, 50*b*. Hardware circuits 90 interface the processor 44 with peripheral systems including, but not limited to, a (multi-touch) display screen 66, a wireless communication system 52, a hardwired point-to-point communication interface 60, an audio interface 68, a camera assembly 36, and a white light source 84 (e.g., an illuminator or a flash for utilizing the camera assembly 36 for photography).

The hardwired point-to-point communication interface 60 may utilize Universal Asynchronous Receiver/Transmitter (UART), Universal Serial Bus (USB), and similar communication protocols for communicating with a compatible system connected to a data connector 64b (which may be a part of a single power/data connector 64 such as a USB connector or an Apple® Lightning Connector®).

The audio interface 68 may include circuits for generating analog audio signals on a speaker connector 34a and receiving analog microphone input on a microphone connector 34b. The speaker connector 34a and the microphone connector 34b may be embodied as a single tip/ring/ring/sleeve (TRRS) connector typically referred to as a head-set connector. FIG. 2D shows an exemplary (female) TRRS connector. The TRRS connector includes four contacts: tip contact 71a, ring 1 contact 71b, ring 2 contact 71c, and sleeve contact 71d, along the side of recesses 69a, 69b, 69c, and 69d, which contact the corresponding contacts of the (male) TRRS connector of an audio jack when inserted within the recess. Typically the contacts are for left audio, right audio, microphone, and ground in the order of tip, ring 1, ring 2, and sleeve. A microphone input signal may be a potential difference between the ground contact (sleeve) and the microphone contact (ring 2) generated by a microphone coupled thereto.

Referring to FIG. 2A, the camera assembly 36 may include a (color) photo sensor 42 (i.e., an array of image sensors) positioned parallel to each of the face surface 72 and the back surface 74 and a lens assembly 40 with an optical axis 39 orthogonal to the photo sensor 42 and defining a center line of a camera field of view 38 extending outward from the back surface 74 of the mobile device 18. The photo sensor 42 may include one or more sensors such as charge-coupled display (CCD) sensors, complementary metal-oxide-semiconductor (CMOS) sensors, or the like.

The lens assembly 40 may receive light reflected from objects within the camera field of view 38. The camera field of view 38 may have an angular size 41 which may be the angle at which the camera field of view 38 spreads with respect to distance from the lens assembly 40. The lens assembly 40 may have a camera aperture size measured as an f-number which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The camera assembly 36 may further include an auto zoom module 96 and/or an autofocus module 98 which may serve to control an optical zoom setting and/or autofocus setting of the camera, respectively. Autofocus and auto zoom may be controlled by moving the position of at least one of the lenses making up the lens assembly 40 with respect to each other (or with respect to the photo sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general-purpose photography, and may therefore not be ideal for barcode capture and/or decoding. More specifically, in a barcode-reading application an operator expects to read and decode a barcode in less than 300 ms. The focus and zoom adjustment process may require significantly more time and therefore, if used, it would significantly delay the response time in a barcode-reading application.

If the camera lens assembly 40 is fixed (e.g., not adjusted for focus and zoom) at any particular focus and/or zoom setting for the lens assembly 40, the combination of the angular size 41 and the camera aperture size affect the camera depth of field (e.g., the range of distances at which a barcode of a particular modular size is imaged onto the photo sensor with sufficient size and sharpness for decoding). The angular size 41 affects the minimum distance at which a barcode of a certain overall size can be imaged onto the photo sensor 42.

The photo sensor 42 may be coupled to system-on-chip circuits 92 which include an output module 91 and an auto-white balance module 93. In one embodiment, the output module 91 may control the operation of the photo sensor 42 (e.g., exposure, gain, and coupling of pixels to analog-to-digital (A/D) converters for image read out), format the digital intensity values of each pixel of the photo sensor 42 for color image output, and make the color image output available for writing to the image data buffer 89.

In another embodiment, the output module 91 may perform image processing on images captured by the photo sensor 42. Control of the photo sensor 42 and image pre-processing which may be performed by the system on chip circuits 92 are described in more detail in U.S. patent application Ser. No. 14/717,112, entitled "BARCODE READER" and filed on May 20, 2015, which is hereby incorporated by reference in its entirety.

The auto-white balance module 93 may perform auto-white balance algorithms on the captured image to enhance the quality of color photographs captured by the photo sensor 42 under different illumination conditions. The digital image output 162 (which may be the color image or a result of processing the image one or more times in accordance with the teachings of U.S. patent application Ser. No. 14/717,112) may be written to the image data buffer 89. The mobile device 18 may include a direct memory access (DMA) system 86 which may be a part of the processor 44. The DMA 86 provides for direct writing of the digital image output 162 from the camera assembly 36 to the image data buffer 89.

The camera assembly 36 may further include a white light source 84. The white light source 84 may include one or more LEDs 84a, 84b controlled by the system-on-chip circuits 92.

In an exemplary embodiment, a first LED 84a may be a white LED. The color of a white LED is typically described using a Kelvin temperature scale with 1500° K representing a warm color "white," such as that of candlelight, and 9500° K representing a cool color "white," such as that of a blue sky. The exemplary white LED may be within this range. Alternatively, the exemplary white LED may have a color between 4000° K and 7000° K.

In the exemplary embodiment the second LED 84b may be an amber LED emitting illumination within the 600-615 nm range. Both the first LED 84a and the second LED 84b may be positioned behind a common optic 85 which directs illumination within a field of illumination 83 projecting away from the back surface 74 and having an illumination axis 88 perpendicular to the back surface 74 and an illumination angle 87 which substantially coincides with the field of view 38 of the camera assembly 36. In operation, the system-on-chip circuits 92 may control each LED 84a, 84b independently; and control the intensity of each LED 84a, 84b independently such that the color of the white illumination of the combined LEDs may be controlled by controlling the intensity of the amber LED with respect to the intensity of the white LED. If the intensity of the amber LED is higher, the white color of the combination will be warmer (lower Kelvin temperature). If the intensity of the amber LED is lower, the color approaches the Kelvin temperature of the white LED alone.

FIG. 2E shows two exemplary image output formats. The image output format from the photo sensor 42 (or from the output module 91 prior to any image processing as described in U.S. patent application Ser. No. 14/717,112) may be in either R.G.B. format 164 and/or Y.U.V format 166. The Y.U.V. format 166 may include, for each pixel, a luminous intensity 168 indicative of the overall intensity of light incident on the pixel during the exposure period, a first chromatic 170 representative of a first dimension of color of the light incident on the pixel during the exposure period, and a second chromatic 172 representative of a second dimension of color incident on the pixel during the exposure period.

The R.G.B. format 164 may include, for each pixel, a red intensity value 174 indicating the intensity of red light incident on the pixel during the exposure period, a green intensity value 176 indicating the intensity of green light incident on the pixel during the exposure period, and a blue intensity value 178 indicating the intensity of blue light incident on the pixel during the exposure period.

Returning to FIG. 2A, the mobile device 18 may further include a battery 62 and power circuits 63. In general the power circuits 63 control charging of the battery 62 from power received from an external power source via the power connector 64a and providing operating power at the voltage and current drawing requirements of the various components of the mobile device 18 from the power received from the battery 62 or the external power source (when connected to the external power source).

Referring to FIG. 2A in conjunction with FIG. 1, in an exemplary embodiment, the operating system 48 may include an application retrieval system 49 which obtains the barcode-reading application 24 and the applications 50a, 50b from the application server 22a or 22b. In one embodiment, the operation of the application retrieval system 49, which may obtain the barcode-reading application 24 and the other applications 50a, 50b from the application server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application server 22a or 22b.

Figure 3A:
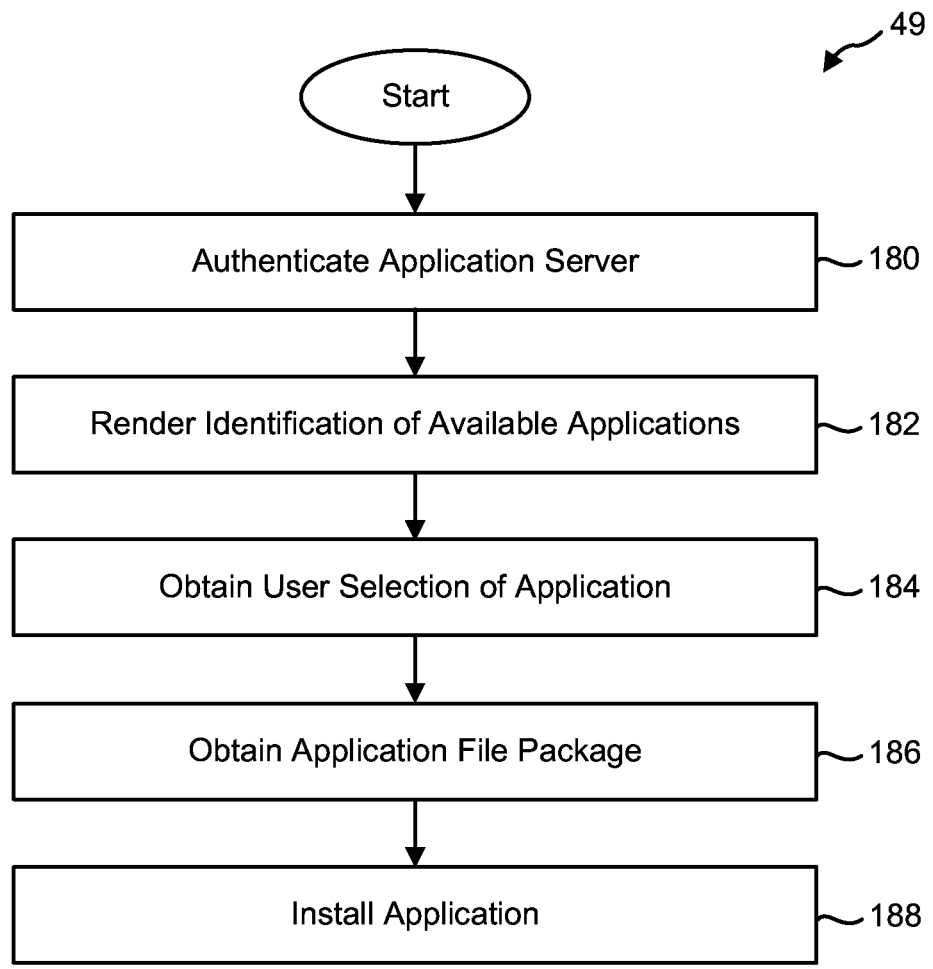
FIG. 3A is a flow diagram of an exemplary process for an operation of an application retrieval system.

FIG. 3A is a flow diagram of an exemplary process for the operation of the application retrieval system 49. Step 180 represents the application retrieval system 49 of the mobile device 18 establishing a secure connection to the application server 22a or 22b over the LAN 12, the wireless ISP network 17 and/or the Internet 16 and authenticating the application server 22a, 22b (i.e., mutual authentication between the mobile device and the application server). The mutual authentication may be established by using any conventional authentication protocol.

Step 182 represents rendering, on the display screen 66 of the mobile device 18, identification of applications which are available to the mobile device 18 for downloading. Step 184 represents obtaining user selection of an application to download.

Step 186 represents obtaining an application file package (e.g., an install package) from the application server 22a or 22b. The application file package may be temporarily stored in the memory 46 of the mobile device 18.

Step 188 represents installing the application. The installation process may include un-packing the install package and writing an executable application 50 to the memory 46.

Figure 3B:
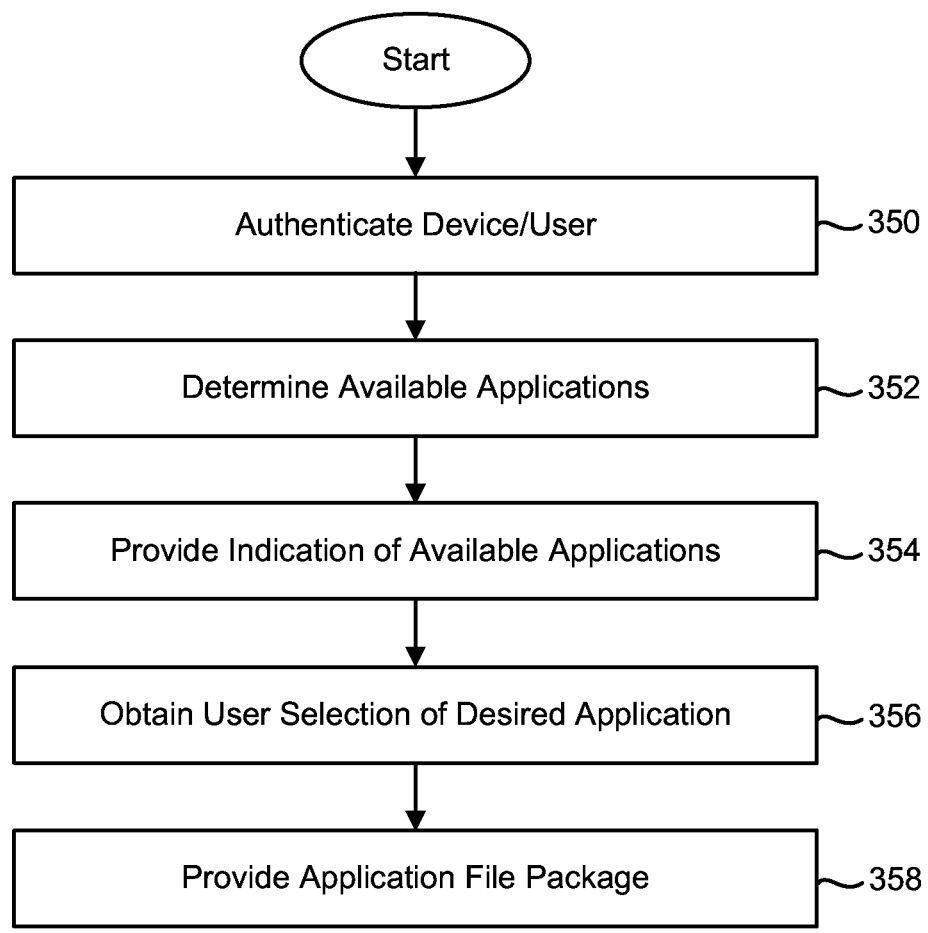
FIG. 3B is a flow diagram depicting an exemplary process for an operation of an application server.

FIG. 3B is a flow diagram depicting an exemplary process for operation of an application server 22a, 22b. Step 350 represents the application server 22a, 22b establishing a secure connection with the mobile device 18 over the LAN 12, the wireless ISP network 17, and/or the Internet 16 and authenticating the mobile device 18 and/or the user of the mobile device 18. Authenticating the user of the mobile device 18 may include: i) authenticating the individual to which the mobile device 18 is assigned or the individual using the mobile device 18, utilizing a combination of a user ID and a password or similar schemes for authenticating an individual, and/or ii) authenticating an organization, company, or other group of users to which the mobile device 18 is assigned, utilizing a combination of a user ID and a password or other similar schemes for identifying whether the mobile device 18 has been assigned to the organization, company, or group and authenticating the assignment. The user ID may be unique to each mobile device 18 or common for all mobile devices 18 assigned to the organization, company, or group.

Step 352 represents the application server 22a, 22b determining a plurality of one or more applications (the barcode-reading application 24, applications 50a, 50b, etc.) available for download based on the individual, organization, company, or other group to which the mobile device 18 is assigned.

Figure 3C:
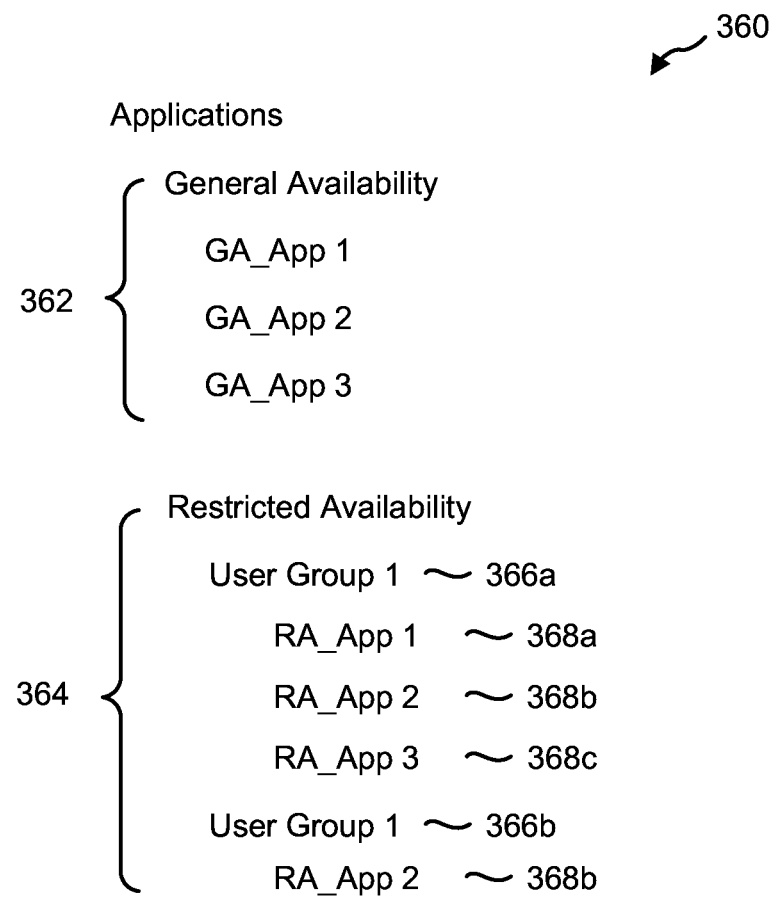
FIG. 3C shows an exemplary structure of a database of applications for downloading.

Turning briefly to FIG. 3C, the application server 22a, 22b may contain, or have access to, a database 360 which identifies generally available applications 362 which are available to any mobile device 18 without regard to the identification of the user, organization, company, or group to which the mobile device 18 is assigned; and restricted applications 364 which are available only to certain individuals, organizations, companies, and groups. For restricted applications 364, the database 360 may associate each user group 366a, 366b with identification of those restricted applications 368 available to that user group 366a, 366b. Each user group may be an individual, organization, company, or other group. For example, user group 1 366a may have access to restricted applications 368a, 368b, and 368c, and user group 2 366b may have access to restricted application 368b. In each case these restricted applications may be applications written custom for the user group (and therefore are not made available to other user groups) or may be licensed to the user group (and therefore made available to those user groups which obtained a license for the application).

Returning to FIG. 3B, step 354 represents the application server 22a, 22b providing an indication of the available applications to the mobile device 18. The available applications may include any of the generally available applications 362 and/or the restricted applications 364. The indication of the available applications may include, for each application, a display screen icon representing the application. The indication of available applications may not include all available applications but may include only those available applications within parameters established by the user, for example available applications which meet search criteria provided by the user. As such, step 354 may include making a search function available to the mobile device 18, obtaining search criteria or search terms from the user of the mobile device 18, and selecting matching applications that meet the search criteria from the applications available to the individual, organization, company, or group.

Step 356 represents the application server 22a, 22b obtaining a user selection of a desired application. The desired application may be one of the available applications indicated to the user at step 354.

Step 358 represents the application server 22a, 22b providing an application file package for the desired application to the mobile device 18. The application file package may be provided to the application retrieval system 49 of the mobile device 18 which is provided for writing the file package to a non-volatile memory and unpacking and loading the contents of the file package to generate instructions which, when loaded to a memory, may be executed by the processor 44.

Certain applications such as the barcode-reading application 24 may: i) require a license key from a license server 21a, 21b to enable operation of the application, ii) operate in a base mode of operation without a license key but require a license key from a license server 21a, 21b to enable at least one enhanced function to operate in an enhanced mode of operation, and/or iii) require a license key from a license server 21a, 21b to continue operating, or continue operating in the enhanced mode of operation, following the passage of time or following a threshold level of usage based on the time and/or the quantity of instances with which certain functions were performed (such as the quantity of decoding a barcode of a certain symbology or symbologies).

The at least one enhanced function may be a function of decoding a barcode symbology that the barcode-reading application 24 (e.g., the decoder) is restricted from decoding in the base mode of operation. Alternatively or additionally, the at least one enhanced function may be a function of decoding multiple barcodes in sequence at a rate that is faster than a rate at which the barcode-reading application 24 (e.g., the decoder) can decode multiple barcodes in sequence in the base mode of operation. Alternatively or additionally, the at least one enhanced function may be a function of decoding a quantity of barcodes of a particular symbology that exceeds a restricted threshold quantity of barcodes of the particular symbology that the barcode-reading application 24 (e.g., the decoder) can decode in the base mode of operation.

Alternatively or additionally, the at least one enhanced function may remove a demonstration restriction function (i.e., a demonstration factor that makes output of decoded data useful for demonstration purposes only) under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced function may enable at least one enhanced image processing function that improves an ability to decode an image of a barcode and is not operable when the decoder operates in the base mode of operation. The enhanced image processing function may include preforming additional image processing algorithms which alter the image captured by the camera assembly 36 prior to execution of the algorithms which attempt to decode a barcode depicted within the image.

In accordance with another embodiment, the base mode of operation may include a base decoding mode of operation and a demonstration mode of operation. In the base decoding mode of operation, the barcode-reading application 24 may drive the camera assembly 36 to capture an image of a barcode and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology.

In the demonstration mode of operation, the barcode-reading application 24 may apply at least one enhanced barcode-reading function to decode the barcode, and perform at least one of: i) outputting an indication of successful decoding of the barcode, or ii) implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device 18.

The barcode-reading application 24 may perform an upgrade function in the demonstration mode of operation. The upgrade function may enable user selection to obtain the license code, obtain the license code based on the user selection, establish a network connection to the licensing server 21a, 21b, and obtain the license code from the licensing server 21a, 21b.

In order to obtain the license code from the licensing server 21a, 21b, the barcode-reading application 24 may communicate to the licensing server 21a, 21b one of: i) a unique identification code of the mobile device 18, or ii) a user identification code identifying a controller of the mobile device 18.

In accordance with another embodiment, the barcode-reading application 24 (e.g., a decoder application) running on the processor 44 of the mobile device 18 may be configured to control the camera assembly 36 of the mobile device 18 to capture an image of a barcode. The image of the barcode may be affected by at least one optic system of the camera assembly 36. The decoder application may utilize a base decoder function for attempting to decode a barcode if an enhanced decoder mode has not been authorized for the mobile device 18, and utilize an enhanced decoder function for attempting to decode the barcode if the enhanced decoder mode has been authorized for the mobile device 18.

The enhanced decoder function may include a function of decoding a barcode symbology that the decoder application is restricted from decoding if the enhanced decoder mode has not been authorized for the mobile device 18. Alternatively or additionally, the enhanced decoder function may include a function of decoding multiple barcodes in sequence at a rate that is faster than a restricted rate at which the decoder application can decode a sequence of multiple barcodes if the enhanced decoder mode has not been authorized for the mobile device 18. Alternatively or additionally, the enhanced decoder function may include a function of decoding a quantity of barcodes of a particular symbology that exceeds a restricted quantity of barcodes of the particular symbology which the decoder application can decode if the enhanced decoder mode has not been authorized for the mobile device 18. Alternatively or additionally, the enhanced decoder function may remove a demonstration restriction function (i.e., a demonstration factor that makes output of decoded data useful for demonstration purposes) under which the decoder application functions when the enhanced decoder mode has not been authorized for the mobile device 18, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device 18, or iii) a function which restricts the decoded data or the scrambled decoded data from a barcode of at least one particular symbology from being displayed on a display screen of the mobile device 18. Alternatively or additionally, the enhanced decoder function may enable at least one enhanced image processing function which improves an ability to decode an image of a barcode and is not operable if the enhanced decoder mode has not been authorized for the mobile device 18. The enhanced decoder mode may be authorized by obtaining a license code from a licensing server 21a, 21b.

The decoder application may be configured to subject the license code to a predetermined algorithm to determine at least one operating permission authorized by the license code. The enhanced decoder function may correspond to the at least one operating permission authorized by the license code. The decoder application or any other application may be further configured to obtain the license code from the licensing server 21a, 21b by communicating to the licensing server one of: i) a unique identification code of the mobile device 18, or ii) a user identification code identifying a controller of the mobile device 18.

The barcode-reading application 24 (and the decoder application) disclosed above may be embodied on a computer-readable medium. The barcode-reading application 24 (and the decoder application) includes instructions executable by the processor 44 of the mobile device 18 for performing the functions disclosed above.

Figures 20A, 20B:
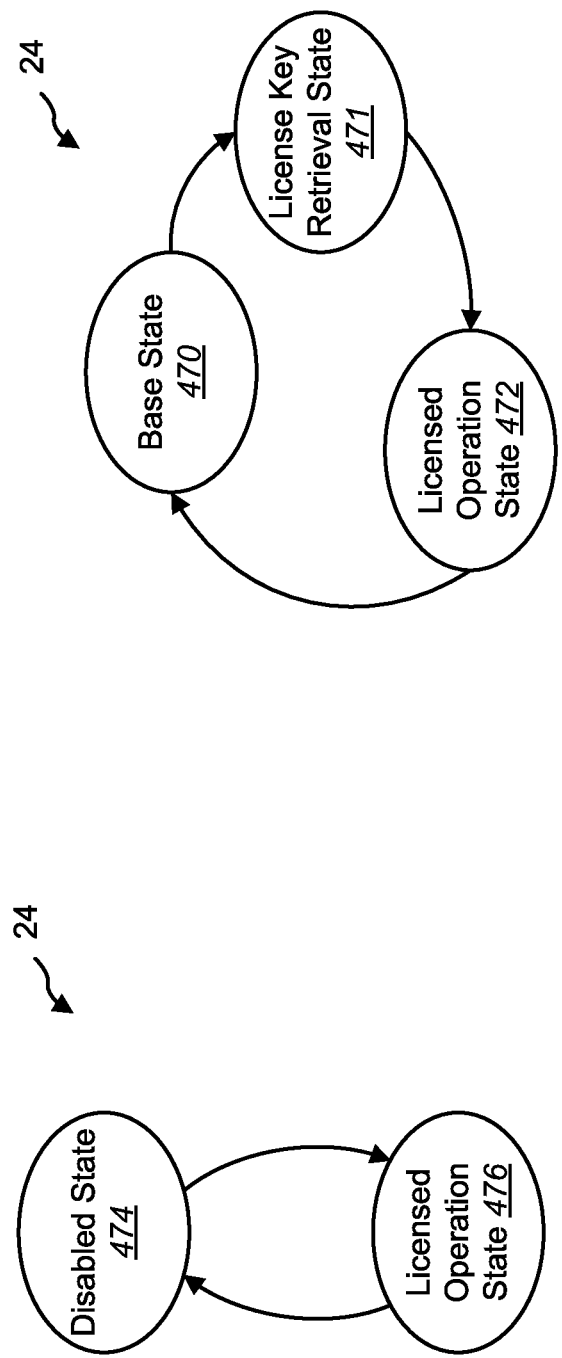
FIG. 20A is a state machine diagram depicting two states of operation in a barcode-reading application in accordance with one embodiment.
FIG. 20B is a state machine diagram depicting three states of operation in a barcode-reading application in accordance with another embodiment.

FIG. 20A is a state machine diagram depicting two states of operation in a barcode-reading application 24 in accordance with one embodiment. The first state of operation may be a disabled state 474 (which may also be referred to as a base state). In the disabled state 474, at least one function of the barcode-reading application 24 is disabled such that the barcode-reading application 24 may not output useful decoded data for further processing or transmission by the barcode-reading application 24 but may be capable of connecting to a licensing server 21a, 21b to obtain a license to transition the barcode-reading application 24 to a licensed operation state 476 (which may also be referred to as an enhanced operation state). The at least one function that may be disabled includes: i) an image capture function which, if enabled, would enable capturing an image of a barcode for image processing and decoding, ii) a decoding function which, if an image of a barcode is captured, would decode the image of the barcode to generate decoded data, iii) a data processing function which, if decoded data is generated, would process the decoded data as part of a useful workflow, and/or iv) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

The licensed operation state 476 may enable the function(s) that is/are disabled when the barcode-reading application 24 is in the disabled state 474 such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

There may be two sub-embodiments of the licensed operation state 476. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 from the disabled state 474 to the licensed operation state 476. The restrictions may be symbology restrictions, time restrictions, and/or quantity restrictions.

FIG. 21 shows examples of a data structure of a license key in accordance with some embodiments. A first example license key 702 may include data fields (that may be encrypted) which specify the symbologies 708 (for example, symbologies A, B, and C that correspond to a Universal Product Code (UPC), a Quick Response (QR) Code, and a Portable Data File (PDF)-417) and a lease term 710. The lease term 710 may specify a date and time at which the license key 702 expires. In response to receipt of this license key 702 (and decryption of the license key 702 if encrypted) the barcode-reading application 24 may transition to the licensed operation state 476, decode the specified symbologies 708 when in the licensed operation state 476 (while remaining disabled for decoding other symbologies not specified in the license, for example for a data matrix), and at the end of the lease term 710, transition back to the disabled state 474 (unless a new license key with an updated lease term 710 is received prior to expiration, which functions to extend the expiration of the lease term).

A second example license key 704 may include data fields (that may be encrypted) which specify the symbologies 712a-c (for example, symbologies A, B, and C that correspond to a UPC, a QR Code, and a PDF-417), and a licensed quantity of decodes 714a-c for each symbology 712a-c. The licensed quantity of decodes for a particular symbology, for example the licensed quantity 714a for symbology 712a, may be unlimited. The licensed quantity of decodes 714b-c for symbologies 712b-c may be limited to a specified quantity. The entire license key 704 may further include a lease term 716 which may specify a date and time at which the license key 704 expires. In response to receipt of this license key 704 (and decryption of the license key 704 if encrypted) the barcode-reading application 24 may transition to the licensed operation state 476, and decode the specified symbologies 712a-c when in the licensed operation state 476 up to the licensed quantities 714a-c. The barcode-reading application 24 may remain disabled for decoding other symbologies not specified in the license (e.g., symbologies other than 712a-c), automatically disable each of symbologies 712b-c when the total quantity of decodes of each symbology 712b-c exceeds the licensed quantity 714b-c (unless a new license key increases the quantity), and transition back to the disabled state 474 (unless a new license key with an updated lease term 710 is received prior to expiration, which functions to extend the expiration of the lease term). In this arrangement, the ability to decode symbologies 712b-c will expire upon the earlier of: i) reaching the maximum quantity of decodes 714b-c, or ii) expiration of the lease term 716.

A third example license key 706 may include data fields (that may be encrypted) which specify the symbologies 718a-c (for example, symbologies A, B, and C that correspond to a UPC, a QR Code, and a PDF-417), a license term 720a-c for each symbology 718a-c, and a licensed quantity 722a-c for each symbology 718a-c. The license term 720a-c may specify a date and time at which the license for that particular symbology 718a-c expires. The license term may be perpetual (e.g., license term 720a-b) or time limited (e.g., license term 720c). The licensed quantity of decodes for a particular symbology may be unlimited (e.g., the licensed quantity 722a for symbology 718a), or may specify a specific quantity (e.g., the licensed quantity 722b-c for symbologies 618b-c).

In response to receipt of this license key 706 (and decryption of the license key 706 if encrypted) the barcode-reading application 24 may transition to the licensed operation state 476, and decode the specified symbologies 718a-c when in the licensed operation state 476 up to the licensed quantities 722a-c for each symbology and for the duration of the license term 720a-c for each symbology. The barcode-reading application 24 may remain disabled for decoding other symbologies not specified in the license (e.g., symbologies other than 718a-c), and automatically disable each of symbologies 718b-c when the earlier of: i) the expiration of the license term 720a-c for each symbology 718a-c expires, or ii) the total quantity of decodes of each symbology 718b-c exceeds the licensed quantity 722b-c, each being subject to extension by a new license key with an increased term duration or an increased quantity.

Each of the license keys may be a data file, specifying the symbologies, the license terms, and the license quantities as depicted in FIG. 21. The data file may be encrypted utilizing an encryption key (e.g., a private key of a public/private key pair). The encrypted data file may form the license key and may be decrypted by the barcode-reading application 24 utilizing an encryption key (e.g., a public key of the public/private key pair). Other known encryption technologies may also be utilized for securing the delivery of the license key to the barcode-reading application including the license restrictions (e.g., licensed symbologies, license terms, and licensed quantities) within the license key.

FIG. 20B is a state machine diagram depicting three states of operation in a barcode-reading application 24 in accordance with another embodiment. The first state of operation may be a base state 470. When in the base state, the barcode-reading application 24 may include barcode-reading capabilities which, although functional and capable of generating useful decoded data, are limited by at least one factor or function (which will be referred to as a demonstration factor) which makes output of decoded data useful for demonstration purposes but not practical for ongoing operation.

The operation of the barcode-reading application 24 in the base state may be a base decoding mode of operation or a demonstration mode of operation. In the base decoding mode of operation, the barcode-reading application 24 may drive the camera of the mobile device 18 to capture an image of a barcode, and apply base decoder functions to the image to identify the barcode symbology. If the barcode symbology is a base symbology, the barcode-reading application 24 may decode the barcode and make the decoded data available for further processing. If the symbology is other than a base symbology, the barcode-reading application 24 may enter the demonstration mode of operation.

In the demonstration mode of operation, the barcode-reading application 24 may apply at least one unlicensed enhanced barcode-reading function to decode the barcode, and perform at least one of: i) outputting an indication of successfully decoding the barcode, or ii) implementing a restriction function. The restriction function may be at least one of: i) a function which scrambles decoded data; ii) a function which restricts the decoded data or scrambled decoded data from the barcode from being made available for further processing by at least one application executing on the mobile device; or iii) a function which restricts the decoded data or the scrambled decoded data from the barcode from being displayed on a display screen of the mobile device.

The at least one demonstration factor may include, but is not limited to: i) a scrambling function which, upon generating decoded data, provides the output in a scrambled or truncated format for purposes of demonstrating decoding capabilities (and decoder performance) but preventing use of the decoded data for further data processing, ii) a time delay function which, upon generating and outputting decoded data (or scrambled decoded data), provides for implementing a time delay before a barcode of the same symbology can again be successfully decoded, iii) an output restriction function which restricts decoded data (or scrambled decoded data) from being made available for further processing by at least one application executing on the mobile device 18, and iv) an output restriction function which enables outputting decoded data (or scrambled decoded data) to the display screen and prevents the decoded data from being further processed by the mobile device 18 (other than presentation on the display screen) or transmission to a remote application.

The demonstration mode of operation may include an upgrade function. The upgrade function may enable user selection to obtain the license code and upon user selection to obtain the license code, establish the network connection to the licensing server and obtain the license code from the licensing server 21a, 21b.

The at least one demonstration factor may be applied to selected symbologies or all symbologies. Different demonstration factors may be applied to different symbologies.

The barcode-reading application 24 may transition from the base state 470 to a license key retrieval state 471. Reading a barcode to which a demonstration factor applies may trigger transition of the barcode-reading application 24 to the license key retrieval state 471. Alternatively, the barcode-reading application 24 may transition to the license key retrieval state 471 upon user selection of the license key retrieval state 471.

When in the license key retrieval state 471 the barcode-reading application 24 may connect to a licensing server 21a, 21b to obtain a license key. After obtaining the license key, the barcode-reading application 24 may transition to a licensed operation state 472 (i.e., an enhanced operation state).

The licensed operation state 472 may enable the barcode-reading application 24 to function without limitations of the at least one demonstration factor such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16), in each case without being impeded by the demonstration factor.

As described with respect to the licensed operation state 476 in FIG. 20A, there may be two sub-embodiments of the licensed operation state 472. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 to the licensed operation state 472. The restrictions may be symbology restrictions, time restrictions, and/or quantity restrictions.

Figure 22A:
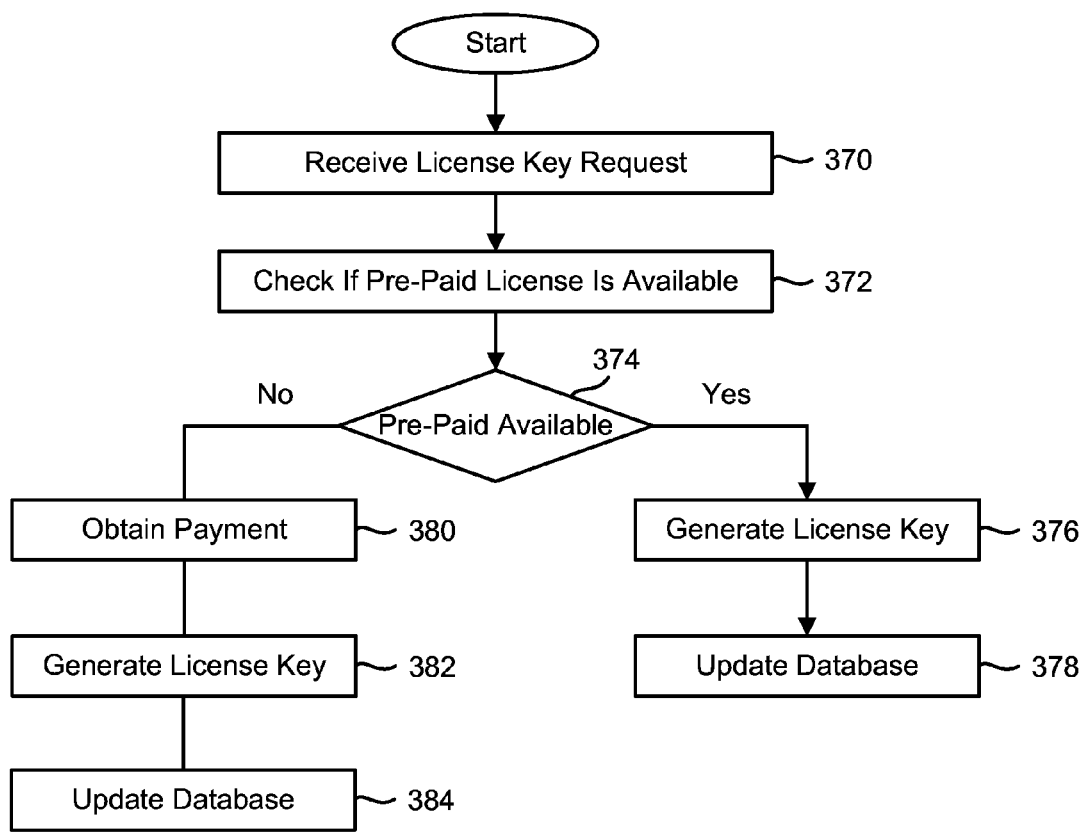
FIG. 22A depicts an exemplary operation of a license server.

FIG. 22A depicts an exemplary operation of a license server 21a, 21b. Step 370 represents receiving a license key request from the barcode-reading application 24 (or other application) of the mobile device 18. Receiving the license key request may include authenticating the user of the mobile device 18. Authenticating the user of the mobile device 18 may include: i) authenticating the individual to which the mobile device is assigned or the individual using the mobile device (or the individual who controls the mobile device), for example utilizing a combination of a user ID and a password or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the organization, company, or group.

Step 372 represents the license server 21a, 21b checking whether a pre-paid license is available for the mobile device 18. More specifically, the identity of the individual, organization, company, or other group of users identified during the authentication may be used to look up (e.g., in a license database) licenses available to that individual, organization, company, or other group of users (if any). For a particular individual, organization, company, or other group of users, a certain quantity of licenses may have been pre-purchased.

FIG. 22C depicts an exemplary database 739 for recording pre-paid licenses that may have been purchased by an individual, organization, company or other group of users. Each such individual, organization, company or other group of users may be identified by a group ID 740, 750. Associated with each group ID is one or more license IDs 742, 752a, 752b, each of which identifies a license type for the barcode-reading application 24 which may have been purchased in quantities of one or more. Each license type may be, as an example, one of the license types identified by the license keys 702, 704, 706 of FIG. 21.

Each license ID 742, 752a, 752b may be associated with identification of: i) the quantity of the license type purchased 744, 754a, 754b, ii) the quantity used 746 or the quantity in use 756a, 756b, and/or iii) the quantity remaining 748, 758a, 758b for issuance to mobile devices 18. It should be appreciated that recording both the quantity used 746 or the quantity in use 756a, 756b as well as the quantity remaining 748, 758a, 758b for issuance to mobile devices is duplicative as either value can be calculated from the quantity purchased 744, 754a, 754b and the other value.

Recording the quantity used 746 is useful when licenses are purchased for a single mobile device, and once a license is issued to a particular mobile device it is permanently associated with that mobile device and may not be reassigned to another mobile device without manual intervention.

Recording the quantity in use 756a, 756b is useful when the licenses are concurrent-use licenses, and when a license assigned to a mobile device expires it is considered no longer in-use and can be reassigned to another mobile device 18.

It should also be appreciated that if the quantity of licenses purchased is unlimited 754a, it is irrelevant to track in-use licenses 756a, 756b and remaining licenses 758a, 758b. When utilizing the concurrent-use licenses, for the in-use licenses 756b, the database may include an in-use table 760 which records, for each license 762, the time 764 at which it expires (e.g., the lease term 710 from FIG. 21) such that upon expiration (if the expiration is not updated by way of renewal), the license will revert to remaining inventory 758b and can be issued to a different mobile device 18.

It should be appreciated that this licensing scheme enables a mobile device 18 to obtain a license for a specific term, and so long as the mobile device 18 obtains a renewal license prior to expiration, the barcode-reading application 24 can operate under the license even if the mobile device is (periodically) uncoupled from any network and unable to contact the license server 21a, 21b.

Returning to FIG. 22A, step 374 represents determining whether a pre-paid license is available. If a prepaid license is available at step 374, a license key for the pre-paid license is generated at step 376 and the database 739 is updated at step 378. Updating the database may include recording the license as used 746 or in use 756b.

If it is determined at step 374 that a pre-paid license is not available, payment is obtained for a license at step 380. Step 380 may involve determining the type of license being requested (e.g., as identified by license keys 702, 704, 706), including the licensed symbology(ies) as well as license term(s) and license quantity(ies) for each symbology(ies). In one embodiment, the barcode-reading application 24 may, under the control of the license server 21a, 21b, generate a menu for user selection of these license parameters (i.e., symbologies, license terms and license quantities) and display on a screen of the mobile device 18 pricing alternatives for desired license parameters.

After payment is obtained, a license key for the license is generated at step 382 and the database 739 is updated at step 384 to reflect a newly purchased license for a user (group ID). If the newly purchased license is a concurrent-use license, updating the database may include recording the license as well as its expiration.

As stated, this licensing scheme enables a mobile device 18 to obtain a license for a specific term, and so long as the mobile device 18 obtains a renewal license prior to expiration, the barcode-reading application 24 can continue operation under the license even if the mobile device 18 is uncoupled from any network and unable to contact the license server 21a, 21b.

Figure 22B:
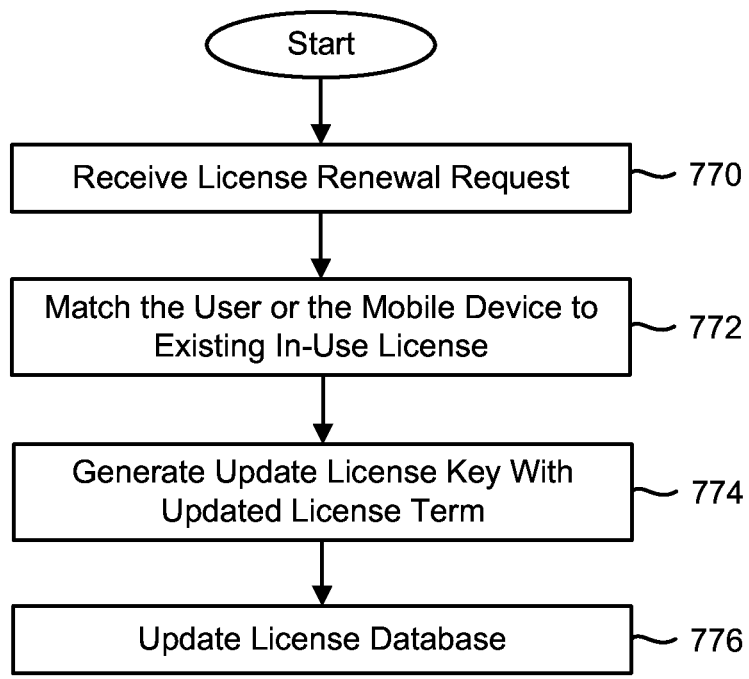
FIG. 22B depicts an exemplary operation of a license server for renewing a license for a mobile device prior to expiration of the license.

FIG. 22B depicts an exemplary operation of a license server 21a, 21b for renewing a license for a mobile device 18 prior to the expiration of the license (e.g., prior to the in-use license 756b reverting to a remaining license 758b).

Step 770 represents receiving a license key renewal request from the barcode-reading application 24 (or other application) of the mobile device 18. Receiving the license key renewal request may include authenticating the user of the mobile device 18. Authenticating the user of the mobile device 18, as discussed, may include: i) authenticating the individual to which the mobile device is assigned, or the individual using the mobile device (or the individual who controls the mobile device), for example utilizing a combination of a user ID and a password, or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the individual, organization, company, or group. The mobile device 18 (e.g., the barcode-reading application) may communicate to the licensing server i) a unique identification code of the mobile device 18 or ii) a user identification code identifying a controller of the mobile device 18.

Step 772 represents the license server 21a, 21b matching the user or the mobile device 18 to the existing in-use license, which may be recorded in an in-use table (for example, the in-use table 760 shown in FIG. 22C).

Step 774 represents generating, and providing to the mobile device 18, an update license key which, as depicted by license key 702 of FIG. 21, may include an updated license term.

Step 776 represents updating the license database such that the expiration date of the license in the in-use table 760 is updated.

Embodiments for a barcode-reading enhancement accessory are disclosed hereafter. As used herein, the terms "attachment" and "accessory" are used synonymously and interchangeably, and may refer to an apparatus attached, coupled, or secured to a mobile device. An attachment for a mobile device may include just a single component that improves the barcode-reading capabilities of the mobile device. Alternatively, an attachment may include multiple components that improve the barcode-reading capabilities of the mobile device. In addition, an attachment for a mobile device may provide additional functionality that is unrelated to improving the barcode-reading capabilities of the mobile device. In some embodiments, the attachment improves the ability of the mobile device to read a barcode utilizing the camera assembly and/or the flash/torch illumination system of the mobile device. In some embodiments, the attachment may include a supplemental camera system and/or one or more supplemental illumination systems which provide barcode-reading capability for the mobile device.

In accordance with some embodiments, a barcode-reading system for a mobile device may include a barcode-reading enhancement accessory secured to the mobile device, which will be explained in detail hereafter, and a barcode-reading application stored in a memory of the mobile device 18, which is disclosed above. The barcode-reading enhancement accessory may include at least one optic system that is positioned either within a field of illumination of a light source of the mobile device for modifying the field of illumination projected by the light source or within a field of view of a camera of the mobile device for modifying illumination reflected from objects within the field of view of the camera.

As disclosed above, the barcode-reading application 24 may be configured to operate in a base mode or an enhanced mode. In the base mode of operation, the barcode-reading application 24 may be configured to control a network interface of the mobile device 18 to establish a network connection to a licensing server 21a, 21b and obtain a license code from the licensing server 21a, 21b; subject the license code to a predetermined algorithm and determine at least one operating permission authorized by the license code; and enable an enhanced mode of operation. In the enhanced mode of operation, the barcode-reading application 24 may be configured to implement at least one enhanced barcode-reading function which corresponds to the at least one operating permission authorized by the license code.

The at least one enhanced barcode-reading function may include a function of decoding a barcode symbology that the decoder is restricted from decoding in the base mode of operation. Alternatively or additionally, the at least one enhanced barcode-reading function may include a function of decoding multiple barcodes in sequence at a rate that is faster than a rate at which the barcode-reading application can decode multiple barcodes in sequence in the base mode of operation. Alternatively or additionally, the at least one enhanced barcode-reading function may include a function of decoding a quantity of barcodes of a particular symbology that exceeds a restricted quantity of barcodes of the particular symbology that the barcode-reading application can decode in the base mode of operation.

Alternatively or additionally, the at least one enhanced barcode-reading function may remove a demonstration restriction function under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced barcode-reading function may enable at least one enhanced image processing function that improves an ability to decode an image of a barcode and is not operable when the decoder operates in the base mode of operation.

The base mode of operation may include a base decoding mode of operation and a demonstration mode of operation. In the base decoding mode of operation, the barcode-reading application may be configured to drive the camera assembly to capture an image of a barcode, and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology. In the demonstration mode of operation, the barcode-reading application 24 may be configured to: apply at least one enhanced barcode-reading function to decode the barcode, and perform at least one of outputting an indication of successful decoding of the barcode or implementing a restriction function. The restriction function may be at least one of: i) a function that scrambles decoded data, ii) a function that restricts the decoded data or scrambled decoded data from being made available for further processing by at least one application executing on the mobile device 18, or iii) a function that restricts the decoded data or the scrambled decoded data from being displayed on a display screen of the mobile device 18.

The barcode-reading application 24 may be configured to perform an upgrade function in the demonstration mode of operation. The upgrade function may enable a user selection to obtain the license code, obtain the license code based on the user selection, establish a network connection to the licensing server 21a, 21b, and obtain the license code from the licensing server 21a, 21b.

In order to obtain the license code from the licensing server 21a, 21b, the barcode-reading application 24 may be configured to communicate to the licensing server 21a, 21b one of: i) a unique identification code of the mobile device 18, or ii) a user identification code identifying a controller of the mobile device 18.

In accordance with another embodiment, a barcode-reading system for a mobile device may include a barcode-reading enhancement accessory secured to the mobile device 18 and a barcode-reading application 24 stored in a memory of the mobile device 18 and executable by a processor 44 of the mobile device 18. The barcode-reading enhancement accessory may include at least one optic system that is positioned either within a field of illumination of a white light source of the mobile device 18 for modifying the field of illumination projected by the white light source, or within a field of view of a camera of the mobile device 18 for modifying illumination reflected from objects within the field of view of the camera.

The barcode-reading application 24 may include: i) an image capture function for controlling the white light source and the camera to capture an image of a barcode wherein the image of the barcode may be affected by the at least one optic system, ii) a base decoder function for decoding a barcode in a base mode of operation if an enhanced decoder mode has not been authorized, and iii) an enhanced decoder function for decoding a barcode in an enhanced mode of operation if the enhanced decoder mode has been authorized.

The enhanced decoder function may include a function of decoding a barcode that the barcode-reading application 24 is restricted from decoding in the base mode of operation. Alternatively or additionally, the enhanced decoder function may include a function of decoding multiple barcodes in sequence at a rate that is faster than a restricted rate at which the barcode-reading application 24 can decode a sequence of multiple barcodes when in the base mode of operation. Alternatively or additionally, the enhanced decoder function may include a function of decoding a quantity of barcodes of a particular symbology that exceeds a restricted quantity of barcodes of the particular symbology which the barcode-reading application 24 can decode when in the base mode of operation.

Alternatively or additionally, the enhanced decoder function may remove a demonstration restriction function under which the barcode-reading application 24 functions when in the base mode of operation, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device, or iii) a function which restricts the decoded data or the scrambled decoded data from a barcode of at least one particular symbology from being displayed on a display screen of the mobile device 18.

Alternatively or additionally, the enhanced decoder function may enable at least one enhanced image processing function which improves an ability to decode an image of a barcode and is not operable when the barcode-reading application 24 operates in the base mode of operation. The enhanced decoder mode is enabled by obtaining a license code from a licensing server 21a, 21b.

The barcode-reading application 24 may be configured to subject the license code to a predetermined algorithm to determine at least one operating permission authorized by the license code. The enhanced decoder function may correspond to the at least one operating permission authorized by the license code.

The barcode-reading application 24 may be configured to obtain the license code from the licensing server 21a, 21b by communicating to the licensing server one of: i) a unique identification code of the mobile device 18, or ii) a user identification code identifying a controller of the mobile device 18.

An attachment for a mobile device 18 may cover a relatively small portion of the mobile device. Alternatively, an attachment for a mobile device may be a protective case that covers a substantial portion of the mobile device. Attachments may be designed for attachment to mobile devices in a wide variety of ways, including but not limited to a corner-positioned attachment, an encapsulating attachment, and a mounting attachment. These attachment modes will be explained in detail below.

FIGS. 4A and 4B depict examples of a corner-positioned attachment that covers a relatively small portion of the mobile device 18. A corner-positioned attachment may cover one or more (but not all) corners of a mobile device.

The corner-positioned attachment 100a shown in FIG. 4A secures to, and covers, a single corner of a mobile device 18. More specifically, the corner-positioned attachment 100a may have an interior back surface 102, an interior front surface 104, an interior top surface 106, and an interior side surface 108. When installed on the corner of the mobile device 18: i) the interior back surface 102 faces, and abuts, the back surface 74 of the mobile device 18; ii) the interior front surface 104 faces, and abuts, the face surface 72 of the mobile device 18; iii) the interior top surface 106 faces, and abuts, the top edge 78 of the mobile device 18; and iv) the interior side surface 108 faces, and abuts, the right edge 80 of the mobile device 18. The distance between the interior back surface 102 and the interior front surface 104 may be sufficiently large to permit the corner-positioned attachment 100a to be inserted onto the corner of the mobile device 18 without excessive difficulty, but also small enough that, once installed, the corner-positioned attachment 100a will not slide free of the mobile device 18 due to friction fit between: i) the interior back surface 102 and the back surface 74; and ii) the interior front surface 104 and the face surface 72. Because the corner-positioned attachment 100a covers a single corner of the mobile device 18, the attachment 100a may be installed on the mobile device 18 by sliding the attachment 100a along the top edge 78 (e.g. the interior top surface 106 in contact with the top edge 78) until the interior side surface 108 abuts the right edge 80 of the mobile device. FIG. 4A shows, as an example, a corner-positioned attachment covering the right top corner of the mobile device 18. However, the corner-positioned attachment may cover the left top corner or any other corner of the mobile device 18.

The corner-positioned attachment 100b secures to, and covers, two top corners of the mobile device 18 as well as the entire top edge 78. More specifically, the corner-positioned attachment 100b may have an interior back surface 102, an interior front surface 104, an interior top surface 106, and two interior side surfaces 108a and 108b. When installed on the corner of the mobile device 18: i) the interior back surface 102 faces, and abuts, the back surface 74 of the mobile device 18; ii) the interior front surface 104 faces, and abuts, the face surface 72 of the mobile device 18; iii) the interior top surface 106 faces, and abuts, the top edge 78 of the mobile device 18; and iv) the interior side surfaces 108a and 108b face, and abut, the right edge 80 and the left edge 82 of the mobile device 18, respectively.

The distance between the interior back surface 102 and the interior front surface 104 may be sufficiently large to permit the corner-positioned attachment 100a to be inserted onto the corner of the mobile device 18 without excessive difficulty, but also small enough that, once installed, the corner-positioned attachment 100b will not slide free of the mobile device 18 due to friction fit between: i) the interior back surface 102 and the back surface 74, and ii) the interior front surface 104 and the face surface 72.

Additionally, or alternatively, the distance between the interior side surface 108a and the interior side surface 108b may be sufficiently large to permit the corner-positioned attachment 100b to be inserted onto the corner of the mobile device 18 without excessive difficulty, but also small enough that, once installed, the corner-positioned attachment 100b will not slide free of the mobile device 18 due to friction fit between: i) the interior side surface 108a and the right edge 80, and ii) the interior side surface 108b and the left edge 82.

Because the corner-positioned attachment 100b covers two corners of the mobile device 18, the attachment 100b may be installed on the mobile device 18 by sliding the attachment 100b along each of the left edge 82 and the right edge 80 (e.g. the interior side surface 108a in contact with the right edge 80, the interior side surface 108b in contact with the left edge 82, the interior back surface 102 in contact with the back surface 74, and the interior front surface 104 in contact with the face surface 72) until the interior top surface 106 abuts the top edge 78 of the mobile device 18.

With respect to either attachment 100a or 100b (or any type of corner-positioned attachment), as an alternative to frictional engagement between the attachment 100a, 100b and the mobile device 18, the attachment 100a, 100b may be secured to the mobile device 18 through the use of various other attachment methods. Such attachment methods include, but are not limited to, mechanical fasteners, adhesives, and the like.

Encapsulating attachments may cover substantially the entirety of the back surface 74 of the mobile device 18 and may further cover substantially the entirety of one or more of the edges 76, 78, 80, and 82 of the mobile device 18. An encapsulating attachment i) may cover a perimeter edge of the face surface 72 (but does not cover the central portion of the face surface 72) or ii) may cover substantially the entire face surface 72 but include a transparent central portion, in each case to enable viewing of, and access to, the display screen 66 and touch panel of the mobile device 18. An encapsulating attachment may further exclude covering interface elements of the mobile device 18, such as buttons, electrical interfaces, infrared interfaces, and the like.

Figure 5A:
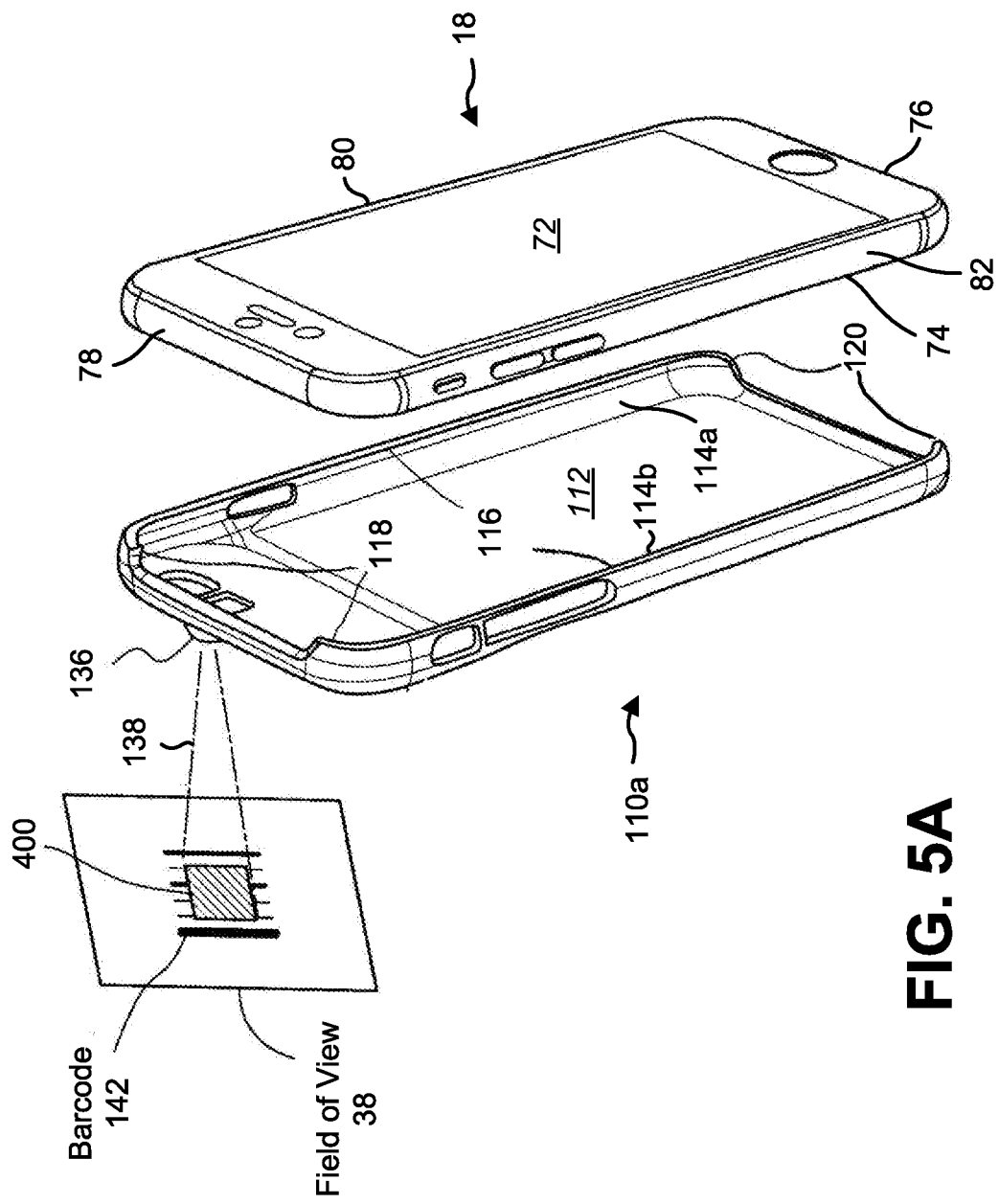
FIGS. 5A and 5B illustrate an exemplary encapsulating attachment useful in a barcode-reading enhancement system.

FIG. 5A depicts an exemplary encapsulating attachment 110a which covers substantially the entire back surface 74 and each of the right edge 80 and the left edge 82 of the mobile device 18 while covering portions of the top edge 78 and the bottom edge 76 near the right edge 80 and left edge 82 (e.g. the corners of the mobile device 18).

In more detail, the encapsulating attachment 110a may include: i) an interior back surface 112 which faces, and abuts, the back surface 74 of the mobile device 18; ii) interior side surfaces 114a and 114b which face, and abut, the right edge 80 and the left edge 82 of the mobile device 18, respectively; iii) an interior top surface 118 which faces, and abuts, the top edge 78 of the mobile device 18 (at the corners); and iv) an interior bottom surface 120 which faces, and abuts, the bottom edge 76 of the mobile device 18 (at the corners). The encapsulating attachment 110a may also include an interior side surface 116 which faces, and abuts, at least a portion of the periphery of the face surface 72 of the mobile device 18.

For installation of the encapsulating attachment 110a onto the mobile device 18, the walls of the encapsulating attachment 110a forming the interior side surfaces 114a and 114b may be sufficiently flexible such that, with pressure, the walls separate as the mobile device 18 is pressed towards the interior back surface 112, and the portions of the walls which form the interior side surface 116 pass along the right edge 80 and the left edge 82 of the mobile device 18, and come to rest abutting the periphery of the face surface 72 when the back surface 74 is in contact with the interior back surface 112.

The encapsulating attachment 110a, or more specifically a back side forming the interior back surface 112, may further include a camera aperture through which the camera assembly (not shown) of the mobile device 18 has the camera field of view 38 to the back surface 74 of the mobile device 18.

Figure 5B:
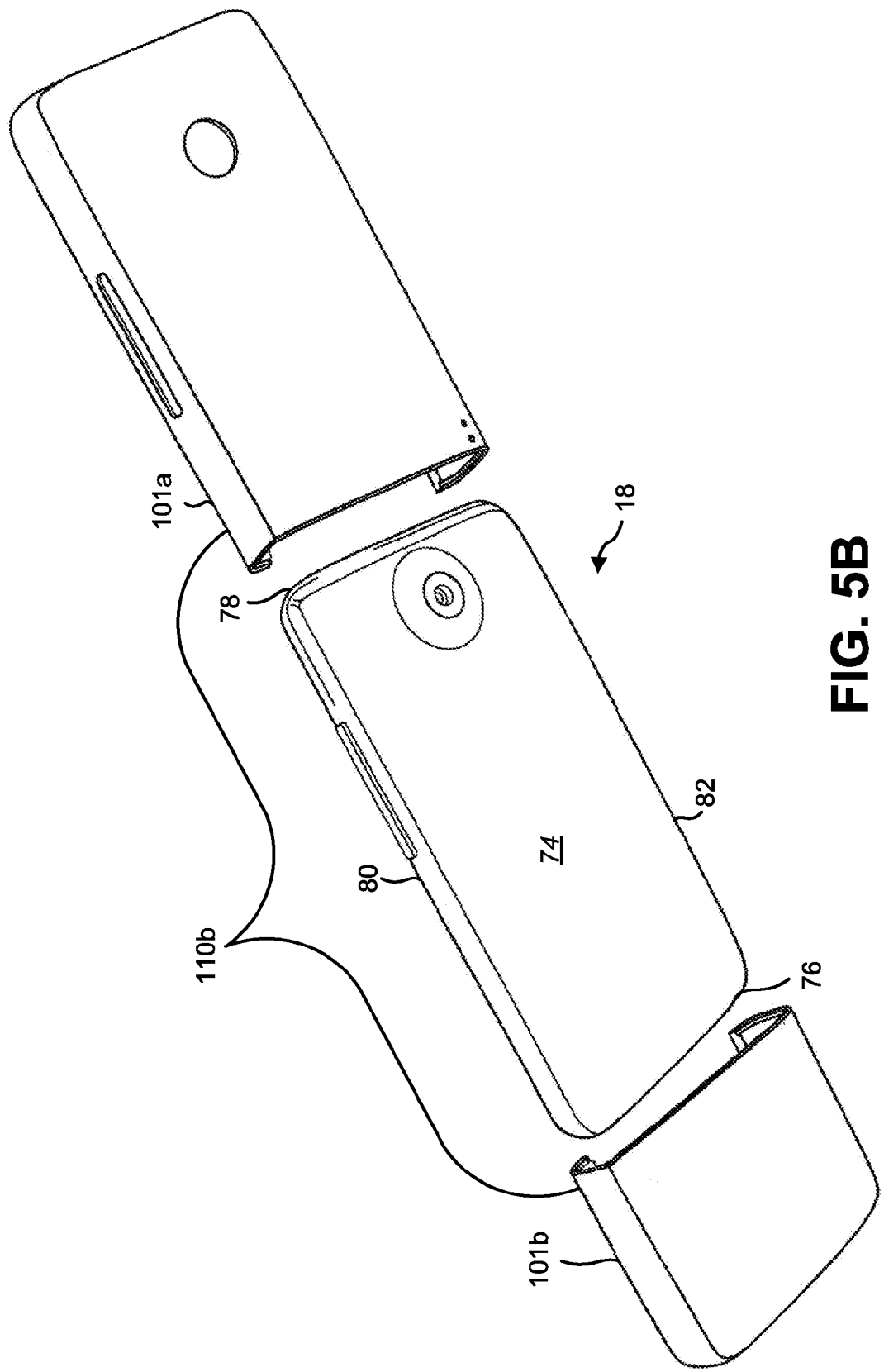

FIG. 5B depicts another example of an encapsulating attachment 100b. The encapsulating attachment 100b comprises a top corner-positioned attachment 101a (similar to 100b) which covers the top two corners of the mobile device 18 and a bottom corner-positioned attachment 101b which covers the bottom two corners of mobile device 18. The two corner-positioned attachments 101a and 101b, when installed, mate to encapsulate the mobile device 18. It should be appreciated that the interior front surface of each of the attachments 110b (e.g. each of the mating top and bottom corner-positioned attachments) covers a small portion of the periphery of the face surface 72 of the mobile device 18 such that an operator may access the display screen 66 and the touch panel when the mobile device 18 is encapsulated within the attachment 110b.

It should be appreciated that the encapsulating attachments 110a and 110b shown in FIGS. 5A and 5B are examples of encapsulating attachments, and the encapsulating attachments may be in any form or type.

Mounted attachments generally are attachments that are secured to one face and/or one edge of a mobile device 18. Mounted attachments may not cover any corner of the mobile device, and may not encapsulate the mobile device 18.

FIGS. 6A and 6B depict exemplary mounted attachments 122a, 122b which are secured to the back surface 74 of the mobile device 18. In FIG. 6A, the mounted attachment 122a may be a barrel shape and include a cylindrical male engagement surface 124 which inserts into a cylindrical recess 126 within the back surface 74 of the mobile device 18 and engages a periphery engagement surface 128 of the cylindrical recess 126 for mounting. The engagement between the engagement surface 124 and the engagement surface 128 may be, for example, by threading, bayonet fitting, or any other mounting structure which may utilize rotational movement between the mounted attachment 122a and the mobile device 18 for securing the mounted attachment 122a to, and releasing the mounted attachment 122a from, the mobile device 18.

In FIG. 6B the mounted attachment 122b may be a non-cylindrical shape and may be secured into a recess 130 within the back surface 74 of the mobile device 18. The recess 130 may be of the same shape as the mounted attachment 122b and may include an engagement lip or cavity 132 around at least a portion of the periphery of the recess 130 such that engagement clips 134 around the periphery of the mounted attachment 122b may secure the mounted attachment 122b within the recess 130.

In addition to the foregoing examples of corner-mounted attachments, encapsulating attachments, and mounted attachments, the barcode-reading enhancement systems and other features embodied in, or related to, attachments as described herein may utilize any (or multiple) attachment structure or means for attaching to the corresponding mobile device including, but not limited to: i) for attachments that cover some portion of the mobile device from two or more sides (e.g. corner-positioned attachments and encapsulating attachments), use of a frictional interface such as a modest interference fit between the interior dimension of the attachment and the exterior dimension of the portion of the mobile device that receives the attachment; ii) for encapsulating attachments, a wide variety of attachment features in known examples of cases, covers, and other protectors for mobile devices; and iii) for attachments that are attached to only one side of the mobile device attachment, features such as threaded fasteners, adhesives, snap-in interfaces, and the like.

Figure 7A:
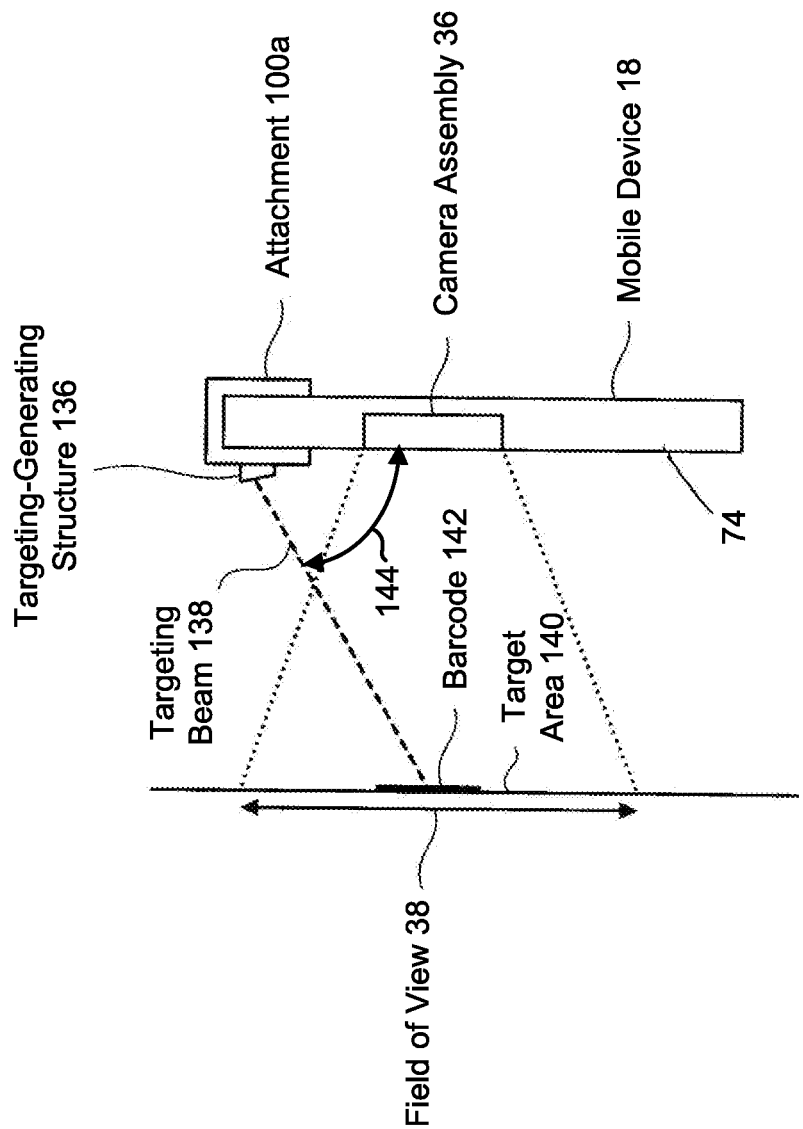
FIGS. 7A and 7B illustrate an exemplary target-generating mechanism useful for implementing in an attachment in a barcode-reading enhancement system.

The attachments described herein may include target-generating mechanisms as a component of the barcode-reading enhancement system for a mobile device. FIG. 7A depicts a side cutaway view of an example corner- or edge-mounted attachment (shown as attachment 100a covering a single edge of the mobile device 18 as an example) that includes a target-generating structure 136 (i.e., a target-generating mechanism). The target-generating structure 136 projects a targeting beam 138 into a target area 140 (corresponding to a central portion of a field of view 38 of the camera assembly 36 of the mobile device 18) and may be utilized to facilitate rapid and optimal positioning of a barcode 142 within the camera field of view 38 of the mobile device 18. The targeting beam 138 is projected at an acute angle 144 with respect to the back surface 74 of the mobile device 18 in a first direction such that the targeting beam 138 intersects the central portion of the camera field of view 38 at a distance from the camera assembly 36 that is useful for barcode reading. The distance useful for barcode reading means that a barcode 142 within the camera field of view 38 would be imaged by the lens assembly 40 with sufficient sharpness (focus) and resolution (size) to enable reading of the barcode 142. This targeting beam 138 is especially useful when the mobile device 18 does not have a display, or the display is dimmed or turned off to conserve battery power.

Figure 7B:
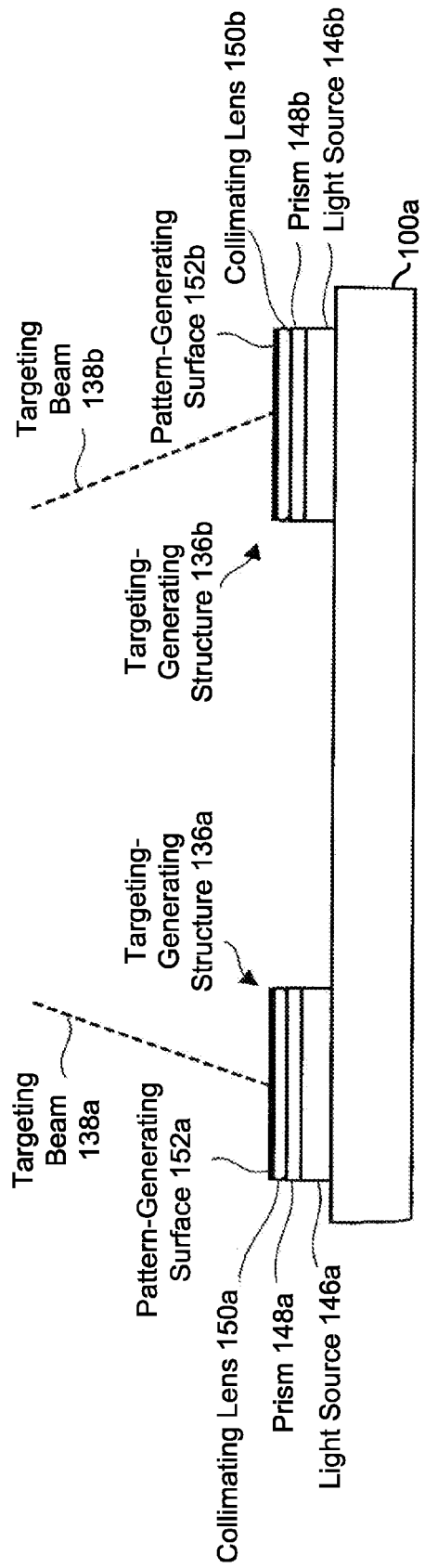

FIG. 7B shows (as a top view, which may be orthogonal to the side view depicted in FIG. 7A) an example of a target-generating mechanism. The target-generating mechanism may include multiple target-generating structures 136a and 136b. The target-generating structures 136a and 136b may project non-parallel targeting beams 138a and 138b of a distinct illumination pattern, each at an acute angle with respect to the back surface 74 of the mobile device 18 in a second direction orthogonal to the first direction and each of which form a point or a pattern within the target area 140. The target-generating structures 136a and 136b may be configured so that (1) at a distance useful for barcode reading (i.e. the optimal distance from the camera assembly 36), the targeting beams 138a and 138b converge so that the projected patterns and/or points meet at the center of the camera field of view 38, and (2) at any distance from the camera assembly 36 other than the optimal distance, the projected patterns and/or points are spaced apart. Thus, when the mobile device 18 is being used to read a barcode 142, the user may move the mobile device 18 until the projected patterns and/or points meet, indicating that the mobile device 18 is at the optimal distance from the barcode 142 and that the barcode 142 is positioned within the center of the camera field of view 38.

The target-generating mechanism depicted in FIG. 7B may include a light source 146a, 146b and permutations of any of a prism 148a, 148b; a collimating lens 150a, 150b; and a pattern-generating surface 152a, 152b such as an interference pattern-generating element; a diffractive pattern-generating element, such as a holographic element that may include one or more diffractive gratings; or a Fresnel-type pattern-generating element that has been fabricated with the desired targeting beam pattern.

The light source 146a, 146b may be laser diodes, light-emitting diodes (LEDs), etc. embodied in the attachment or within the mobile device 18. The targeting beams 138a, 138b may be generated by shaping the illumination from the white light source of the mobile device by the applicable permutations of the prism 148a, 148b, a collimating lens 150a, 150b, and a pattern-generating surface 152a, 152b.

Although FIGS. 7A and 7B depict the target-generating mechanism embodied in a corner- or edge-mounted attachment 100a, the target-generating mechanism may be secured to the mobile device 18 by other means including, but not limited to, embodying the target-generating structure 136 into an encapsulating attachment as depicted in FIG. 5A in alignment with a white light source 84 of the mobile device such that the white light source 84 of the mobile device may be used as the light source 146 of the target-generating structure 136.

In this application, a "distinct illumination pattern" is an illumination pattern produced by light that is focused to provide relatively crisp lines or other shapes. Thus, the illumination produced by a laser is an example of light that would typically produce a distinct illumination pattern. By contrast, a "diffuse illumination pattern" is an illumination pattern produced by light that is not focused at any particular location, but rather emanating into a broad area. Thus, the illumination produced by a typical light bulb is an example of light that would typically produce a diffuse illumination pattern.

Figure 8B:
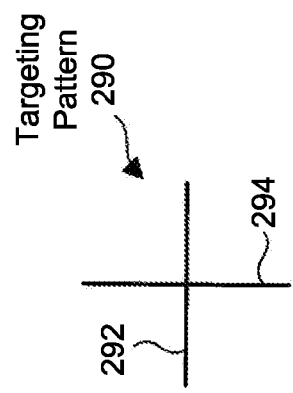
FIGS. 8A-8D illustrate exemplary targeting patterns useful for implementing an attachment of a barcode-reading enhancement system.
Figure 8D:
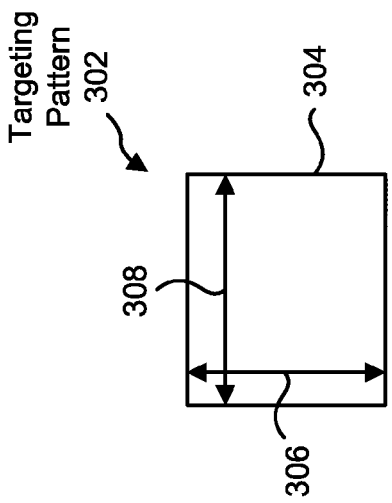
Figure 8A:
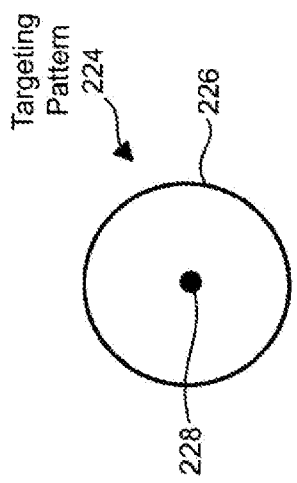

FIGS. 8A-8D illustrate various targeting patterns (distinct illumination patterns) that may be projected by the target-generating structures 136 into the target area 140. FIG. 8A shows an example of a targeting pattern 224 that may be projected by the target-generating structure 136. The targeting pattern 224 includes a circle 226 with a dot 228 in the center. One target-generating structure (136a for example) may generate the circle 226, while the other target-generating structure (136b for example) may generate the dot 228.

The target-generating structures 136a, 136b may be configured so that when the mobile device 18 is at an optimal distance from the barcode 142, the dot 228 is substantially in the center of the circle 226 to form the depicted targeting pattern 224.

FIG. 8B shows another example of a targeting pattern 290 that may be projected by the target-generating structures 136. The targeting pattern 290 includes a cross comprising a horizontal bar 292 and a vertical bar 294. One target-generating structure (136a for example) may generate the horizontal bar 292, while the other target-generating structure (136b for example) may generate the vertical bar 294. The target-generating structures 136a, 136b may be configured so that when the mobile device 18 is at an optimal distance from the barcode 142, the horizontal bar 292 and the vertical bar 294 intersect each other within the target area 140 to form the depicted targeting pattern 290.

Figure 8C:
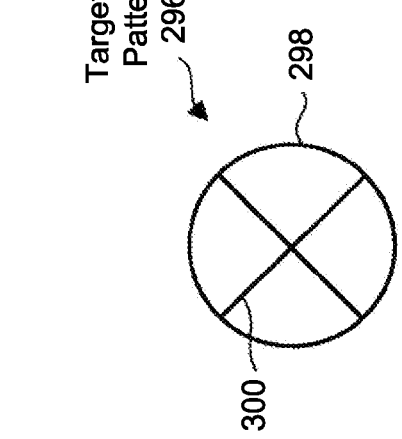

FIG. 8C shows another example of a targeting pattern 296 that may be projected by the target-generating structures 136. The targeting pattern 296 includes a circle 298 comprising an X pattern 300 within the circle 298. One target-generating structure (136a for example) may generate the circle 298, while the other target-generating structure (136b for example) may generate the X pattern 300. The target-generating structures 136a, 136b may be configured so that when the mobile device 18 is at an optimal distance from the barcode 142, the circle 298 and the X pattern 300 may intersect each other to form the depicted targeting pattern 296.

FIG. 8D shows another example of a targeting pattern 302 generated by the target-generating structures 136. The targeting pattern 302 may include an intense illumination in a pattern of one or more quadrilaterals such as a rectangular or square quadrilateral 304 which is/are bounded by a distinct drop in intensity (e.g. a sharp contrast at the edges of the rectangular or square quadrilateral 304). More specifically, the area around the perimeter of the illuminated rectangular or square quadrilateral 304 may be illuminated (if at all) at an intensity much less than the intensity of illumination within the rectangular or square quadrilateral 304.

The illuminated rectangular or square quadrilateral 304 may be, for example, illuminated by LEDs projecting (or appearing) blue or white and in the shape of the rectangular or square quadrilateral 304. The length of the rectangular or square quadrilateral 304 in a first direction (direction 308) may approximately coincide with the width of the field of view of the camera assembly 36 of the mobile device 18 (or the width of the system field of view if the attachment alters the field of view of the camera assembly 36); and the length of the rectangular or square quadrilateral 304 in a second direction (direction 306), orthogonal to the first direction 308, may approximately coincide with the height of the field of view of the camera assembly 36 of the mobile device 18 (or the height of the system field of view if the attachment alters the field of view of the camera assembly 36); and, in each case, may be within a central portion of the field of view of the camera assembly 36 of the mobile device 18 as depicted in FIG. 5A.

Stated another way, the angle at which the illumination diverges from the target-generating structure 136 in the first direction 308 may be approximately the same angle as the field of view of the camera assembly 36 in the first direction 308 (or the same angle as the system field of view if the attachment alters the field of view of the camera assembly 36). Similarly, the angle at which the illumination diverges from the target-generating structure 136 in the second direction 306 may be approximately the same angle as the field of view of the camera assembly 36 in the second direction 306 (or the same angle as the system field of view if the attachment alters the field of view of the camera assembly 36). As such, the targeting pattern 302 not only provides the user with an indication of the field of view of the camera assembly 36 (or the system field of view), in both the first direction 308 and the second direction 306, but the targeting pattern 302 also illuminates substantially all of the field of view in one or both of the first direction and the second direction with an intensity of illumination that does not significantly vary within the targeting pattern 302 but drops significantly at the perimeter of the targeting pattern 302.

As discussed, the target-generating structure 136 may include its own light source 146a, 146b (as shown in FIG. 7B) and collimate illumination therefrom to produce the applicable distinct targeting pattern. The illumination source may be of a particular wavelength (e.g. red or blue light) or may be white illumination (broad spectrum) and may include a filter 214a, 214b (which will be explained in detail with reference to FIG. 9) to pass only the particular wavelength used to generate the distinct targeting pattern by attenuating other wavelengths.

Alternatively, the target-generating structure 136 may culminate and otherwise shape illumination from the white light source 84 of the mobile device 18 utilizing a collimating lens and/or a pattern-generating surface in both the first direction and the second direction to project the applicable targeting pattern into the target area 140. In such a case, as shown in FIG. 9, the target-generating structure 136 may include filters (214a, 214b) which pass a narrow band of the visible illumination spectrum, such as red illumination or blue illumination, such that the white illumination (broad spectrum) from the mobile device 18 is filtered and the targeting pattern generated by the combination of the white illumination source and the filter is a specific color, such as blue or red.

The attachments described herein may include supplementary exposure illumination systems as a component of the barcode-reading enhancement system for a mobile device. More specifically, the supplementary exposure illumination systems may include one or more elements which project (or alter the projection of) diffuse illumination into the target area 140 in such a manner that illumination reflected from a barcode 142 and imaged onto the photo sensor 42 produces image characteristics that improve the decode-ability of the image. Image characteristics which improve the decode-ability of the image include: i) increased contrast between illumination reflected from bars (e.g., first modules in a 2D code) versus illumination reflected from spaces (e.g., second modules in a 2D code), and ii) even contrast (e.g., no hot spots, dead zones, or other significant contrast difference) of illumination reflected from bars (or first modules) across the entire barcode 142 and similarly even contrast of illumination reflected from spaces (or second modules) across the entire barcode 142.

Figure 9:
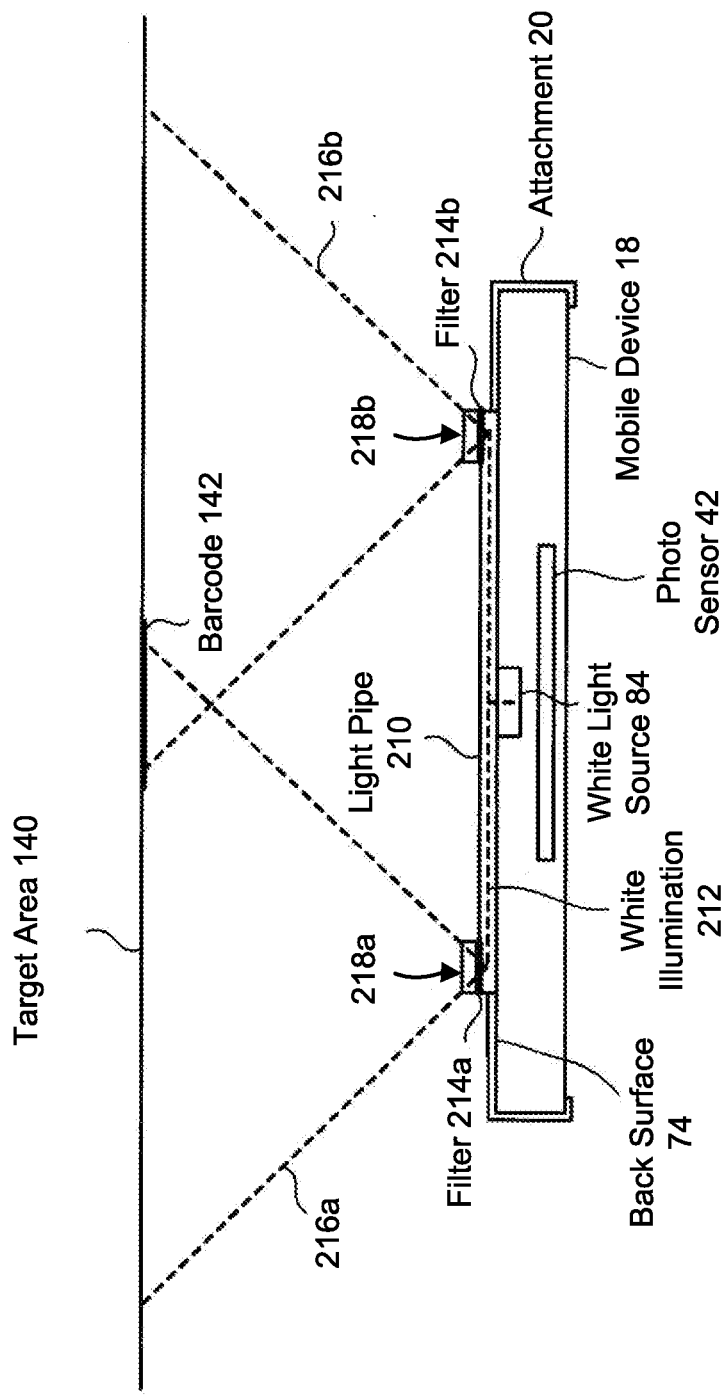
FIG. 9 illustrates an exemplary exposure illumination system useful for implementing in an attachment of a barcode-reading enhancement system.

FIG. 9 depicts an example of a mobile device attachment 110 (shown as a cross section of an encapsulating attachment) that includes illumination elements for optimizing illumination for barcode reading. The mobile device 18 includes a white light source 84. The attachment 110 may include a light pipe 210 that redirects white illumination 212 provided by the white light source 84 of the mobile device 18. More specifically, utilizing total internal reflection, the light pipe 210 propagates the white illumination 212 in a direction parallel to the back surface 74 of the mobile device 18 towards one or more illumination emanating structures

218a, 218b which are displaced from the white light source 84 within the plane defined by the back surface 74 of the mobile device 18.

Each illumination emanating structure 218a, 218b redirects at least a portion of the white illumination 212 propagating through the light pipe 210 towards a barcode 142 present within the target area 140 as exposure illumination 216a, 216b. Each emanating structure 218a, 218b may include any permutation of the prism 148a, 148b (not shown in FIG. 9 but discussed with respect to FIG. 7B), collimating lens 150a, 150b (not shown in FIG. 9 but discussed with respect to FIG. 7B), pattern-generating surface 152a, 152b (not shown in FIG. 9 but discussed with respect to FIG. 7B), and one or more filters 214a, 214b. The one or more filter(s) 214a, 214b may include: i) a narrow band filter (e.g. a single-color filter passing a single color of illumination such as red, blue, or another color); ii) a low pass filter passing all color bands below a predetermined wavelength; and/or iii) a high pass filter passing all color bands above a predetermined wavelength. When the one or more filters 214a, 214b are a narrow band filter (e.g. a single color filter), the exposure illumination 216a, 216b may be a single color (e.g., red, blue, or another single color). The redirection of illumination by the illumination emanating structures 218a, 218b may occur by reflection from a chamfered end of the light pipe 210 positioned directly below the illumination emanating structures 218a, 218b.

In some embodiments, the light pipe 210 and the illumination emanating structures 218a, 218b may be configured (positioned) such that the exposure illumination 216a, 216b is offset from the camera's photo sensor 42 (in the plane defined by the back surface 74 of the mobile device 18) in order to prevent glare. In other words, the exposure illumination 216a, 216b may be directed toward the target area 140 from locations that are not directly in front of the camera's photo sensor 42.

FIG. 9 depicts just one example of a supplementary exposure illumination system as a component of the barcode-reading enhancement system for a mobile device. Other supplementary exposure illumination systems may include any of the optic elements (including illumination-generating LEDs) which form a direct bright field illumination system, a diffuse bright field illumination system, and a dark field illumination system as described in U.S. patent application Ser. No. 14/510,341, entitled "DIFFUSE BRIGHT FIELD ILLUMINATION SYSTEM FOR A BARCODE READER," filed on Oct. 9, 2014, and commonly assigned with the present application. The content of the Ser. No. 14/510,341 application is hereby incorporated by reference in its entirety. It should further be appreciated that the supplementary exposure illumination systems utilizing the optic elements of the direct bright field illumination system, the diffuse bright field illumination system, and the dark field illumination system from the Ser. No. 14/510,341 application may further utilize the corresponding illumination sources in conjunction with such optics.

The attachments described herein may include a supplementary optic system as a component of the barcode-reading enhancement system for a mobile device. An "optic system" may be any set of one or more components positioned in the field of view 38 of a camera assembly 36 to modify one or more parameters regarding the light received by the camera, such as the quantity of the light received, the optical pathway along which the light is received, the angular size of the field of view, the depth of field, the focus distance, the f-number, and/or the wavelength(s) of the light received. Thus, an optic system, in various components, may include any of various components such as lenses, filters, mirrors, apertures, and the like. Stated another way, the one or more optical elements within the field of view 38 of the camera assembly 36, in combination with the lens assembly 40 of the camera, define a barcode-reading optic system (the combination) which provides superior barcode-reading capabilities over the lens assembly 40 alone.

Figure 10B:
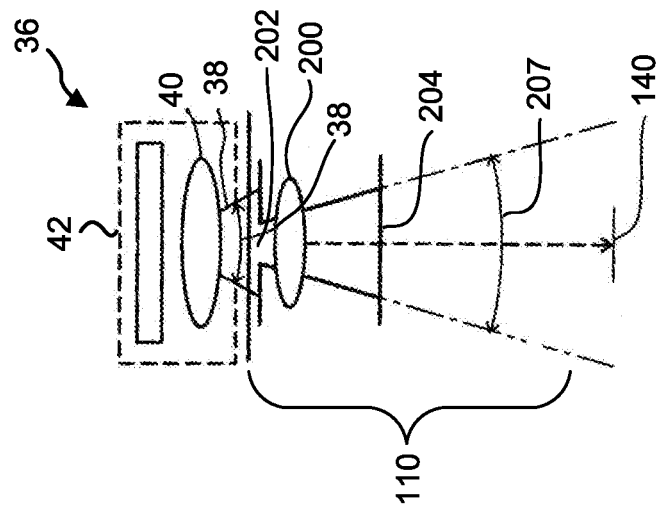
FIGS. 10A-10D illustrate exemplary supplementary optics useful for implementing in an attachment of a barcode-reading enhancement system.
Figure 10A:
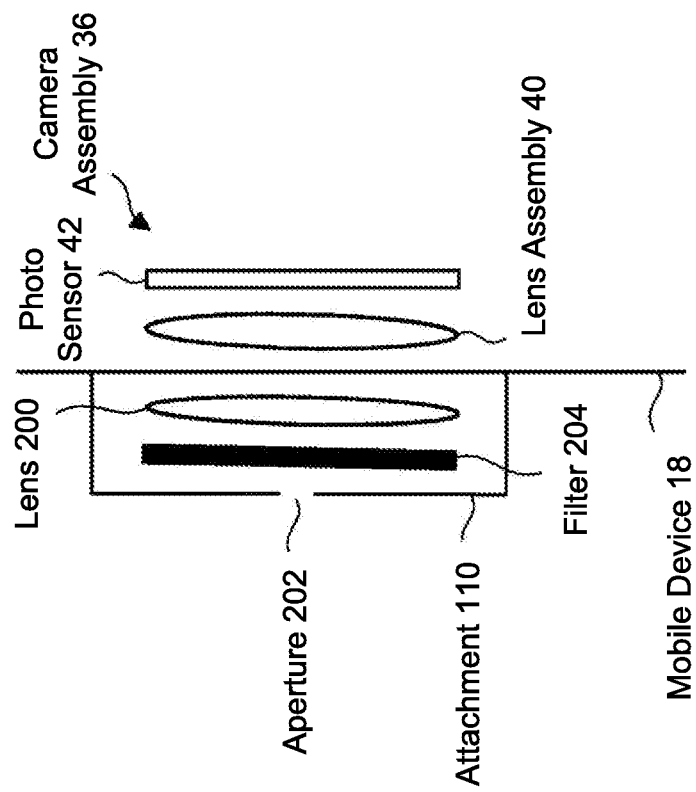

FIGS. 10A and 10B depict examples of a mobile device attachment 110 (shown as a mounted attachment) that includes a supplementary lens system that includes permutations of: i) one or more lens(es) 200; ii) optical filter(s) 204; and iii) an aperture 202.

The aperture 202 limits the amount of light that reaches the camera's photo sensor 42 through the camera's lens assembly 40. More specifically, the aperture 202 may be an aperture within an opaque barrier material which defines the aperture (f-number) of the supplementary lens system and, when part of the barcode-reading optic system, may define the optical aperture (f-number) of the barcode-reading optical system.

The aperture of the barcode-reading optical system, as defined by the aperture 202, may provide for an increased depth of field (e.g. a system depth of field) over the depth of field provided by the lens assembly 40. With increased depth of field, an image on the photo sensor 42 sufficiently sharp (focused) for barcode reading may be achieved without the need for autofocusing and therefore the decode response time may be improved because the barcode-reading process does not require a time-consuming autofocusing step.

The one or more lens(es) 200 may alter the field of view 38 of the camera assembly 36 and/or magnification of the camera assembly 36 (e.g. provide a system field of view 207 that is different from the field of view 38 of the camera assembly 36).

The one or more filter(s) 204 may include: i) a narrow band filter (e.g. a single-color filter passing a single color of illumination such as red, blue, or another color); ii) a low pass filter passing all color bands below a predetermined wavelength; and/or iii) a high pass filter passing all color bands above a predetermined wavelength.

For example, it may be desirable to capture predominantly light of a relatively narrow segment of the visible portion of the electromagnetic spectrum, such as red light with a wavelength of approximately 660 nm. The filter 204 may thus have a colored tint and/or polarization with a narrow wavelength band desired for image capture for effective barcode decoding.

As mentioned previously, the parameters of the camera assembly 36, such as the angular size of the camera field of view 38, the range of focus depths, and the depth of field of the camera assembly 36 may not be ideal for barcode capture and/or decoding. Thus, any or all of these parameters may be modified by the optic system of the attachment. Thus, the system field of view 207 may have an angular size that is significantly smaller than the angular size of the camera field of view 38. This may be because conventional photography often uses a wider lens angle than is needed for capturing barcode images.

The system field of view 207 may provide a system ratio of focal length to entrance pupil diameter that is greater than a camera ratio of focal length to entrance pupil diameter of the unmodified optic system of the camera assembly 36 such that the optic system of the attachment acts to increase the f-stop of the camera lens assembly 40.

Figure 13:
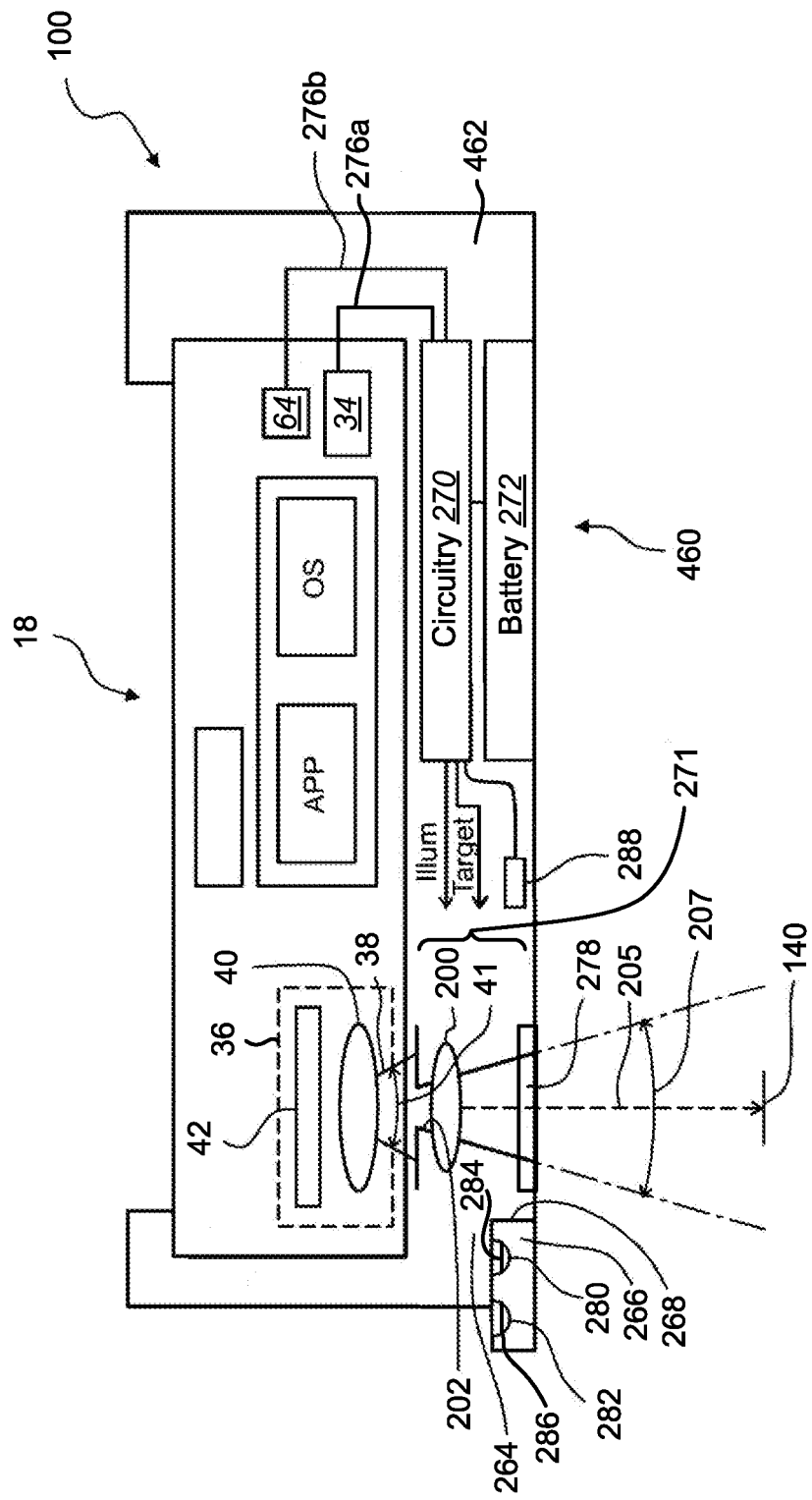
FIG. 13 illustrates an exemplary attachment for a barcode-reading enhancement system with a target-generating mechanism, an exposure illumination system and supplementary optics useful for implementing in an attachment of a barcode-reading enhancement system.

Further, the mobile device 18 and the optic system of the attachment 100, combined, may have a depth of field (not shown), consisting of the depth along the system optical pathway 205 (e.g., as shown in FIG. 13) through which an object may remain in focus (to a degree acceptable for barcode capture and/or decoding) on either side of the system focus depth. A relatively large depth of field may advantageously permit barcode capture and/or decoding at a wider range of distances between the mobile device 18 and the barcode to be captured. Thus, the attachment lens may advantageously provide a relatively larger depth of field, particularly at shorter focus depths, than the camera assembly 36, unaided.

The system field of view 207 may be centered on a system optical pathway, which may be the same as the optical pathway 205 for the camera assembly 36 without the attachment. More specifically, the camera assembly 36 may be designed to capture images centered on an optical pathway 205 perpendicular to the back surface 74 of the mobile device 18. In certain embodiments this optical pathway is not modified by the attachment; thus, the system optical pathway 205 may be the same as the optical pathway for the camera assembly 36. In other embodiments, an attachment may provide a different optical pathway for barcode scanning, as will be shown and described with respect to FIGS. 10C and 10D.

Figure 10C:
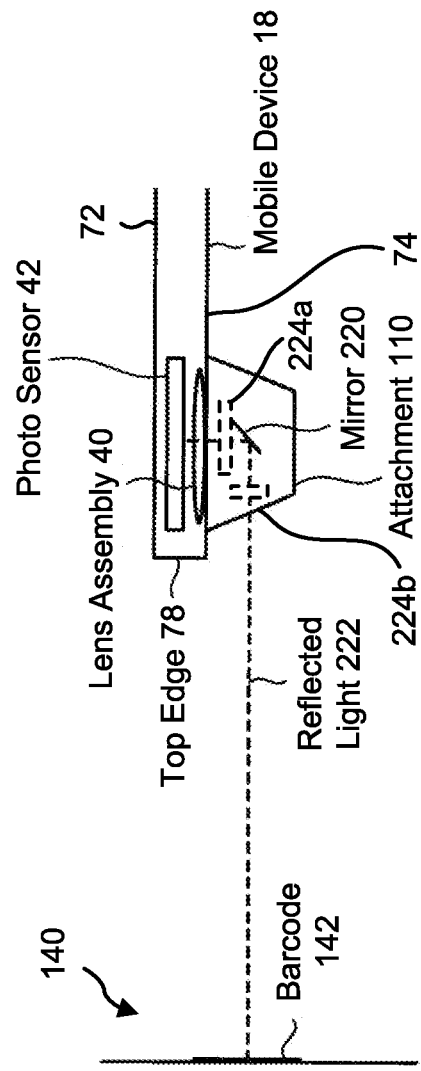

FIG. 10C depicts an example of a mobile device attachment 110 (shown as a mounted attachment) that includes a mirror 220 that changes the optical path of illumination (i.e. reflected light) 222 reflected from the barcode to the mobile device 18 from a direction that is generally parallel to the face surface 72 and the back surface 74 of the mobile device 18 to a direction that is generally orthogonal to the lens assembly 40 and the photo sensor 42 of the camera assembly 36 of the mobile device 18.

The attachment 110 permits a user of the mobile device 18 to attempt to read a barcode 142 positioned within a field of view that is beyond the top edge 78 of the mobile device by aiming the top side (the top edge 78) of the mobile device 18 at the barcode 142. The reflected light 222 reflected from the barcode 142 is redirected by the mirror 220 toward the mobile device's focusing lens assembly 40, which focuses the reflected light 222 onto the photo sensor 42.

Stated another way, the field of view 38 of the camera assembly 36 would have a center line that is generally orthogonal to the planar back surface 74 of the mobile device 18 (and orthogonal to the planar display on the face surface 72 of the mobile device 18) and that extends towards a target area 140 from the back surface 74 of the mobile device 18. The mirror 220 is within such a field of view and folds the field of view such that its center line is parallel to the back surface 74 of the mobile device 18 (and the display on the face surface 72 of the mobile device 18) and extends towards a target area 140 from the top side of the mobile device 18.

In the depicted example, the mirror 220 is positioned so that the reflected light 222 is redirected by 90°. Alternatively, the mirror 220 may be positioned so that the reflected light 222 is redirected by a different angle. For example, FIG. 10D depicts a mirror 220 positioned so that the reflected light is redirected by an angle 221 between 30 and 60 degrees from perpendicular to the back surface 74.

Figure 10D:
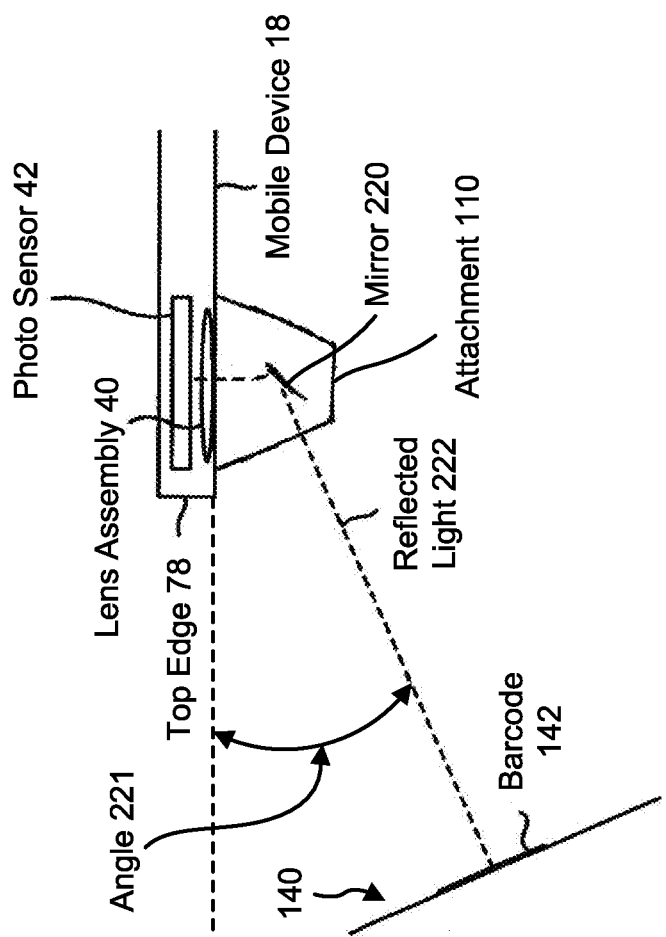

It should be appreciated that, although not depicted in either FIG. 10C or 10D, the attachment 110, in addition to including the mirror 220 to redirect the reflected light 222, may further include any permutation of optic components discussed with respect to FIGS. 10A and 10B for purposes of altering one or more of the depth of field, the f-number, the angle of the field of view, or the focal plane of the lens assembly 40 of the camera assembly 36. Such optic components may be located within the region 224a of the attachment 110 or the region 224b of the attachment 110.

FIGS. 11A, 11B, 12A, 12B, 12C, 12D, 13, 14, and 15 depict additional examples of attachments which may be, or form, a part of the barcode-reading enhancement system for a mobile device. Although each attachment depicted in FIGS. 11A, 11B, 12A, 12B, 12C, 12D, 13, 14, and 15 is depicted in one of the general structures described with respect to FIG. 4A, 4B, 5A, 5B, 6A, or 6B, the arrangement of target-generating mechanisms, supplementary illumination systems, and supplementary optic systems described above with respect to FIGS. 7A, 7B, 8A-8D, 9, and 10A-10D may be utilized in any of the general structures.

Figure 11A:
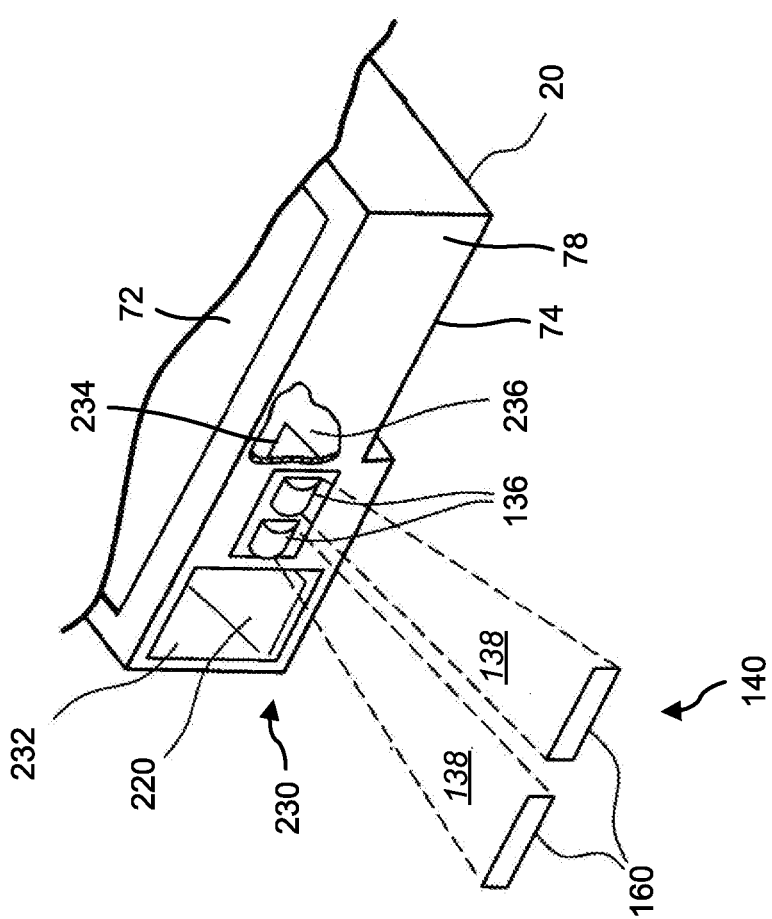
FIGS. 11A and 11B illustrate an exemplary attachment for a barcode-reading enhancement system which includes a target-generating mechanism and supplementary optics.

FIG. 11A depicts an attachment 20 (shown in partial view) with a target-generating structure 136 which projects a targeting beam 138 from the top edge 78 of the mobile device 18 to the top side of the mobile device 18 to form a targeting pattern 160 within a target area 140 whereas the attachments depicted in FIGS. 7A and 7B include a target-generating structure 136 which projects a targeting beam 138 from the back surface 74 of the mobile device 18 and generates the targeting pattern 160 within a target area 140.

The attachment 20 may further include a structure 230 (with a mirror 220) as depicted in, and described with respect to, FIG. 10C or 10D for redirecting illumination reflected from a barcode in the target area extending from the top edge 78 of the mobile device 18 towards the lens assembly 40 of the camera assembly 36 on the back surface 74 of the mobile device 18. More specifically, the mirror 220 may be a first mirror within a first chamber 232 within the field of view 38 of the camera assembly 36 (not shown) on the back surface 74 of the mobile device 18. The first mirror 220 may be positioned at approximately a 45-degree angle to the center line of the field of view 38 of the camera assembly 36 to fold the field of view of the camera by approximately 90 degrees such that the field of view 38 of the camera assembly 36 extends towards the target area 140 extending from the top edge 78 (the top side) of the mobile device 18 instead of from the back surface 74 of the mobile device 18 as described with respect to FIG. 10A. Alternatively, the first mirror 220 may be positioned at an angle between 30 degrees and 60 degrees from the plane of the back surface 74 of the mobile device.

Further as described with respect to FIGS. 10A and 10B (and although not depicted in FIG. 11A), any permutation of the optics described with respect to FIGS. 10A and 10B may be positioned within the first chamber 232 for purposes of altering one or more of the depth of field, the f-number, the angle of the field of view, or the focal plane of the lens assembly 40 of the camera assembly 36.

The target-generating mechanism may include a second mirror 234, within a second chamber 236, generally parallel to the first mirror 220, but aligned with the white light source 84 on the back surface 74 of the mobile device 18, and may fold the illumination from the white light source 84 (by the same angle at which the first mirror 220 folds the field of view of the camera assembly 36) towards the target area 140 extending from the top edge 78 of the mobile device 18. The first chamber 232 may be separated from the second chamber 236 by an opaque wall or baffle to prevent illumination within the second chamber being incident on the first mirror 220 and reflected by the first mirror 220 onto the lens assembly 40 of the camera assembly 36 and thereby degrading the image quality of an image of a barcode 142 within the target area 140.

The target-generating mechanism may further include any of the target-generating structures 136 described with respect to FIGS. 7A and 7B for forming and projecting the targeting beams 138 of a distinct illumination pattern into the target area 140. In FIG. 11A, the target-generating structure 136 is depicted as two culminating lens structures arranged horizontally (within a line generally parallel to the lines formed by the interface of the top edge 78 with each of the face surface 72 and the back surface 74 of the mobile device). Each of the collimating lens structures may project a targeting pattern 160 into the target area 140 which is similar to the targeting pattern 400 depicted in FIG. 7D. Again, the targeting pattern 400 may be projected into the center of the field of view and the angular size of the targeting pattern with respect to distance from the mobile device 18 may be the same as the angle of the field of view and therefore may serve as both the distinct illumination pattern indicating the field of view and the diffuse illumination (within the field of view) for exposure illumination.

Figure 11B:
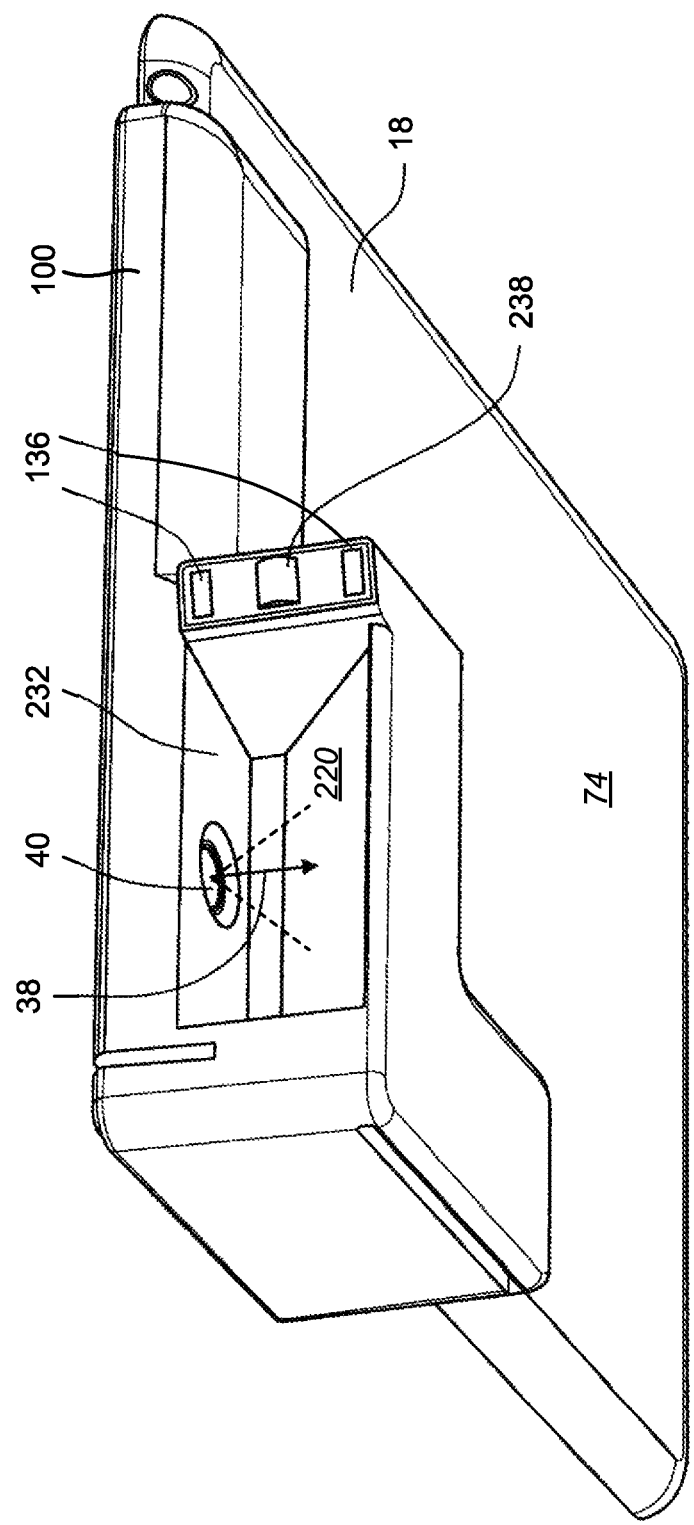

FIG. 11B depicts an attachment (depicted as a corner- or edge-mounted attachment 100) which is similar in structure to the encapsulating attachment 110 of FIG. 11A but with target-generating structures 136 arranged vertically (within a line generally perpendicular to the lines formed by the interface of the top edge 78 with each of the face surface 72 and the back surface 74 of the mobile device). The attachment 100 of FIG. 11B may further include an exposure illumination structure 238 which may utilize any of the elements described with respect to FIG. 9 or any of the supplementary exposure illumination systems which form the direct bright field illumination system, the diffuse bright field illumination system, and/or the dark field illumination system as described in U.S. patent application Ser. No. 14/510,341.

As stated with respect to FIG. 11A, the target-generating structure 136 may utilize the second mirror 234 to redirect illumination generated by the white light source 84 into the target-generating structure 136 to form targeting beams 138 or may utilize illumination sources within the attachment 110. With respect to the embodiment of FIG. 11B, one of the targeting illumination sources or the exposure illumination source may be the white light source 84 of the mobile device 18 (reflecting from a mirror) and the other of these may be an illumination source within the attachment.

FIGS. 12A, 12B, 12C and 12D represent an attachment 110 (shown as an encapsulating attachment) with a target-generating structure 136 that may be repositioned and used for any embodiment described herein where the white light source 84 of the mobile device 18 provides illumination for the target-generating structure 136 (which as discussed with respect to FIG. 7D may also be the exposure illumination system). The repositionable target-generating structure 136 is useful for uses of the mobile device 18 where, in addition to utilizing the white light source 84 and the camera assembly 36 for barcode reading, the white light source 84 and the camera assembly 36 are used for traditional photography.

Figure 12B:
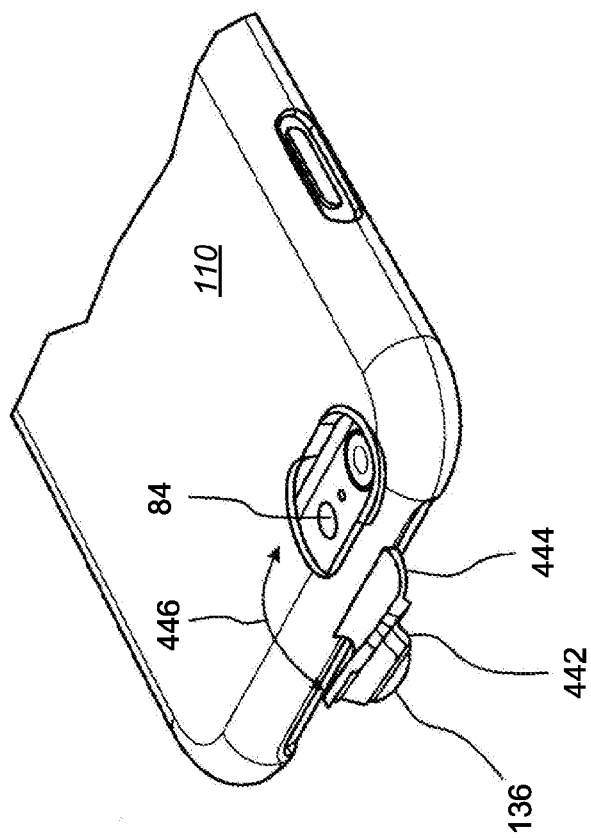
Figure 12A:
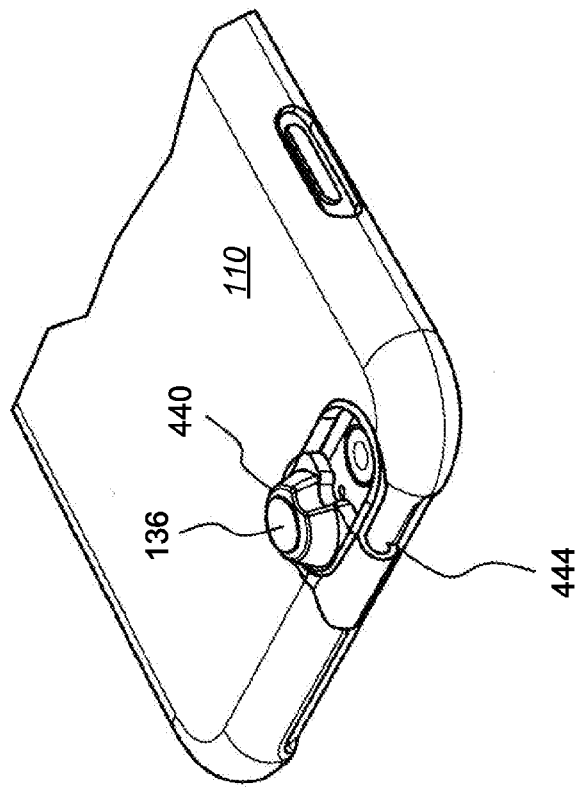

FIGS. 12A and 12B depict the target-generating structure 136 as being pivotally repositionable between: i) a first position 440 as depicted in FIG. 12A wherein the target-generating structure 136 is positioned in front of the white light source 84 (i.e. an illuminating torch) such that illumination from the white light source 84 is shaped by the target-generating structure 136 into a distinct targeting illumination pattern; and ii) a second position 442 as depicted in FIG. 12B wherein the target-generating structure 136 is positioned outside of the illumination field of the white light source 84 such that the illumination from the white light source 84 is unmodified by the target-generating structure 136 and can be used for illumination when using the camera assembly 36 of the mobile device 18 to take photographic pictures.

As depicted in FIGS. 12A and 12B, the target-generating structure 136 may be secured to the attachment 110 by a flexible band 444 such that the target-generating structure 136 may be pivoted in the direction 446 between position 440 and position 442 by flexure of the flexible band. It is also envisioned that a more traditional hinge/hinge pin structure may also provide for pivoting the target-generating structure 136 between position 440 and position 442 in alternative embodiments.

FIGS. 12C and 12D depict the target-generating structure 136 being laterally repositionable between: i) a first position 448 as depicted in FIG. 12C wherein the target-generating structure 136 is positioned in front of the white light source 84 (i.e. an illuminating torch) such that the illumination from the white light source 84 is shaped by the target-generating structure 136 into a targeting pattern; and ii) a second position 450 as depicted in FIG. 12D wherein the target-generating structure 136 is positioned outside of the illumination field of the white light source 84 such that the illumination from the white light source 84 is unmodified by the target-generating structure 136 and can be used for illumination when using the camera assembly 36 of the mobile device 18 to take photographic pictures. As depicted in FIGS. 12C and 12D, the target-generating structure 136 may be secured to the attachment 110 within a channel 452 such that the target-generating structure 136 may be laterally repositioned in the direction 454 between position 448 and position 450.

FIG. 13 depicts another exemplary attachment (shown as an encapsulating attachment 100) for a mobile device 18. The attachment 100 may have a housing 460 defining an interior cavity 462 of the attachment 100 which is separate from a cavity in which the attachment 100 encapsulates the mobile device 18.

The cavity 462 within the housing 460 may be divided into one or more chambers separated by an opaque barrier in order to restrict light passage from components in one chamber to components in another. For example, the cavity 462 may have a first chamber 264 and a second chamber 266. An opaque barrier 268 may separate the first chamber 264 from the second chamber 266 in a manner that prevents light from either of the first chamber 264 and the second chamber 266 from passing directly into the other chamber.

The first chamber 264 may be larger than the second chamber 266, and may contain components such as a supplementary optic system 271, attachment control circuitry 270, and an attachment battery 272.

The supplementary optic system 271 may be any of the embodiments described with respect to FIGS. 10A and 10B. A window 278 within the housing 460 may be in alignment with the supplementary optic system 271 so that illumination reflected from the target area 140 is able to enter the first chamber 264 via the window 278 to reach the supplementary optic system 271 and, after passing through the supplementary optic system 271, be received and captured by the camera assembly 36 of the mobile device 18.

In some embodiments, the window 278 may be transparent and function to enclose the first chamber 264. In other embodiments, the window 278 itself may be a component of the supplementary optic system 271 for modifying one or more of the depth of field, the f-number, the angle of the field of view, or the focal plane of the lens assembly 40 of the camera assembly 36.

For example, the window 278 may filter illumination reflected from the target area 140 (e.g. pass and/or attenuate certain wavelengths of illumination). The filter characteristics may include any of the filter characteristics described with respect to the filter 214a, 214b of FIG. 9.

The second chamber 266 may include one or more of a targeting illumination system 280 and an exposure illumination system 282. The targeting illumination system 280 may utilize an illumination source 284 and any of the targeting structures 136 described with respect to FIG. 7A or 7B to project a targeting beam (not shown) with a distinct illumination pattern (which may be any of the targeting patterns described with respect to FIGS. 8A, 8B, 8C and 8D) towards the target area 140.

The exposure illuminating system 282 may utilize an exposure illumination source 286 and the exposure illumination structure described with respect to FIG. 9 or U.S. patent application Ser. No. 14/510,341. The exposure illumination source 286 may include various light sources, including but not limited to lasers, LED's, incandescent lights, fluorescent lights, and the like.

The attachment control circuitry 270 of this embodiment may control each of the targeting illumination systems 280 and the exposure illumination system 282. The targeting illumination system 280 may be configured to project light into the target area 140 prior to and/or after image capture so as to avoid interfering with the decode-ability of the barcode image. Conversely, the exposure illumination system 282 may project illumination into the target area 140 during image capture.

The targeting illumination system 280 and the exposure illumination system 282 may also be connected to an attachment battery 272, either independently of the attachment control circuitry 270, or via the attachment control circuitry 270. Thus, the targeting illumination system 280 and the exposure illumination system 282 may be controlled by the attachment control circuitry 270 and powered by the attachment battery 272.

The attachment control circuitry 270 may further include, or be electrically connected to, an attachment communications interface, which may be coupled to the mobile device power/data connector 64 via a link 276a and/or the speaker/microphone connector 34 via a link 276b.

The housing 460 may further contain a user control 288, which may be actuated by the user to perform various functions, such as initiating the capture of a barcode. The user control 288 may include any form of user input known in the art, including but not limited to switches, levers, knobs, touch screens, microphones coupled to voice-operation software, and the like. The user control 288 may advantageously take the form of a trigger that can be actuated, for example, with the index finger of the user. In alternative embodiments, the housing 460 may be modified to have a pistol grip or other grip that enhances the ergonomics of the housing 460 and/or facilitates actuation of the user control similar to the housing depicted in FIG. 14.

Figure 14:
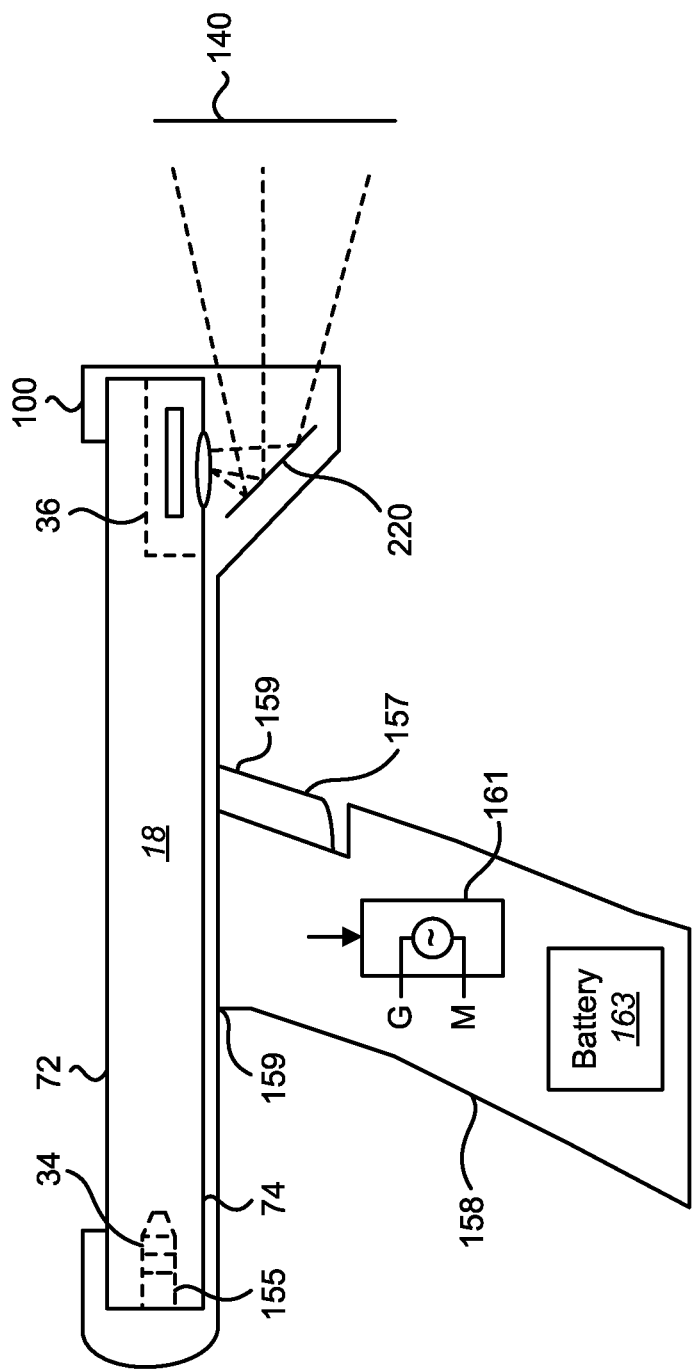
FIG. 14 illustrates an exemplary attachment for a barcode-reading enhancement system.

FIG. 14 depicts another exemplary attachment (shown as an encapsulating attachment 100 as an example) for a mobile device 18. The attachment 100 may have a handle 158 which extends downward away from the back surface 74 of the mobile device 18 and is sized and shaped to be gripped by an operator with the operator's thumb and forefinger being positioned at a shoulder 159 where the handle 158 meets a portion of the attachment 100 which is adjacent to the back surface 74 of the mobile device 18. When held in this manner the face surface 72 of the mobile device is visible to an operator looking downward.

A trigger switch 157 is positioned at the shoulder 159 and is intended to enable the operator to trigger reading of a barcode utilizing the same ergonomics of a typical "gun" type of barcode reader. The trigger switch 157 activates a trigger circuit 161.

The attachment 100 includes a microphone connector 155 (shown as a speaker/microphone male connector coupled within the speaker/microphone connector 34 of the mobile device 18).

The trigger circuit 161 includes an oscillator circuit configured to create a potential difference between the ground contact and the microphone contact of the speaker/microphone connector 155 that is detectable by the mobile device 18. The potential difference may be generated by physical movement of a magnet with respect to a coil with such physical movement being generated by pulling the trigger switch 157. A combination of springs and spring-activated switches may accentuate the movement of the magnet with respect to the coil and/or break the circuit to ensure that activation of the trigger switch 157 is detectable by the mobile device 18.

The attachment 100 may also include a structure described with respect to FIG. 10C or 10D for purposes of folding the optical path for illumination reflected from the target area 140 so that the field of view of the camera assembly 36 (e.g. the system field of view) is folded from the back surface 74 of the mobile device towards the target area 140 positioned at the top side of the mobile device 18. The attachment 100 also includes a battery 163 for supplying power to the components in the attachment 100.

Figure 15:
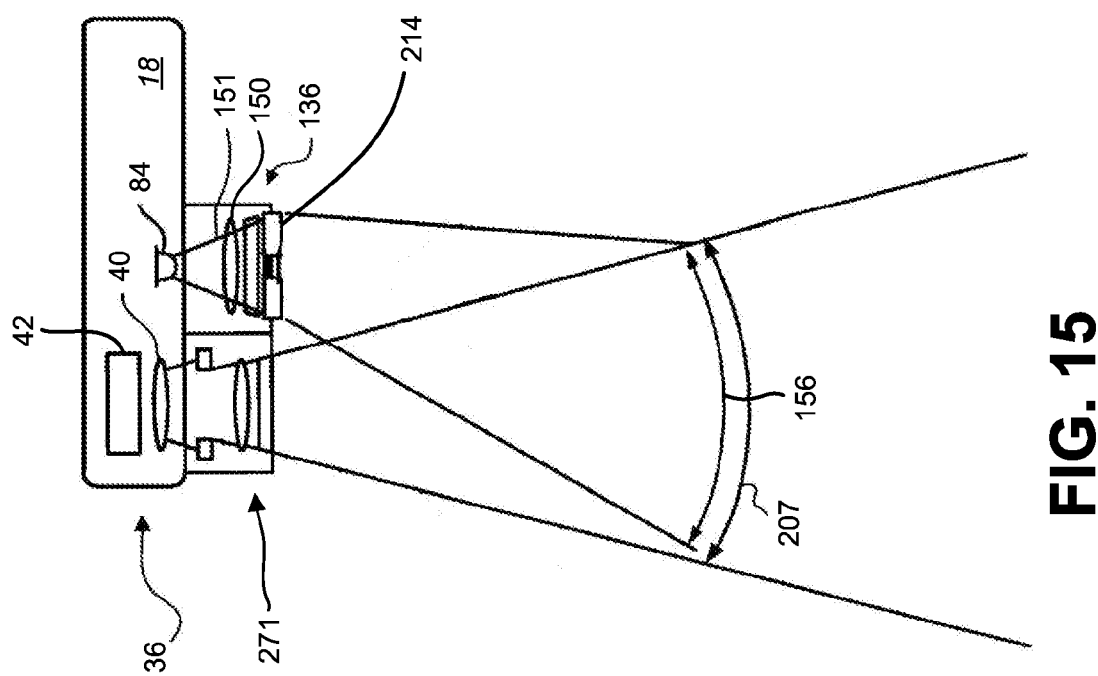
FIG. 15 illustrates an exemplary attachment for a barcode-reading enhancement system which includes a target-generating mechanism and supplementary optics.

FIG. 15 illustrates a mobile device 18 with an attachment 20 which may include supplementary optic system 271 for image capture and a target-generating structure 136 which utilizes the white light source 84 of the mobile device 18 to generate an intense targeting illumination pattern into the target area.

More particularly, the target-generating structure 136 may comprise a collimating lens 150 which is positioned within, and modifies, the field of illumination 151 of the white light source 84 into the shape of an intense targeting illumination pattern, which may be a pattern depicted in any of FIG. 8A, 8B, 8C or 8D. The target-generating structure 136 may include a filter 214 which may be a band pass filter or a low pass filter as described with respect to FIG. 19C for passing a certain color of illumination while attenuating wavelengths other than the certain color.

In a case where the intense targeting illumination pattern is as depicted in FIG. 8D with diffuse illumination across the field of view, the system illumination field 156 (e.g., illumination as modified by the target-generating structure 136) may substantially overlap with the system field of view 207. Thus, with the aid of the target-generating structure 136 the system field of view 207 may be effectively illuminated with diffuse illumination and the borders of the diffuse illumination (as depicted in FIG. 8D) may enable the user to properly position the mobile device 18 with respect to a barcode in the target area 140.

Figure 19A:
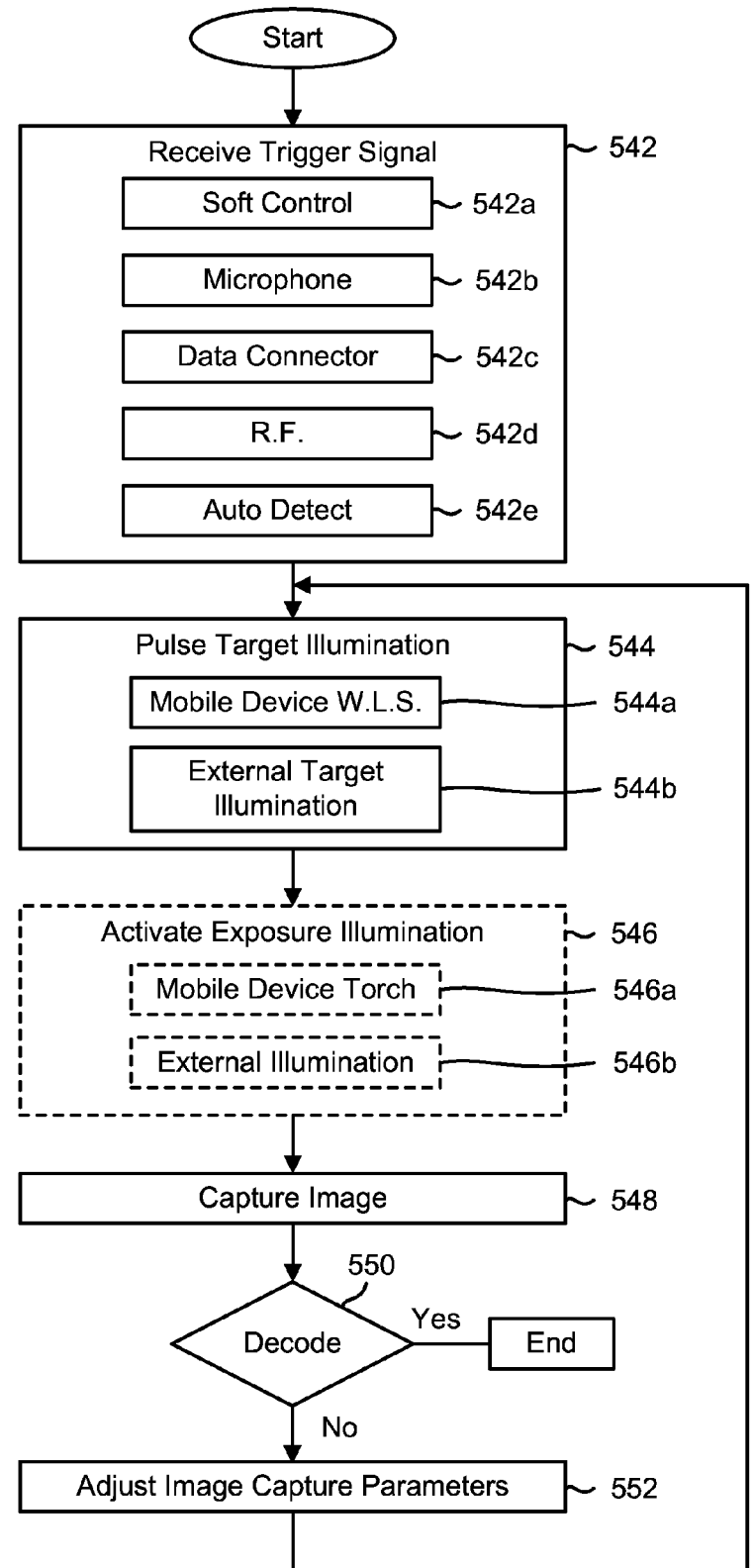
FIG. 19A depicts an exemplary method of target and exposure illumination and shutter control in accordance with one embodiment.
Figure 19B:
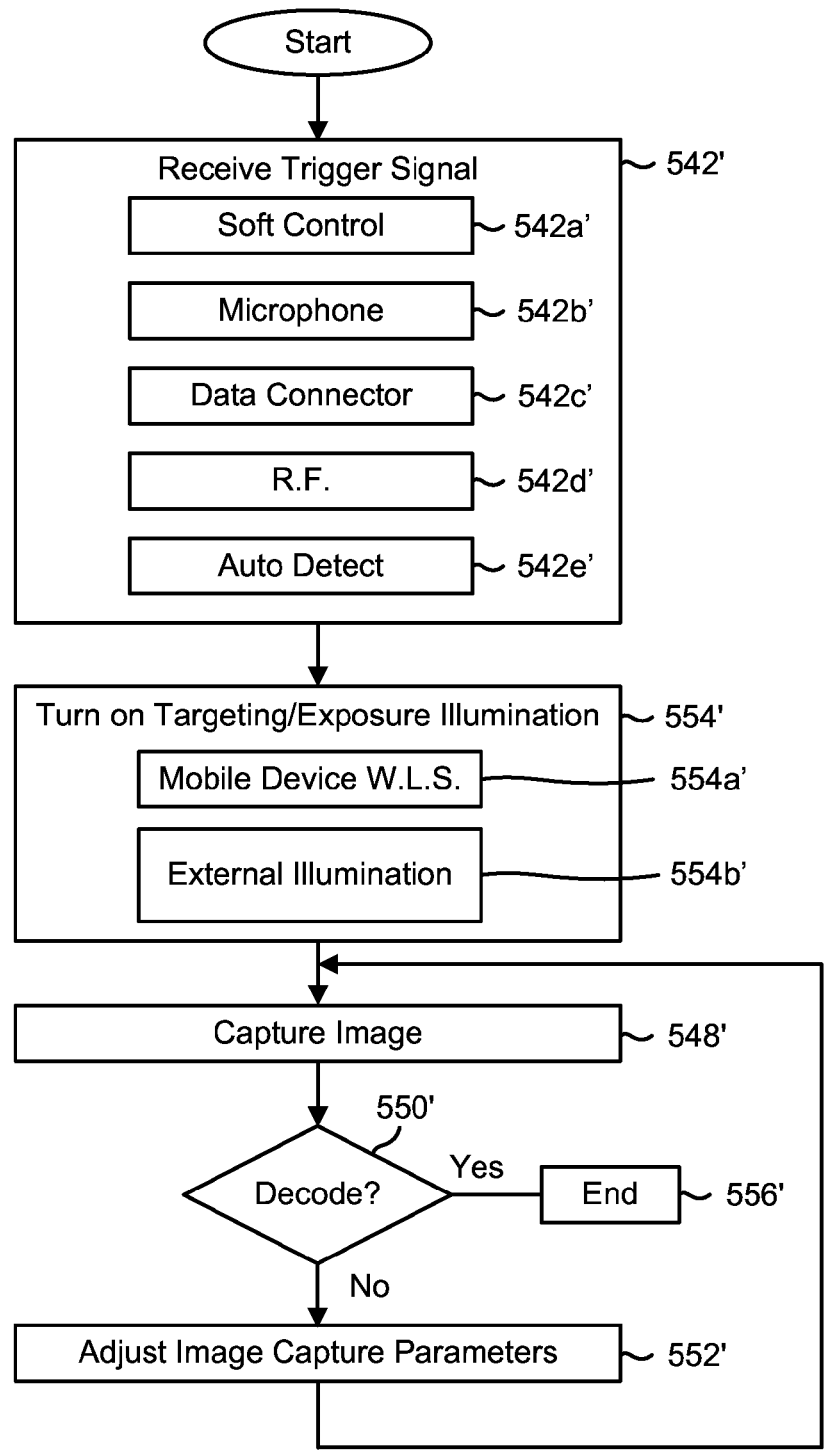
FIG. 19B depicts another exemplary method of target and exposure illumination and shutter control in accordance with another embodiment.
Figure 19C:
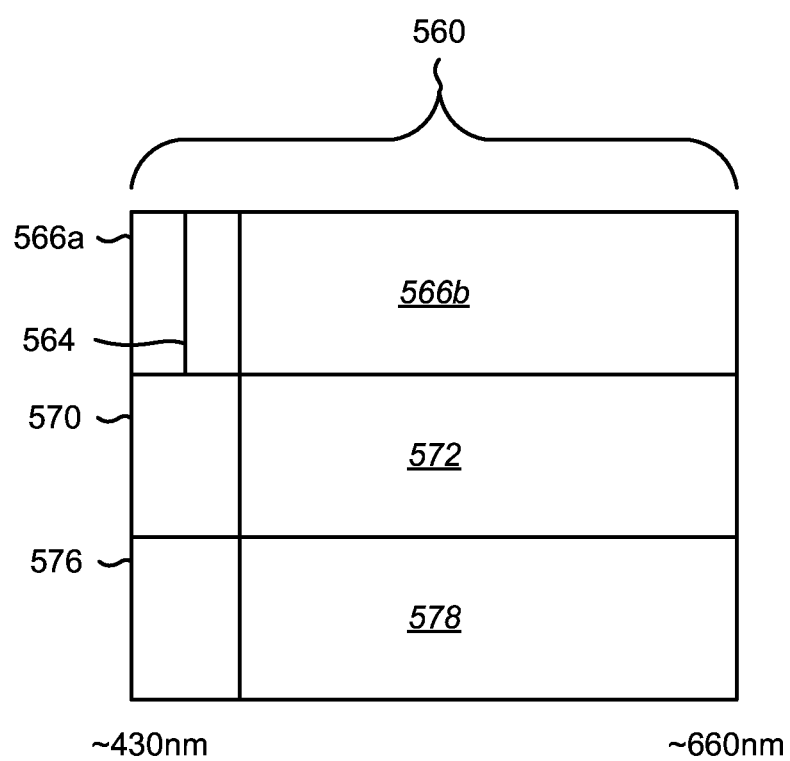
FIG. 19C represents a filtering arrangement for the targeting illumination and the supplementary optics.

In the event the targeting pattern does not provide diffuse illumination across the system field of view 207, the supplementary optic system 271 may include a high pass filter described with respect to FIG. 19C such that the illumination of the targeting pattern (as filtered) is attenuated by the high pass filter and does not affect the intensity of the illumination incident on the photo sensor 42.

The barcode-reading enhancement system of the present invention may include a barcode-reading application 500 that may be obtained from the application server 22a, 22b (shown in FIG. 1) and installed on the mobile device 18 as described with respect to FIG. 3A.

Figure 16:
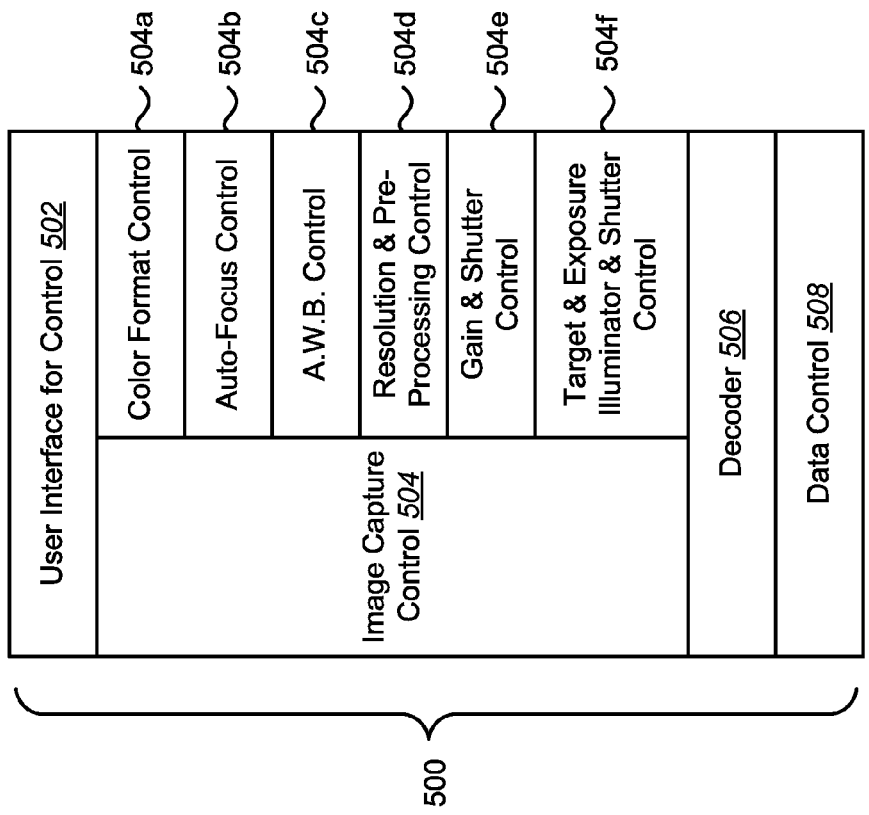
FIG. 16 illustrates exemplary methods useful for an application for a barcode-reading enhancement system.

FIG. 16 shows a block diagram of an exemplary barcode application 500. The exemplary barcode application 500 may include permutations of a user interface control method 502, image capture control methods 504, a decoder 506, and a data control method 508.

FIG. 17 depicts a state machine 642 useful for user interface control methods 502 of the barcode application 500. The state machine 642 may operate either in a user interface state 644 or in a data collection state 646.

When in the user interface state 644, the (capacitive touch) display screen 66 and the backlight for the display screen are active and the contents of the display screen 66 may be controlled by the barcode application 500. When in the data collection state 646, the (capacitive touch) display screen 66 may be turned off; the (capacitive touch) display screen 66 may be turned on, but the backlight may be turned off; or both the (capacitive touch) display screen 66 and the backlight may be turned on, but the backlight intensity may be set to a minimum. The data collection state 646 is intended for conserving power (i.e., for extending battery life) when the operator is using the mobile device 18 to read barcodes and does not need to simultaneously use the (captive touch) display screen 66 for manual data entry.

To transition 648 from the user interface state 644 to the data collection state 646, the barcode application 500 utilizing the data control methods 508 may make a processing call to the operating system of the mobile device 18 requesting to i) turn off the display and backlight; ii) turn off the backlight (in the event the operating system does not make the function of turning off the display available to the application); or iii) turn the backlight power to a minimum (in the event the operating system does not make the function of turning off the display or turning off the backlight available to the application). If none of the foregoing options are available, the barcode application may simply write a black image to the display and enter a state where all input though the touch panel is ignored, thereby giving the appearance that the display has been turned off.

When in the data collection state 646, multiple barcodes can be read in sequence (utilizing the camera and targeting structure described herein but not requiring use of the display for targeting) and processed, stored, and/or transmitted by the application without requiring any user interaction with the user interface. Examples of the functions that may be performed by the application when in the data collection state without requiring user input include the functions of the relay application described in co-pending U.S. patent application Ser. No. 14/319,193.

When a transition 650 to the user interface state 644 is required, the barcode application 500 may make a processing call to the operating system of the mobile device 18 requesting to i) turn on the display (i.e., the touch panel or backlight) in the event that these are turned off during the data collection state 646; ii) turn on the backlight (in the event the operating system does not make the function of turning off the display available to the application and therefore the display remains "on" while the backlight remains "off" during the data collection state 646); or iii) turn the backlight power up to a present level (in the event the operating system does not make the function of turning off the display or turning off the backlight available to the application, both remain "on" during the data collection state 646 while the backlight power has been turned down).

Events that may trigger transition 648 from the user interface state 644 to the data collection state 646 include user activation of a hardware control on the mobile device 18 or activation of a software control present on the display screen when in the user interface state 644. Events that may trigger transition 650 from the data collection state 646 to the user interface state 644 include user activation of a hardware control on the mobile device 18 or a signal from a remote software application which may include the application to which the mobile device 18 is sending decoded barcode data.

Returning to FIG. 16, the image capture control methods 504 may comprise permutations of color format control methods 504a, autofocus control methods 504b, auto-white balance control methods 504c, resolution and pre-processing control methods 504d, gain and shutter control methods 504e, and target and exposure illumination and shutter control methods 504f.

Permutations of these methods may be performed when the barcode application 500 enters the data collection state 646 such that the mobile device 18 is configured for barcode reading prior to the operator triggering or otherwise initiating a barcode read. Permutation of these methods may be performed immediately following an unsuccessful decode with adjustments made to certain image capture settings based on analysis of the image that yielded the unsuccessful decode so that the mobile device 18 is re-configured for barcode reading prior to the next image capture. Permutations of these methods may be performed after the user has triggered or otherwise initiated a barcode read but prior to actual image capture to configure the mobile device 18 for the image capture.

As stated with respect to FIGS. 2A and 2E, the camera assembly 36 may be capable of generating both Y.U.V and R.G.B. color formatted outputs. The color format control methods 504a may query whether the image sensor and/or associated circuitry has been set to provide an output in the Y.U.V. color space. If not, the color format control method 504a may issue a command to the operating system 48, the processor 44, or the system-on-chip circuits 92 to set the image sensor output to the Y.U.V. color space.

The R.G.B. format may commonly be used for general-purpose photography. However, for barcode reading and/or decoding, it may be advantageous to use the Y.U.V. format instead. This is because decoding a barcode image may be mostly reliant upon the pattern defined by the luminous intensity 168 (shown in FIG. 2E) of each pixel in the barcode image. Optionally, the first chromatic 170 and the second chromatic 172 may even be ignored by the application that decodes the barcode image.

Thus, the output module 91 of the system-on-chip circuits 92 may be set to provide the digital image output 162 in the form of the Y.U.V. data format 166 (or use Y.U.V data for the input to image processing circuits within the system-on-chip circuits 92). Accordingly, the application 50 may instruct the output module 91, directly, through the operating system 48, or through other control circuitry, to cause the output module 91 to provide the digital image output 162, to use, for image processing circuits, data in the Y.U.V format when the photo sensor 42 is to be used for capturing a barcode image and to return in the R.G.B. format for general photography when barcode capturing operations are complete.

In one embodiment, for barcode images, the output module 91 may be set to provide the digital image output 162, or use for image processing data in the form of the luminous intensity 168 for each pixel, and the first chromatic 170 and the second chromatic 172 may not even be provided or used. This may reduce the traffic on the data bus, reduce image processing time for image processing circuits, reduce the processing load of the processor 44, and/or save space in the image data buffer 89 of the memory 46.

As discussed with respect to FIG. 2A, the mobile device 18 may include an autofocus module 98. The autofocus module 98 may be optimized for photography. The image capture control methods 504 of the barcode application 500 may include autofocus control methods 504b for adjusting the autofocus settings of the autofocus module 98 for barcode image capture. More specifically, the distance between the mobile device 18 and a barcode 142 within a target area 140 may be within a relatively predictable range of distances which is a much smaller range of distances between the mobile device and the subject of a general-purpose photograph. Thus, using customized autofocus settings for barcode image capture may facilitate obtaining proper focus and/or expedite the image capture process.

Figure 18B:
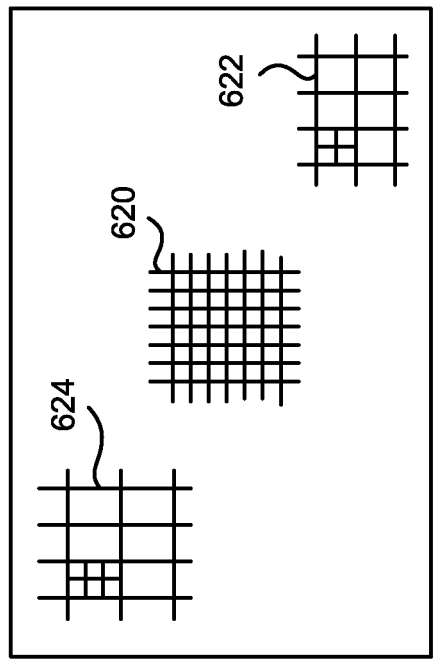
FIG. 18B illustrates exemplary resolution binning methods that can be used to reduce the resolution of a barcode image.
Figure 18A:
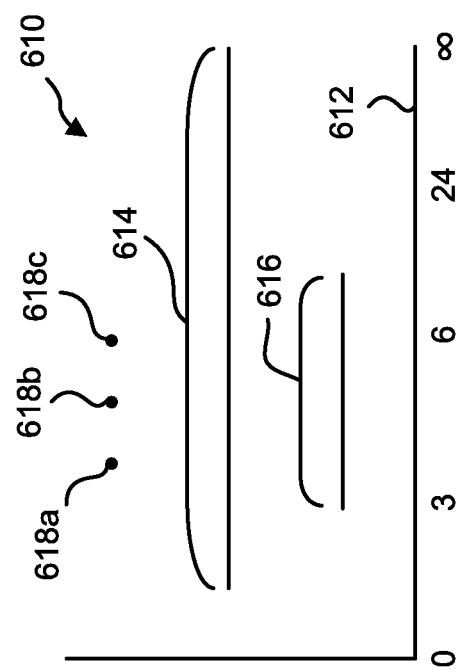
FIG. 18A illustrates exemplary autofocus options.

FIG. 18A illustrates exemplary autofocus options in the form of a graph 610. As shown, a horizontal axis 612 represents a nonlinear continuum of focus positions (e.g., object distance that is best focused onto the photo sensor). The camera assembly 36 of the mobile device 18 may have a full range 614 of focus positions. However, those on the upper and lower ends of the full range 614 may not be needed for barcode image capture because they represent object distances which are less than, or greater than, the typical distance between a barcode reader and a barcode. Accordingly, the autofocus settings of the camera assembly 36 may be configured specifically for barcode image capture, for example, via commands to the autofocus module 98 (or the operating system 48 controlling the autofocus module 98).

By way of example, the commands to the autofocus module 98 (or the operating system 48) may allow the camera assembly 36 to focus at object distances within a limited range 616. The limited range 616 may represent the useful range of object distances for barcode image capture, and exclude object distances too close to the mobile device 18 and object distances too far from the mobile device 18 for barcode reading.

As another example, the commands to the autofocus module 98 (or the operating system 48) may limit focus positions to discrete positions such as a first position 618a, a second position 618b, and a third position 618c. The first position 618a, the second position 618b, and the third position 618c may represent useful object distances for barcode image capture. The optic system may have sufficient depth of field at each of the discrete positions to accommodate image capture of a barcode within the target area 140 with sufficient sharpness for decoding.

Setting autofocus to one of a plurality of discrete focus settings may utilize a feedback-loop algorithm that is faster than the feedback-loop algorithms for autofocus when performing photography wherein the image is analyzed for sharpness and the best focus position is determined within the entire range.

As discussed with respect to FIG. 2A, the system-on-chip circuits 92 may include an auto-white balance module 93. As such the auto-white balance control methods 504c of the barcode application 500 (shown in FIG. 16) may issue a command to the operating system 48, the processor 44, or the auto-white balance module 93 to disable the auto-white balance function of the image sensor and/or associated circuitry. This may be done, as indicated previously, to avoid degrading contrast when a narrow band of illumination frequency is focused onto the image sensor for barcode reading.

As such, for barcode images, the output module 91 may be set to provide the digital image output 162, or use for image processing data that has not been subjected to modification by the disabled auto-white balance module 93.

The resolution and pre-processing control methods 504d may control the resolution for the output image as well as other image processing which may be performed on the output image prior to storing in the image data buffer 89 for decoding. Speed enhancements for image processing and decoding may be obtained by altering the resolution of the captured image. While high resolution images (e.g. 8 megapixels or more) may be desirable for conventional photography, this resolution may not be needed for barcode imaging and decoding. As long as the resolution is sufficient for successful decoding of a barcode, there is typically no need for an image of greater resolution.

Selection of the resolution may be done, for example, based on the type of barcode to be scanned, the size of the barcode within the output image, and other factors, which may be determined from previous images captured of the barcode. The resolution selected may be full resolution (i.e., one output pixel for each pixel captured by the image sensor) or binned (i.e., one output pixel for each group of x pixels captured by the image sensor).

FIG. 18B illustrates exemplary resolution binning methods that can be used to reduce the resolution of a barcode image. An exemplary image may be captured, by way of example, in three different ways. In a first scheme 620, no binning may be applied, and the image output may be the native resolution (full resolution) of the photo sensor 42 (i.e., one digital pixel value for each pixel captured by the photo sensor 42). In a second scheme 622, moderate binning may be applied so that the output has one digital pixel value, for example, for every four pixels captured by the photo sensor 42. The resulting output image data may thus be one-quarter of the resolution of the captured image data. In a third scheme 624, more aggressive binning may be applied so that the output has one digital pixel value, for example, for every six pixels captured by the photo sensor 42. The resulting output image data may thus be vertical binning (non-square) and one-sixth of the resolution of the captured image data.

When binning is applied, various mathematical algorithms may be used to obtain the value of an output pixel, based on its constituent pixels of the captured image. According to some examples, the intensity values of the constituent pixels may be averaged to provide the value of the resulting output pixel.

The foregoing description is illustrative of certain types of image processing that may be performed on image data while the image data is being transferred through the hardware circuits 90 and DMA 86 to the image data buffer 89. A more complete description of image processing algorithms that may be implemented in the hardware circuits 90 (or the system-on-chip circuits 92) is included in U.S. patent application Ser. No. 14/717,112. In the exemplary embodiment, the image resolution and pre-processing control methods 504d of the barcode application 500 may provide instructions to the hardware circuits 90, the system-on-chip circuits 92, and/or the operating system to set any of the foregoing image pre-processing options as well as image pre-processing options described in U.S. patent application Ser. No. 14/171,112.

In all cases, setting the resolution and image pre-processing selections may entail the resolution and pre-processing control methods 504d issuing a command to the operating system 48, the processor 44, the applicable image processing circuits within the hardware circuits 90, or the applicable image processing circuits within the system-on-chip circuits 92.

Gain and shutter control methods 504e may comprise setting image capture parameter values for one or more image frames to be sequentially captured, including a gain setting and an exposure setting for each frame as described in more detail in U.S. patent application Ser. No. 14/171,112.

FIG. 19A depicts an exemplary embodiment of target and exposure illumination and shutter control methods 504f in accordance with one embodiment. Step 542 represents receiving a trigger signal indicating that a barcode is to be read. The trigger signal may be received in several alternative ways as represented by steps 542a-542e. As discussed, the barcode application 500 may have a user interface (not shown) with one or more graphical elements displayed on the display screen 66. The user may use such graphical elements to initiate the barcode scanning process (for example, by tapping a "scan" soft button on the display screen 66) (542a).

Alternatively, the application may monitor the microphone connector 34b and the trigger signal may be a microphone input signal generated by the attachment as described with respect to FIG. 14 (542b).

Alternatively, the application may monitor the data connector 64b and the trigger signal may be a data input signal generated by the attachment as described with respect to FIG. 13 (542c).

Alternatively, the application may monitor the wireless communication system 52 and the trigger signal may be a wireless radio frequency (RF) trigger signal generated by the attachment (542d).

Alternatively, the application may monitor the target area 140 utilizing a sensor and the trigger signal may be automatically generated by the application detecting the presence of a barcode within the target area 140 (542e).

Step 544 represents pulsing the target illumination to generate a distinct illumination pattern within the target area 140 to assist the operator in aiming the mobile device 18 with respect to the barcode for image capture. The pulse may be generated for a duration sufficient for the operator to aim the mobile device 18 or may be generated for a shorter period of time (on the order of 10 ms). As discussed, the target illumination may be generated by the white light source 84 of the mobile device 18 (step 544a) or may be an external target illumination source (step 544b) within the attachment.

Step 546 represents a step of activating the exposure illumination. In certain embodiments ambient illumination is used for providing diffuse illumination for image capture of a barcode. In these embodiments step 546 may not be performed. In other embodiments the exposure illumination may be activated for image capture (step 546). As discussed, the exposure illumination may be generated by the white light source 84 of the mobile device 18 (e.g., a mobile device torch) (step 546a) or may be an external exposure illumination source (step 546b) within the attachment. The barcode image is then captured (step 548).

Step 550 represents determining whether there has been a successful decode of the barcode represented in the captured image. If it has been successful, then the method may end. If there has not been a successful decode, the image capture parameters may be adjusted at step 552 and the target illumination system may again be pulsed to further assist the user in aiming the mobile device 18 with respect to the barcode at step 544. It is recognized that several repeats of this process may be required for: i) the operator to properly aim the mobile device 18 with respect to the barcode (if the target illumination pulse is short), and ii) the operator to have a correct combination of image capture parameters such that the resulting image is decodable.

FIG. 19B depicts another exemplary embodiment of target and exposure illumination and shutter control methods 504f in accordance with another embodiment. Some of the steps in FIGS. 19A and 19B are the same and such steps will not be explained in detail for simplicity.

Step 542' (i.e., any one of 542a' to 542e') represents receiving a trigger signal indicating that a barcode is to be read.

Step 554' represents turning on a combination of targeting and exposure illumination. As discussed with respect to FIG. 8D, the intense targeting pattern 400 may include diffuse illumination across a region that coincides with the system field of view 207 such that the targeting illumination is also the exposure illumination. As discussed, the targeting and exposure illumination may be generated by the white light source 84 of the mobile device 18 (step 554a') or may be an external illumination source within the attachment (step 554b').

Step 548' represents image capture of a barcode, step 550' represents determining whether there was a successful decode, and step 552' represents adjusting image capture parameters based on the previous image captured, all as discussed with respect to FIG. 19A. If there is a successful decoding the targeting exposure illumination may be turned off at step 556'. If the decoding is not successful another image of the barcode may be captured (step 548') following adjustment of image capture parameters (step 552') if any.

FIG. 19C represents a filtering arrangement for the targeting illumination and the supplemental optics which enable use of the methods of FIG. 19B even if the intense targeting illumination pattern is not also a diffuse illumination pattern across the entire barcode within the field of view.

The visible spectrum 560 generally ranges from about 430 nm to approximately 660 nm. In a first embodiment the targeting illumination structure may include a first narrow band pass filter which passes a narrow band of illumination (e.g., the band 564) within the visible spectrum 560 while attenuating illumination (e.g., the band 566a) below the band 564 and illumination (e.g., the band 566b) above the band 564. In an exemplary embodiment, the first narrow band pass filter may have its narrow pass band centered at a wavelength between 430 nm and 470 nm which are the wavelengths corresponding to blue illumination. When such a filter is used to filter white illumination, the color of the intense targeting illumination passed by the band pass filter would appear blue.

In another embodiment, the targeting illumination structure may include a low pass filter. The low pass filter passes wavelengths of illumination (e.g., the band 570) which are within the visible spectrum 560 below a predetermined threshold while attenuating wavelengths of illumination (e.g., the band 572) above the threshold. In an exemplary embodiment, the predetermined threshold may be between 470 nm and 500 nm such that the pass band (i.e., the passed illumination spectrum) is substantially blue. When such a filter is used to filter white illumination, the color of the illumination passed by the filter appears blue.

Although the first narrow band pass filter is depicted as having very distinct edges (e.g. wavelengths within the pass band 564 are passed with no attenuation and wavelengths outside the pass band 564 are completely attenuated) it is recognized in the art that the edges are not as distinct as depicted, and some illumination within the pass band 564 will also be attenuated and some illumination outside of the pass band (i.e., the bands 566*a* and 566*b*) will also be passed. A most efficient filter will minimize the amount of illumination within the pass band 564 that is attenuated and further minimize the amount of illumination that is outside of the pass band (i.e., the bands 566*a* and 566*b*) to be passed.

Similarly, although the low pass filter is depicted as having a very distinct edge at the threshold (e.g., wavelengths below the threshold are passed with no attenuation and wavelengths above the threshold are completely attenuated) it is recognized in the art that the edge is not as distinct as depicted, and some illumination within the band 570 will be attenuated and some illumination within the band 572 will be passed. A most efficient filter will minimize the amount of illumination within the band 570 that is attenuated and further minimize the amount of illumination in the band 572 that is outside of the band 570 to be passed.

In other embodiments, the targeting illumination structure may include a high pass filter. The high pass filter passes wavelengths of illumination (e.g., the band 578) which are within the visible spectrum 560 above a predetermined threshold while attenuating wavelengths of illumination (e.g., the band 576) below the threshold. In an exemplary embodiment, the predetermined threshold may be 500 nm such that the pass band 578 includes the entire visible spectrum excluding illumination which is substantially blue.

As with the low pass filter, the high pass filter is depicted as having a very distinct edge at the threshold (e.g. wavelengths above the threshold are passed with no attenuation and wavelengths below the threshold are completely attenuated) it is recognized in the art that the edge is not as distinct as depicted, and some illumination above the threshold will be attenuated and some illumination below the threshold will be passed. A most efficient filter will minimize the amount of illumination above the threshold that is attenuated and further minimize the amount of illumination below the threshold that is passed.

It should be appreciated that when illumination from a white light source 84 of a mobile device 18 is filtered utilizing a narrow band pass filter (e.g., a pass band 564) or a low pass filter (e.g., a pass band 570) and the illumination incident on the camera lens is filtered by a high pass filter (e.g., passing the band 578), the illumination generated by the white light source 84, as filtered, may not be visible to the camera because the portion of the illumination passed by the band pass filter (e.g., passing the band 564) or the low pass filter (e.g., passing the band 570) is attenuated by the high pass filter. As such, if the white light source 84 is used for generating an intense targeting illumination pattern within the field of view 207, the targeting pattern may not be visible to the camera (e.g., attenuated by the high pass filter) and ambient illumination passed by the high pass filter (e.g., passing the band 578) is visible to the camera and is typically sufficient for imaging and decoding a barcode.

This structure enables the accessory to further utilize optics to generate a targeting pattern utilizing the white light source 84 (filtered before or after being shaped by the optic) and enables the intense targeting illumination pattern to continue to illuminate the barcode during image capture (enabling the operator to aim the mobile device 18 with respect to the barcode) without the targeting pattern being visible to the camera and producing hot regions (intense illumination) corresponding to the targeting pattern within the image.

Returning to FIG. 16, the decoder 506 of the barcode application 500 may comprise known methods for image processing and decoding, including methods described in U.S. patent application Ser. No. 14/717,112. As discussed with respect to FIGS. 19A and 19B, if decoding is unsuccessful, then a new barcode image may need to be captured. This may be done by returning to the image capture control methods 504 and selecting new image capture parameters. This process may be repeated until the barcode image has been successfully decoded, or until the user cancels further image capture and/or decoding attempts.

In general the data control methods 508 of the barcode application 500 control what processes are performed on data decoded from the barcode 142 (decoded data) within the target area 140. In more detail, and with reference to FIG. 1, in a first aspect the data control methods 508 may function as a mobile client to a remote non-legacy system which supports maintaining a Transmission Control Protocol/Internet Protocol (TCP/IP) connection with mobile devices (such as mobile device 18) via the LAN 12 for exchanging data with the mobile device 18 (including receiving decoded data from the mobile device 18) and controlling operation of certain aspects of the barcode application 500.

In a second aspect, the data control methods 508 may function as a mobile client to an intermediary device. The intermediary device supports maintaining a TCP/IP connection with mobile devices (such as mobile device 18) via the LAN 12 for receiving decoded data from the mobile device 18. In turn the intermediary device may further support providing decoded data received from the mobile device 18 to a legacy system. This is useful when the legacy system is incapable of receiving decoded data directly from the mobile device 18 via a TCP/IP connection and therefore the barcode application 500 may function independently of, and requires no compatibility with, the communication protocols and functions of the legacy system, including those used for communication between the legacy system and the intermediary device. The intermediary device may communicate with the legacy system, which may be a TCP/IP connection separate from the TCP/IP connection through which the mobile device 18 communicates with the intermediary device.

In accordance with an embodiment, a non-transitory computer-readable medium is provided for storing instructions for a barcode-reading application for a mobile device. The mobile device includes a camera assembly, a network interface, a memory, and a processor for executing the barcode-reading application including a decoder. The non-transitory computer-readable medium may include a code for controlling the camera assembly to capture an image of a barcode, decoding the image of the barcode to generate decoded data, and processing the decoded data; a code for controlling the network interface to establish a network connection to a licensing server and obtaining a license code from the licensing server when in a base mode of operation; a code for subjecting the license code to a predetermined algorithm and determining at least one operating permission authorized by the license code; a code for enabling an enhanced mode of operation; and a code for implementing at least one enhanced barcode-reading function which corresponds to the at least one operating permission authorized by the license code when in the enhanced mode of operation.

The at least one enhanced barcode-reading function may include a function of decoding a barcode symbology that the decoder is restricted from decoding in the base mode of operation. Alternatively or additionally, the at least one enhanced barcode-reading function may include a function of decoding multiple barcodes in sequence at a rate that is faster than a rate at which the barcode-reading application can decode multiple barcodes in sequence in the base mode of operation. Alternatively or additionally, the at least one enhanced barcode-reading function may include a function of decoding a quantity of barcodes of a particular symbology that exceeds a restricted quantity of barcodes of the particular symbology that the barcode-reading application can decode in the base mode of operation.

Alternatively or additionally, the at least one enhanced barcode-reading function may remove a demonstration restriction function under which the barcode-reading application functions in the base mode of operation. The demonstration restriction function may be at least one of: i) a function that scrambles decoded data from a barcode of at least one symbology; ii) a function that restricts the decoded data or scrambled decoded data from a barcode of at least one symbology from being made available for further processing; or iii) a function that restricts the decoded data or the scrambled decoded data from a barcode of at least one symbology from being displayed on a display screen of the mobile device.

Alternatively or additionally, the at least one enhanced barcode-reading function may enable at least one enhanced image processing function that improves an ability to decode an image of a barcode and is not operable when the decoder operates in the base mode of operation.

The base mode of operation may include a base decoding mode of operation and a demonstration mode of operation. The computer-readable storage medium may further include, for the base decoding mode of operation, a code for driving the camera assembly to capture an image of a barcode, a code for applying base decoder functions to the image to identify a barcode symbology, a code for decoding the barcode and making decoded data available for further processing if the barcode symbology is a base symbology, and a code for entering the demonstration mode of operation if the barcode symbology is not the base symbology. The computer-readable storage medium may further include, for the demonstration mode of operation, a code for applying at least one enhanced barcode-reading function to decode the barcode, and a code for performing at least one of: i) outputting an indication of successful decoding of the barcode, or ii) implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device.

The non-transitory computer-readable medium may further include a code for performing an upgrade function in the demonstration mode of operation. The upgrade function may enable a user selection to obtain the license code, obtain the license code based on the user selection, establish a network connection to the licensing server, and obtain the license code from the licensing server.

The non-transitory computer-readable medium may further include a code, in order to obtain the license code from the licensing server, for communicating to the licensing server one of: i) a unique identification code of the mobile device; or ii) a user identification code identifying a controller of the mobile device.

One or more of the features, functions, procedures, operations, components, elements, structures, etc. described in connection with any one of the configurations described herein may be combined with one or more of the functions, procedures, operations, components, elements, structures, etc. described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode-reading application for a mobile device embodied on a computer-readable medium, wherein the mobile device comprises a camera assembly, a network interface, a memory, and a processor for executing the barcode-reading application including a decoder, the barcode-reading application comprising:
   instructions executable by the processor for controlling the camera assembly to capture an image of a barcode, decoding the image of the barcode to generate decoded data, and processing the decoded data,
   wherein the barcode-reading application operates in a base mode or an enhanced mode,
   wherein in the base mode of operation, the instructions are configured to:
   control the network interface to establish a network connection to a licensing server and obtain a license code from the licensing server;
   subject the license code to a predetermined algorithm and determine at least one operating permission authorized by the license code; and
   enable an enhanced mode of operation, wherein in the enhanced mode of operation, the instructions are configured to implement at least one enhanced barcode-reading function which corresponds to the at least one operating permission authorized by the license code.

2. The barcode-reading application of claim 1, wherein the at least one enhanced barcode-reading function comprises a function of decoding a barcode symbology that the decoder is restricted from decoding in the base mode of operation.

3. The barcode-reading application of claim 1, wherein the at least one enhanced barcode-reading function comprises a function of decoding multiple barcodes in sequence at a rate that is faster than a rate at which the barcode-reading application can decode multiple barcodes in sequence in the base mode of operation.

4. The barcode-reading application of claim 1, wherein the at least one enhanced barcode-reading function comprises a function of decoding a quantity of barcodes of a particular symbology that exceeds a restricted quantity of barcodes of the particular symbology that the barcode-reading application can decode in the base mode of operation.

5. The barcode-reading application of claim 1, wherein the at least one enhanced barcode-reading function comprises removing a demonstration restriction function under which the barcode-reading application functions in the base mode of operation,
  wherein the demonstration restriction function is at least one of: i) a function that scrambles decoded data from a barcode of at least one symbology; ii) a function that restricts the decoded data or scrambled decoded data from a barcode of at least one symbology from being made available for further processing; or iii) a function that restricts the decoded data or the scrambled decoded data from a barcode of at least one symbology from being displayed on a display screen of the mobile device.

6. The barcode-reading application of claim 1, wherein the at least one enhanced barcode-reading function comprises enabling at least one enhanced image processing function that improves an ability to decode the image of the barcode and is not operable when the decoder operates in the base mode of operation.

7. The barcode-reading application of claim 1, wherein the base mode of operation comprises a base decoding mode of operation and a demonstration mode of operation,
  wherein the instructions, in the base decoding mode of operation, are configured to:
    drive the camera assembly to capture the image of the barcode;
    apply base decoder functions to the image to identify a barcode symbology;
    if the barcode symbology is a base symbology, decode the barcode and make decoded data available for further processing; and
    if the barcode symbology is not the base symbology, enter the demonstration mode of operation, and
  wherein the instructions, in the demonstration mode of operation, are configured to:
    apply at least one enhanced barcode-reading function to decode the barcode; and
    perform at least one of:
      outputting an indication of successful decoding of the barcode; or
      implementing a restriction function, the restriction function being at least one of: i) a function that scrambles decoded data; ii) a function that restricts the decoded data or scrambled decoded data from being made available for further processing by at least one application executing on the mobile device; or iii) a function that restricts the decoded data or the scrambled decoded data from being displayed on a display screen of the mobile device.

8. The barcode-reading application of claim 7, wherein the instructions are further configured to perform an upgrade function in the demonstration mode of operation, wherein the upgrade function enables a user selection to obtain the license code, obtains the license code based on the user selection, establishes a network connection to the licensing server, and obtains the license code from the licensing server.

9. The barcode-reading application of claim 8, wherein in order to obtain the license code from the licensing server, the instructions are further configured to communicate to the licensing server one of: i) a unique identification code of the mobile device; or ii) a user identification code identifying a controller of the mobile device.

10. A barcode-reading application for a mobile device, wherein the barcode-reading application includes a decoder, and the mobile device comprises a camera, a memory, and a processor for executing an operating system and the barcode-reading application stored in the memory, the barcode-reading application comprising:
  instructions to drive the camera to capture an image of a barcode symbology;
  instructions to apply base decoder functions of the decoder to decode the barcode symbology if an enhanced decoder mode has not been authorized for the mobile device;
  instructions to obtain a license code from a licensing server, wherein the enhanced decoder mode is enabled upon obtaining the license code from the licensing server; and
  instructions to apply at least one enhanced decoder function of the decoder to decode the barcode symbology if the enhanced decoder mode has been enabled.

11. The barcode-reading application of claim 10, wherein the at least one enhanced decoder function comprises a function for decoding a barcode symbology that is restricted from decoding in a base mode of operation.

12. The barcode-reading application of claim 10, wherein the at least one enhanced decoder function comprises a function of decoding multiple barcodes in sequence at a rate that is faster than a restricted rate at which the decoder can decode a sequence of multiple barcodes when in the base mode of operation.

13. The barcode-reading application of claim 10, wherein the at least one enhanced decoder function comprises a function of decoding a quantity of barcodes of a particular symbology that exceeds a restricted quantity of barcodes of the particular symbology which the decoder can decode when in the base mode of operation.

14. The barcode-reading application of claim 10, wherein the at least one enhanced decoder function comprises removing a demonstration restriction function under which the decoder functions when in the base mode of operation thereby making decoded data from a barcode of a particular symbology available for further processing by an application executing on the mobile device, and
  wherein the demonstration restriction function is at least one of: i) a function which scrambles decoded data from a barcode of at least one particular symbology; ii) a function which restricts the decoded data or scrambled decoded data from a barcode of at least one particular symbology from being made available for further processing by at least one application executing on the mobile device; or iii) a function which restricts the decoded data or the scrambled decoded data from a barcode of at least one particular symbology from being displayed on a display screen of the mobile device.

15. The barcode-reading application of claim 10, wherein the at least one enhanced decoder function comprises enabling at least one enhanced image processing function which improves an ability to decode an image of a barcode and is not operable when the decoder operates in the base mode of operation.

16. The barcode-reading application of claim 10, further comprising:
  instructions to subject the license code to a predetermined algorithm to determine at least one operating permission authorized by the license code, wherein the at least one enhanced decoder function corresponds to the at least one operating permission authorized by the license code.

17. The barcode-reading application of claim 16, further comprising:

instructions to communicate to the licensing server at least one of: i) a unique identification code of the mobile device; or ii) a user identification code identifying a controller of the mobile device.

18. The barcode-reading application of claim 16, wherein the at least one enhanced decoder function comprises a function for decoding a barcode symbology that is restricted from decoding in a base mode of operation.

19. The barcode-reading application of claim 16, wherein the at least one enhanced decoder function comprises a function of decoding multiple barcodes in sequence at a rate that is faster than a restricted rate at which the decoder can decode a sequence of multiple barcodes when in the base mode of operation.

20. The barcode-reading application of claim 16, wherein the at least one enhanced decoder function comprises a function of decoding a quantity of barcodes of a particular symbology that exceeds a restricted quantity of barcodes of the particular symbology which the decoder can decode when in the base mode of operation.

21. The barcode-reading application of claim 16, wherein the at least one enhanced decoder function comprises removing a demonstration restriction function under which the decoder functions when in the base mode of operation thereby making decoded data from a barcode of a particular symbology available for further processing by an application executing on the mobile device, and
  wherein the demonstration restriction function is at least one of: i) a function which scrambles decoded data from a barcode of at least one particular symbology; ii) a function which restricts the decoded data or scrambled decoded data from a barcode of at least one particular symbology from being made available for further processing by at least one application executing on the mobile device; or iii) a function which restricts the decoded data or the scrambled decoded data from a barcode of at least one particular symbology from being displayed on a display screen of the mobile device.

22. The barcode-reading application of claim 16, wherein the at least one enhanced decoder function comprises enabling at least one enhanced image processing function which improves an ability to decode an image of a barcode and is not operable when the decoder operates in the base mode of operation.

23. A mobile device for reading barcodes, comprising:
  a camera assembly for capturing an image of a barcode;
  a memory; and
  a processor for executing an operating system and a decoder application stored in the memory, wherein the decoder application is configured to:
    control the camera assembly to capture an image of a barcode, the image of the barcode being affected by at least one optic system of the camera assembly;
    utilize a base decoder function for attempting to decode a barcode if an enhanced decoder mode has not been authorized for the mobile device; and
    utilize an enhanced decoder function for attempting to decode the barcode if the enhanced decoder mode has been authorized for the mobile device, wherein the enhanced decoder mode is authorized by obtaining a license code from a licensing server.

24. The mobile device of claim 23, wherein the enhanced decoder function comprises a function of decoding a barcode symbology that the decoder application is restricted from decoding if the enhanced decoder mode has not been authorized for the mobile device.

25. The mobile device of claim 23, wherein the enhanced decoder function comprises a function of decoding multiple barcodes in sequence at a rate that is faster than a restricted rate at which the decoder application can decode a sequence of multiple barcodes if the enhanced decoder mode has not been authorized for the mobile device.

26. The mobile device of claim 23, wherein the enhanced decoder function comprises a function of decoding a quantity of barcodes of a particular symbology that exceeds a restricted quantity of barcodes of the particular symbology which the decoder application can decode if the enhanced decoder mode has not been authorized for the mobile device.

27. The mobile device of claim 23, wherein the enhanced decoder function comprises removing a demonstration restriction function under which the decoder application functions when the enhanced decoder mode has not been authorized for the mobile device, thereby making decoded data from a barcode of a particular symbology available for further processing by an application executing on the mobile device,
  wherein the demonstration restriction function is at least one of: i) a function which scrambles decoded data from a barcode of at least one particular symbology; ii) a function which restricts the decoded data or scrambled decoded data from a barcode of at least one particular symbology from being made available for further processing by at least one application executing on the mobile device; or iii) a function which restricts the decoded data or the scrambled decoded data from a barcode of at least one particular symbology from being displayed on a display screen of the mobile device.

28. The mobile device of claim 23, wherein the enhanced decoder function comprises enabling at least one enhanced image processing function which improves an ability to decode an image of a barcode and is not operable if the enhanced decoder mode has not been authorized for the mobile device.

29. The mobile device of claim 23, wherein the decoder application is configured to subject the license code to a predetermined algorithm to determine at least one operating permission authorized by the license code, wherein the enhanced decoder function corresponds to the at least one operating permission authorized by the license code.

30. The mobile device of claim 29, wherein the processor is further configured to obtain the license code from the licensing server by communicating to the licensing server one of: i) a unique identification code of the mobile device, or ii) a user identification code identifying a controller of the mobile device.

31. The mobile device of claim 29, wherein the enhanced decoder function comprises a function of decoding a barcode symbology that the decoder application is restricted from decoding if the enhanced decoder mode has not been authorized for the mobile device.

32. The mobile device of claim 29, wherein the enhanced decoder function comprises a function of decoding multiple barcodes in sequence at a rate that is faster than a restricted rate at which the decoder application can decode a sequence of multiple barcodes if the enhanced decoder mode has not been authorized for the mobile device.

33. The mobile device of claim 29, wherein the enhanced decoder function comprises a function of decoding a quantity of barcodes of a particular symbology that exceeds a restricted quantity of barcodes of the particular symbology which the decoder application can decode if the enhanced decoder mode has not been authorized for the mobile device.

34. The mobile device of claim 29, wherein the enhanced decoder function comprises removing a demonstration restriction function under which the decoder application functions when the enhanced decoder mode has not been authorized for the mobile device, thereby making decoded data from a barcode of a particular symbology available for further processing by an application executing on the mobile device, wherein the demonstration restriction function is at least one of: i) a function which scrambles decoded data from a barcode of at least one particular symbology; ii) a function which restricts the decoded data or scrambled decoded data from a barcode of at least one particular symbology from being made available for further processing by at least one application executing on the mobile device; or iii) a function which restricts the decoded data or the scrambled decoded data from a barcode of at least one particular symbology from being displayed on a display screen of the mobile device.

35. The mobile device of claim 29, wherein the enhanced decoder function comprises enabling at least one enhanced image processing function which improves an ability to decode an image of a barcode and is not operable if the enhanced decoder mode has not been authorized for the mobile device.

\* \* \* \* \*